US012652458B2

(12) United States Patent
Tamagawa

(10) Patent No.: US 12,652,458 B2
(45) Date of Patent: Jun. 9, 2026

(54) INFORMATION PROCESSING APPARATUS, INFORMATION PROCESSING APPARATUS CONTROL METHOD, IMAGE MANAGEMENT SYSTEM, AND STORAGE MEDIUM

(71) Applicant: CANON KABUSHIKI KAISHA, Tokyo (JP)

(72) Inventor: Kei Tamagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 18/808,159

(22) Filed: Aug. 19, 2024

(65) Prior Publication Data

US 2025/0071409 A1     Feb. 27, 2025

(30) Foreign Application Priority Data

Aug. 21, 2023     (JP) ................................. 2023-134155

(51) Int. Cl.
*H04N 23/63* (2023.01)
*H04N 23/62* (2023.01)
*H04N 23/661* (2023.01)

(52) U.S. Cl.
CPC ........... *H04N 23/631* (2023.01); *H04N 23/62* (2023.01); *H04N 23/661* (2023.01)

(58) Field of Classification Search
CPC ..... H04N 23/631; H04N 23/62; H04N 23/661
See application file for complete search history.

(56) References Cited

U.S. PATENT DOCUMENTS

| | | | | |
|---|---|---|---|---|
| 10,798,283 B2 * | 10/2020 | Shintani | ................. | H04N 23/63 |
| 2011/0069179 A1 * | 3/2011 | Bathiche | ................ | H04N 7/181 |
| | | | | 348/207.1 |
| 2013/0050507 A1 * | 2/2013 | Syed | ................... | H04N 1/00244 |
| | | | | 348/207.1 |
| 2016/0127645 A1 * | 5/2016 | Sudo | ..................... | H04N 23/667 |
| | | | | 348/221.1 |
| 2016/0198210 A1 * | 7/2016 | Torikai | ............. | H04N 21/43615 |
| | | | | 348/207.1 |
| 2020/0007810 A1 * | 1/2020 | Hoevenaar | ........... | H04N 23/632 |
| 2020/0034112 A1 * | 1/2020 | Woo | ..................... | G06N 3/0499 |

(Continued)

OTHER PUBLICATIONS https://image.canon/.

(Continued)

*Primary Examiner* — Twyler L Haskins
*Assistant Examiner* — John H Morehead, III
(74) *Attorney, Agent, or Firm* — Venable LLP

(57)     ABSTRACT

An information processing apparatus that provides an image received from an external apparatus to an external service in accordance with an instruction of a post by a user, comprising: an obtaining unit configured to obtain shooting information supplementary to the image received from the external apparatus; a generation unit configured to generate, based on the shooting information and information about the external service serving as a providing destination of the image, a message representing a shooting setting of the image in a form suited to the post to the external service serving as the providing destination; and a providing unit configured to associate the image and the message, and provide the image and the message to the external service serving as the providing destination.

27 Claims, 36 Drawing Sheets

(56) References Cited

U.S. PATENT DOCUMENTS

2020/0059605 A1* 2/2020 Liu ...................... H04N 23/667
2022/0094806 A1* 3/2022 Inoue ................. H04N 1/00427
2023/0013044 A1* 1/2023 Sugita ................. H04N 23/617
2023/0138533 A1* 5/2023 Fujihara ................. A63F 13/87
463/42

OTHER PUBLICATIONS https://image.canon/st/en/features.html?region=0.
https://image.canon/st/en/index.html?region=0.
https://image.canon/st/ja/features.html.

* cited by examiner

F I G. 1
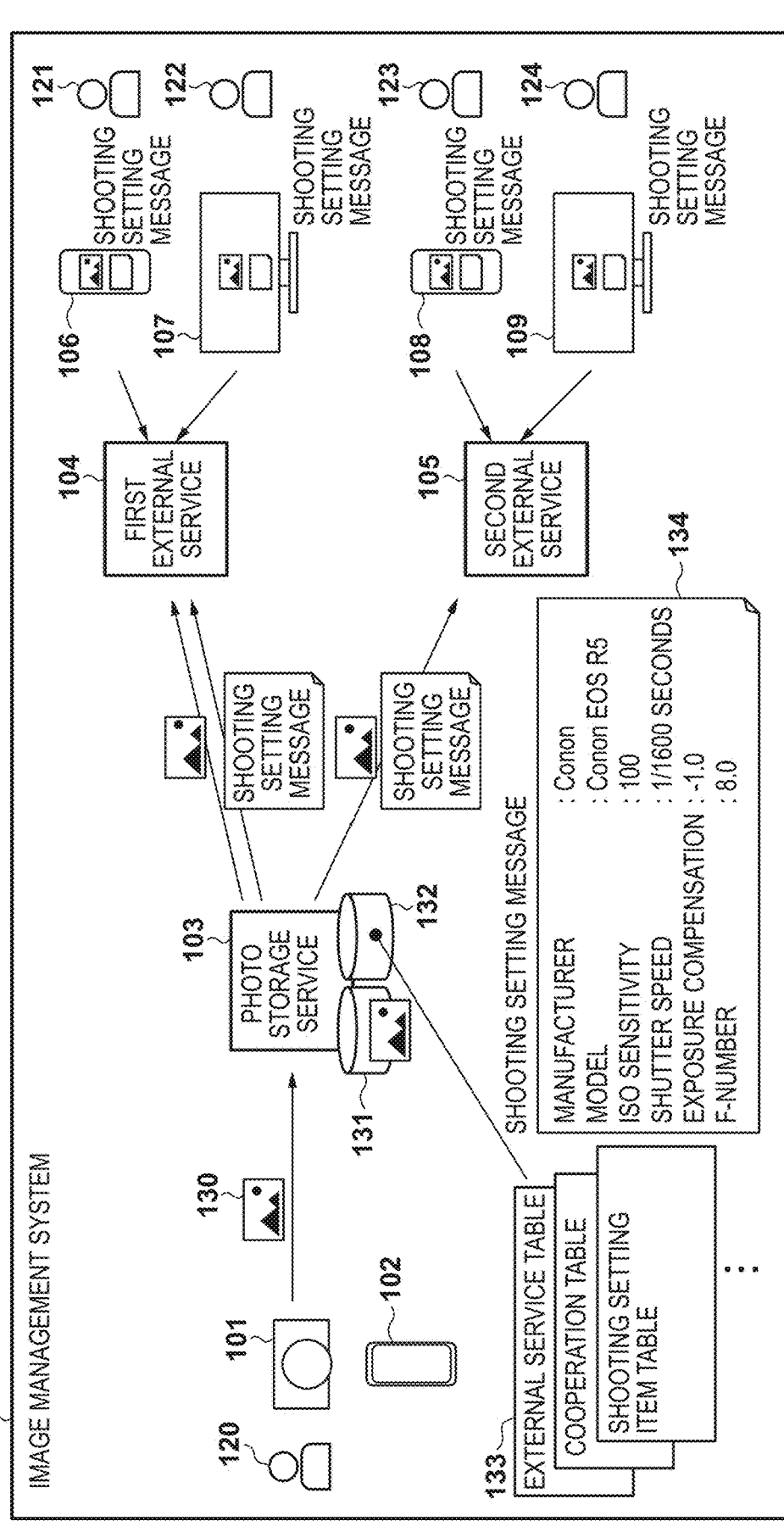

100

IMAGE MANAGEMENT SYSTEM

204
NETWORK

200
TERMINAL APPARATUS

201
IMAGE CAPTURING APPARATUS

202
IMAGE MANAGEMENT APPARATUS

203
INFORMATION MANAGEMENT APPARATUS

200

TERMINAL APPARATUS

BUS
309

302  CPU

303  ROM

304  RAM

305  INPUT/OUTPUT DEVICE

306  SECONDARY STORAGE DEVICE

307  NETWORK I/F

308  IMAGE CAPTURING DEVICE

F I G. 4
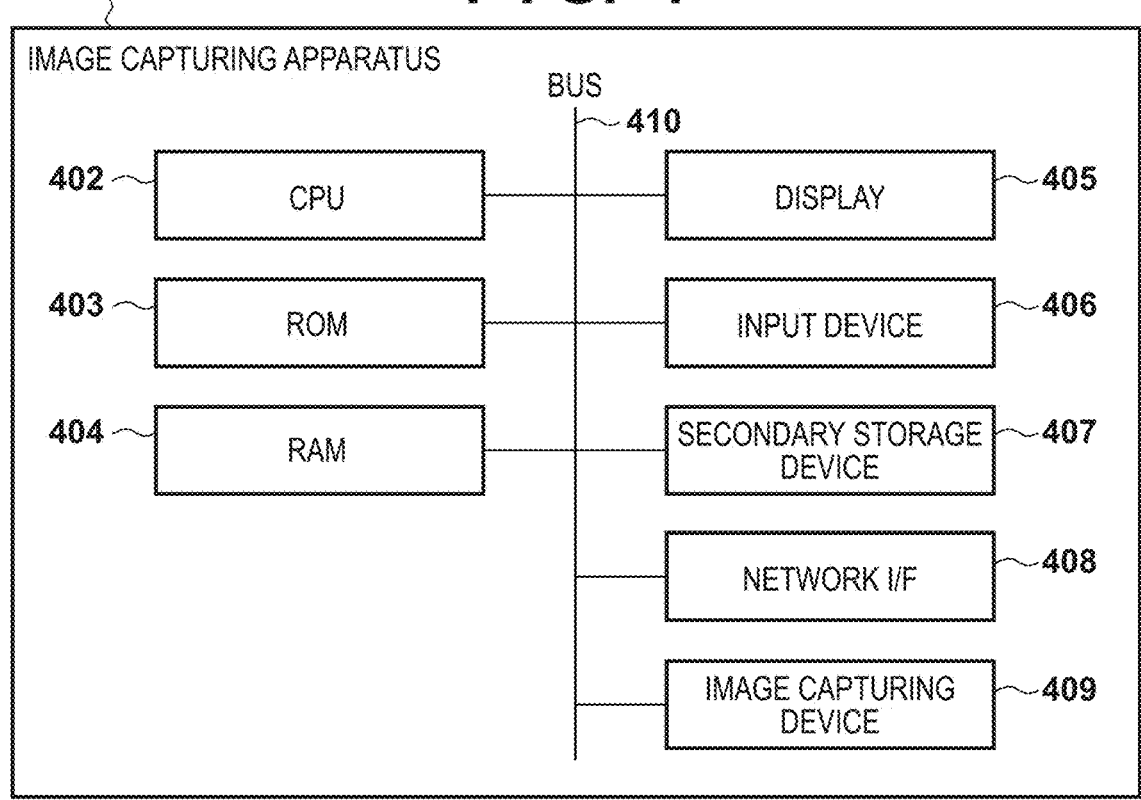
F I G. 5
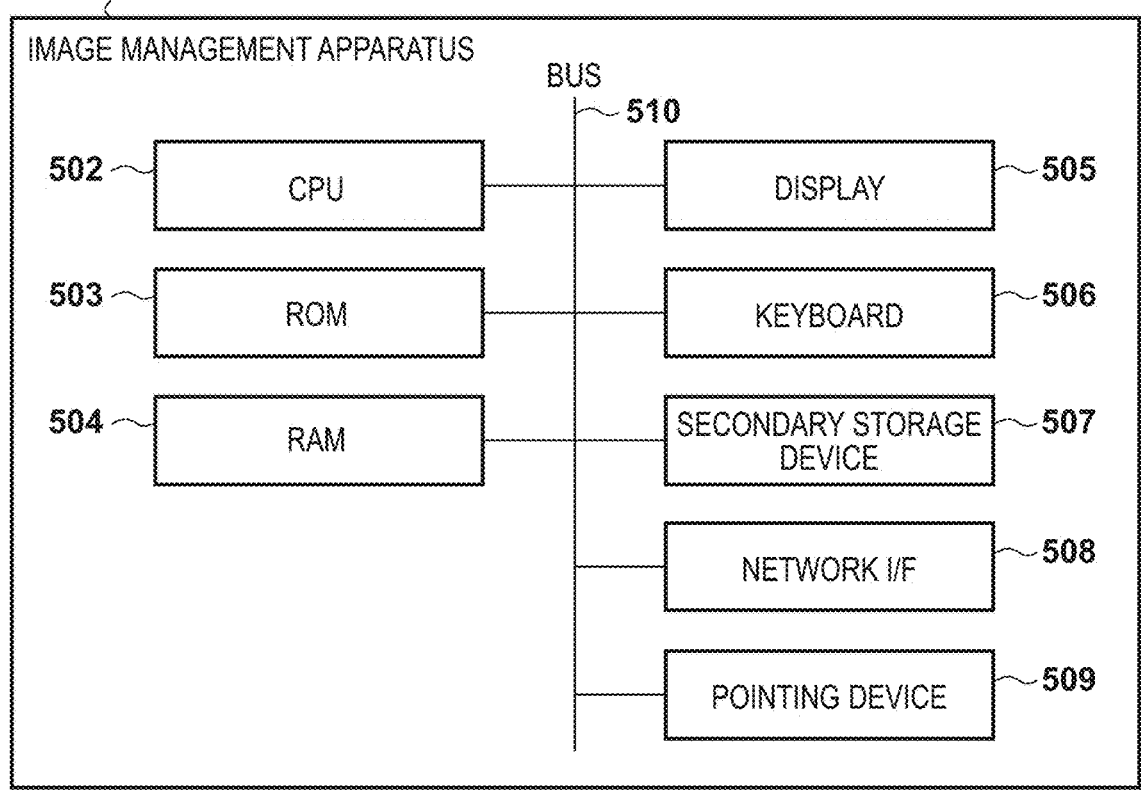

F I G. 6

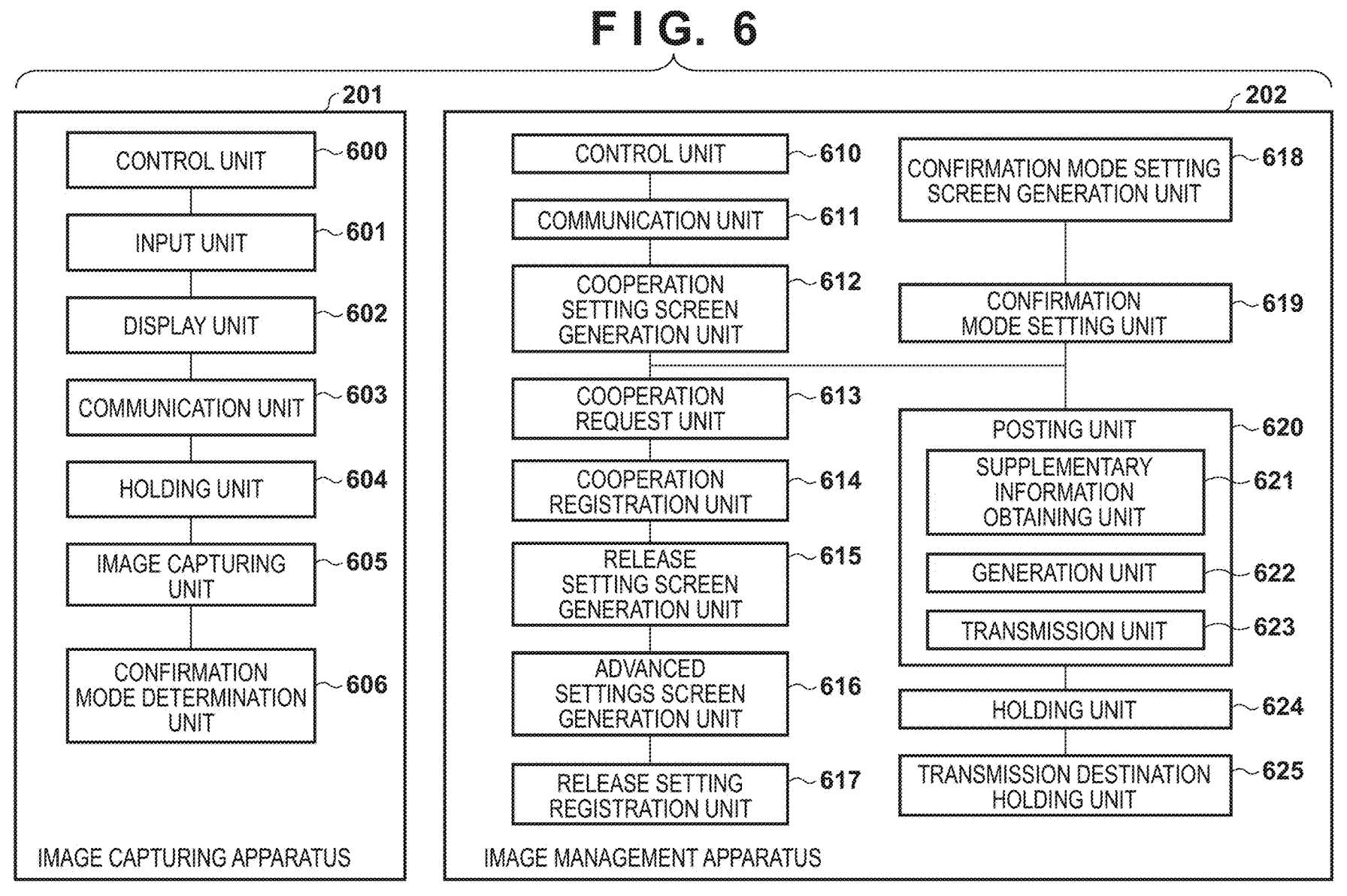

IMAGE CAPTURING APPARATUS 201

- 600 CONTROL UNIT
- 601 INPUT UNIT
- 602 DISPLAY UNIT
- 603 COMMUNICATION UNIT
- 604 HOLDING UNIT
- 605 IMAGE CAPTURING UNIT
- 606 CONFIRMATION MODE DETERMINATION UNIT

IMAGE MANAGEMENT APPARATUS 202

- 610 CONTROL UNIT
- 611 COMMUNICATION UNIT
- 612 COOPERATION SETTING SCREEN GENERATION UNIT
- 613 COOPERATION REQUEST UNIT
- 614 COOPERATION REGISTRATION UNIT
- 615 RELEASE SETTING SCREEN GENERATION UNIT
- 616 ADVANCED SETTINGS SCREEN GENERATION UNIT
- 617 RELEASE SETTING REGISTRATION UNIT
- 618 CONFIRMATION MODE SETTING SCREEN GENERATION UNIT
- 619 CONFIRMATION MODE SETTING UNIT
- 620 POSTING UNIT
- 621 SUPPLEMENTARY INFORMATION OBTAINING UNIT
- 622 GENERATION UNIT
- 623 TRANSMISSION UNIT
- 624 HOLDING UNIT
- 625 TRANSMISSION DESTINATION HOLDING UNIT

F I G.  8
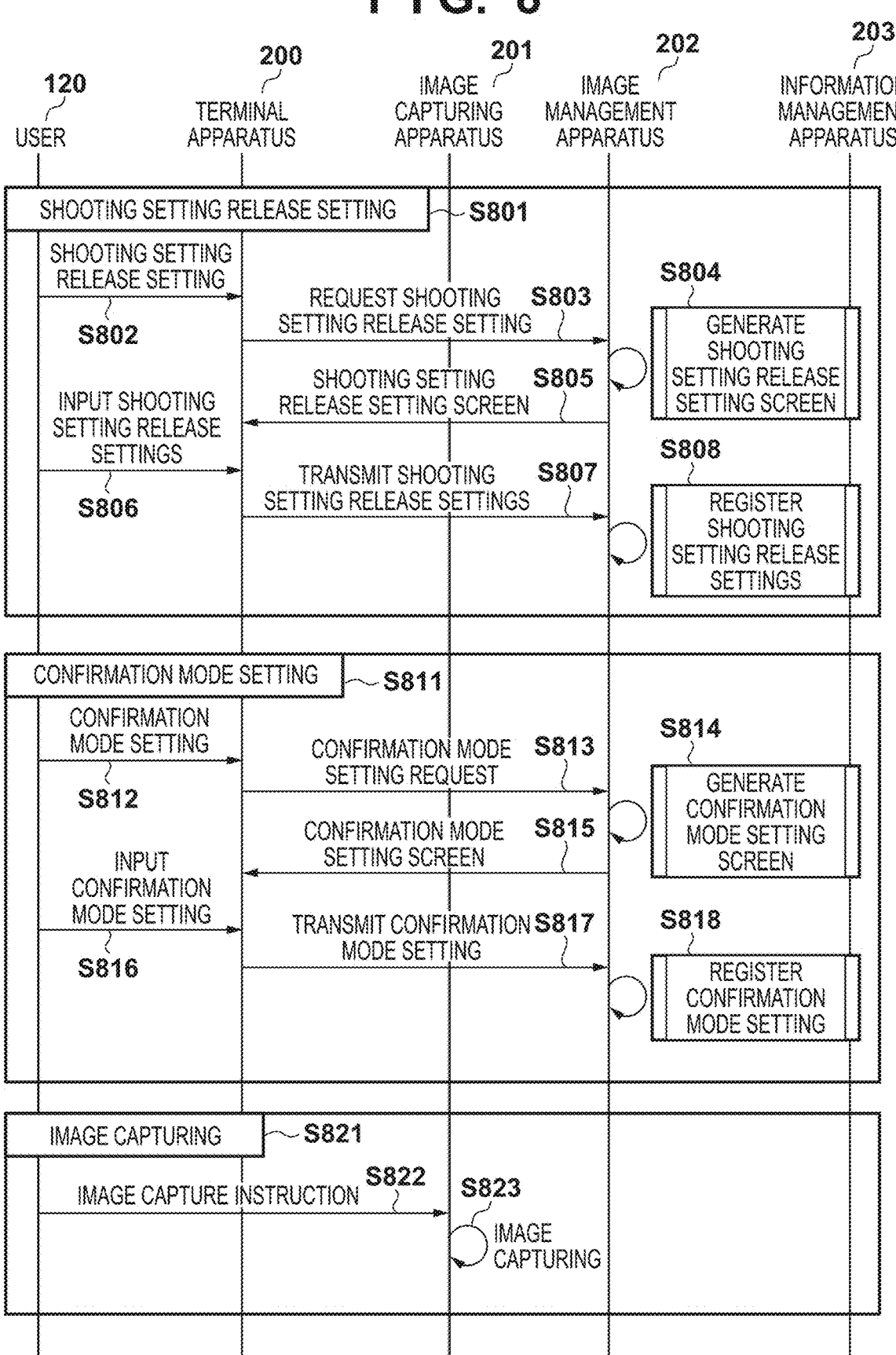

F I G. 10

1000

```
[
     {
               " CAMERA ID" : "cam001"
               " EXTERNAL SERVICE ID" : "face"
               " SHOOTING SETTING RELEASE FLAG" : "true"
     },
     {

"CAMERA ID" : "cam001"
               "EXTERNAL SERVICE ID" : "twit"
               " SHOOTING SETTING RELEASE FLAG" : "false"

}
     . . .

}
```

F I G. 11A

USER TABLE                           1100

| USER ID | EMAIL ADDRESS | CONFIRMATION MODE | ... |
|---------|---------------|--------------------|-----|
| user001 | aaa@a.a | true | ... |
| user002 | bbb@b.b | false | ... |
| ... | ... | ... | ... |

F I G. 11B

MODEL TABLE                          1101

| MODEL ID | MODEL NAME | COMPATIBLE SHOOTING SETTINGS | ... |
|----------|------------|------------------------------|-----|
| model001 | EOS R5 | [ssi001,ssi002,ssi003,ssi004,ssi005,ssi006,...] | ... |
| model002 | IXY 210 | [ssi001,ssi002,ssi004,ssi005,ssi006,...] | ... |
| ... | ... | ... | ... |

F I G. 11C

DEVICE TABLE                        1102

| CAMERA ID | USER ID | MODEL ID | ... |
|-----------|---------|----------|-----|
| cam001 | user001 | model001 | ... |
| cam002 | user001 | model002 | ... |
| ... | ... | ... | ... |

F I G. 11D

EXTERNAL SERVICE TABLE                  1103

| EXTERNAL SERVICE ID | EXTERNAL SERVICE DISPLAY NAME | LINE ENCLOSING CHARACTER | LINE FEED CHARACTER | ... |
|---------------------|-------------------------------|--------------------------|---------------------|-----|
| face | Facebook | | ¥¥n | ... |
| twit | Twitter | | ¥n | ... |
| inst | Instagram | " | <br> | ... |
| pint | Pinterest | | ¥¥n | ... |
| ... | ... | ... | ... | ... |

F I G. 12A

COOPERATION TABLE

1200

| COOPERATION ID | CAMERA ID | TRANSMISSION DESTINATION ID | SHOOTING SETTING RELEASE FLAG | SHOOTING SETTING ITEM LIST | |
|---|---|---|---|---|---|
| rel001 | cam001 | face | true | [ssi001,ssi002,ssi004,ssi005] | ... |
| rel002 | cam001 | twit | false | [ssi001,ssi002,ssi004,ssi005] | ... |
| rel003 | cam001 | inst | true | [ssi001,ssi002,ssi004,ssi005,ssi006] | ... |
| rel004 | cam001 | pint | false | [ssi001,ssi002,ssi004,ssi005] | ... |
| rel005 | cam002 | twit | false | | ... |
| rel006 | cam002 | face | false | | ... |
| ... | ... | ... | ... | ... | ... |

FIG. 12B

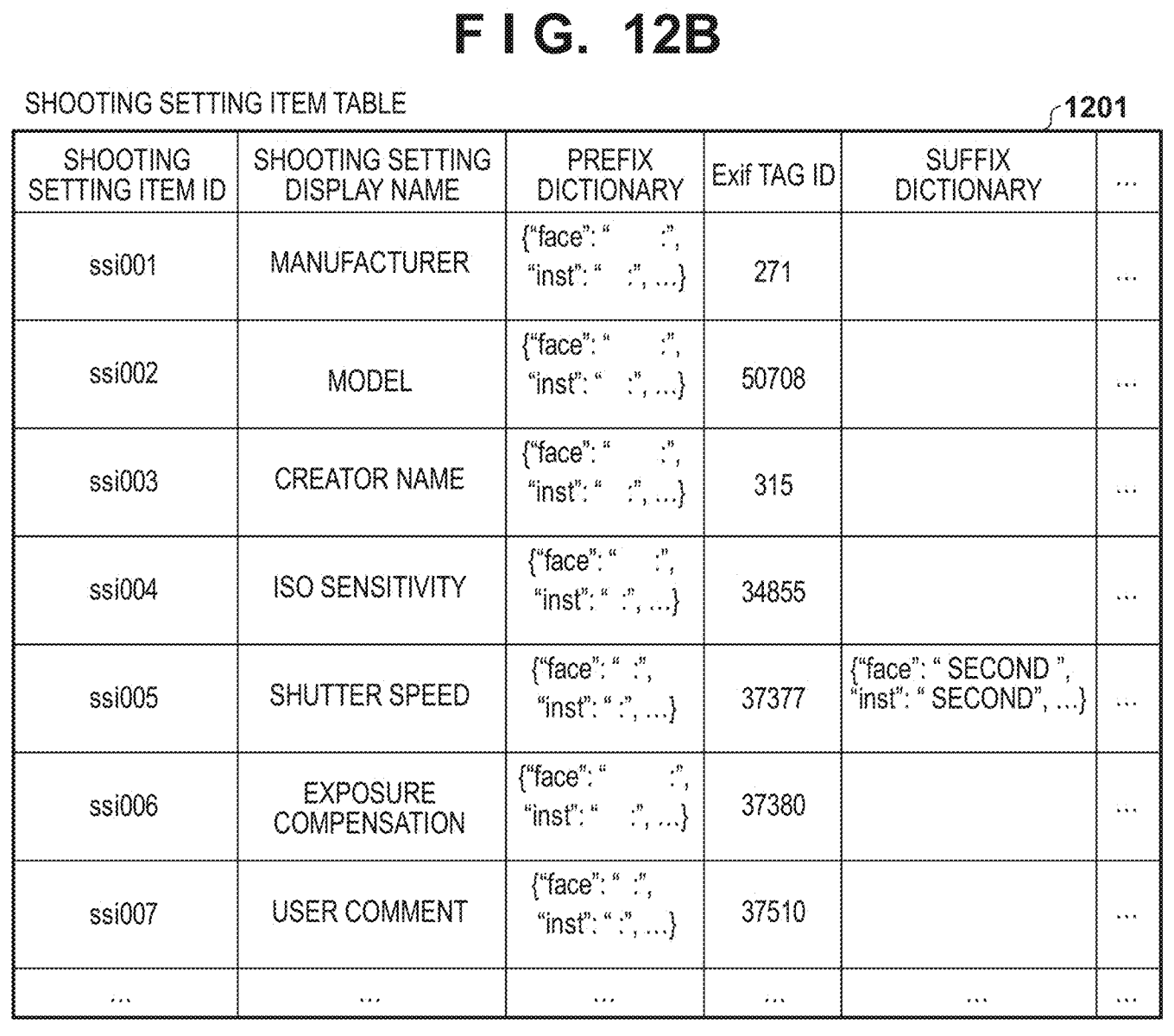

SHOOTING SETTING ITEM TABLE

1201

| SHOOTING SETTING ITEM ID | SHOOTING SETTING DISPLAY NAME | PREFIX DICTIONARY | Exif TAG ID | SUFFIX DICTIONARY | : |
|---|---|---|---|---|---|
| ssi001 | MANUFACTURER | {"face": " ", "inst": " ", ...} | 271 | | : |
| ssi002 | MODEL | {"face": " ", "inst": " ", ...} | 50708 | | : |
| ssi003 | CREATOR NAME | {"face": " ", "inst": " ", ...} | 315 | | : |
| ssi004 | ISO SENSITIVITY | {"face": " ", "inst": " ", ...} | 34855 | | : |
| ssi005 | SHUTTER SPEED | {"face": " ", "inst": " ", ...} | 37377 | {"face": " SECOND ", "inst": " SECOND", ...} | : |
| ssi006 | EXPOSURE COMPENSATION | {"face": " ", "inst": " ", ...} | 37380 | | : |
| ssi007 | USER COMMENT | {"face": " ", "inst": " ", ...} | 37510 | | : |
| : | : | : | : | : | : |

F I G. 13B

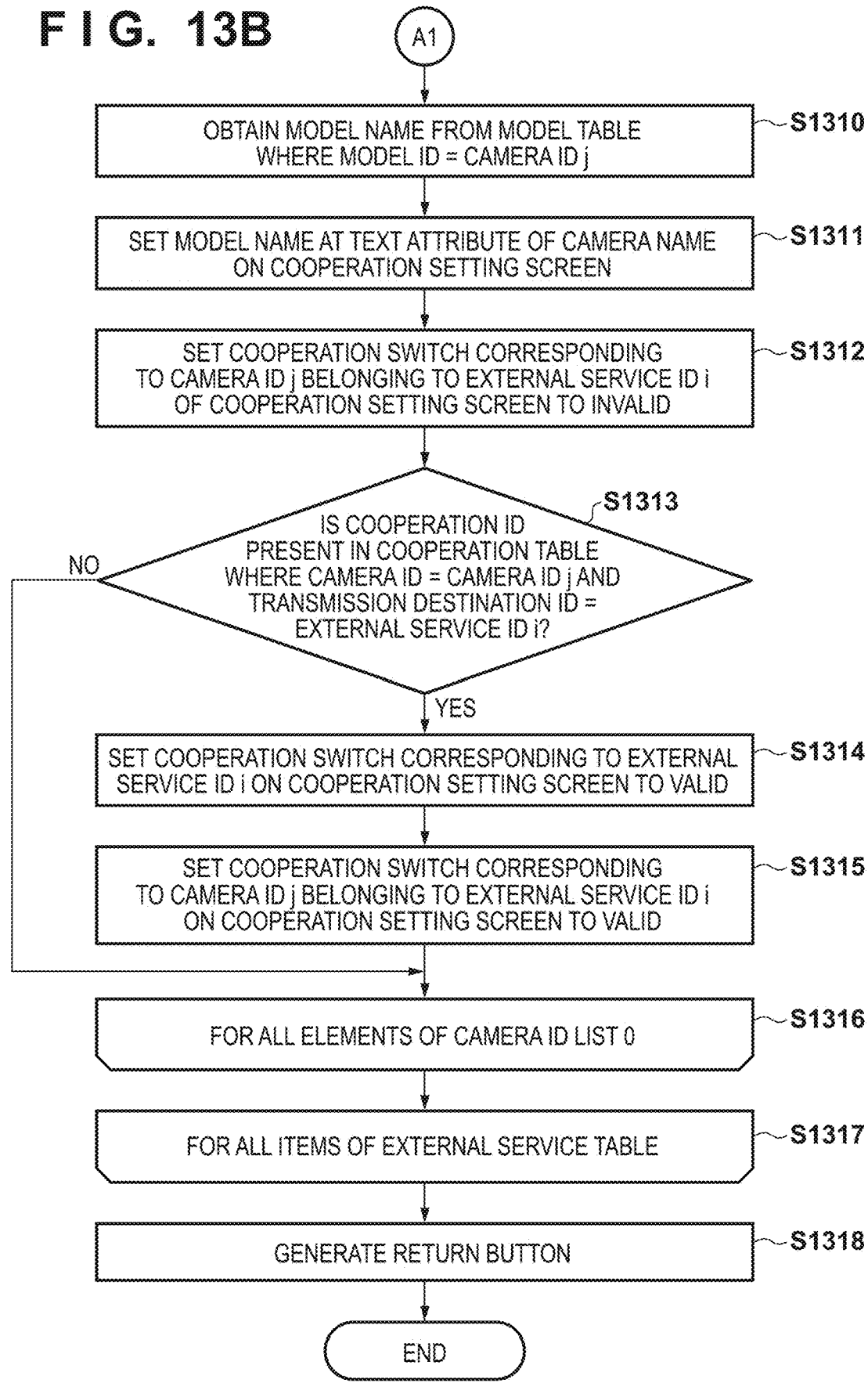

A1

OBTAIN MODEL NAME FROM MODEL TABLE
WHERE MODEL ID = CAMERA ID j  ～S1310

SET MODEL NAME AT TEXT ATTRIBUTE OF CAMERA NAME
ON COOPERATION SETTING SCREEN  ～S1311

SET COOPERATION SWITCH CORRESPONDING
TO CAMERA ID j BELONGING TO EXTERNAL SERVICE ID i
OF COOPERATION SETTING SCREEN TO INVALID  ～S1312

IS COOPERATION ID
PRESENT IN COOPERATION TABLE
WHERE CAMERA ID = CAMERA ID j AND
TRANSMISSION DESTINATION ID =
EXTERNAL SERVICE ID i?  ～S1313

NO

YES

SET COOPERATION SWITCH CORRESPONDING TO EXTERNAL
SERVICE ID i ON COOPERATION SETTING SCREEN TO VALID  ～S1314

SET COOPERATION SWITCH CORRESPONDING
TO CAMERA ID j BELONGING TO EXTERNAL SERVICE ID i
ON COOPERATION SETTING SCREEN TO VALID  ～S1315

FOR ALL ELEMENTS OF CAMERA ID LIST 0  ～S1316

FOR ALL ITEMS OF EXTERNAL SERVICE TABLE  ～S1317

GENERATE RETURN BUTTON  ～S1318

END

F I G. 14
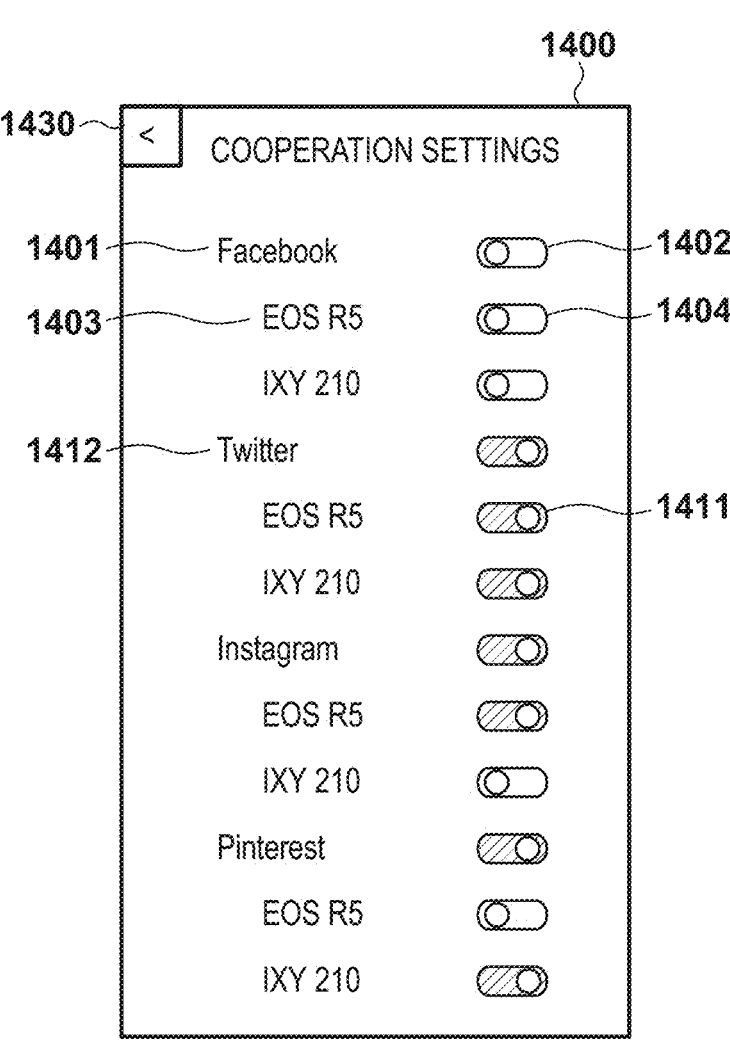

F I G. 15A
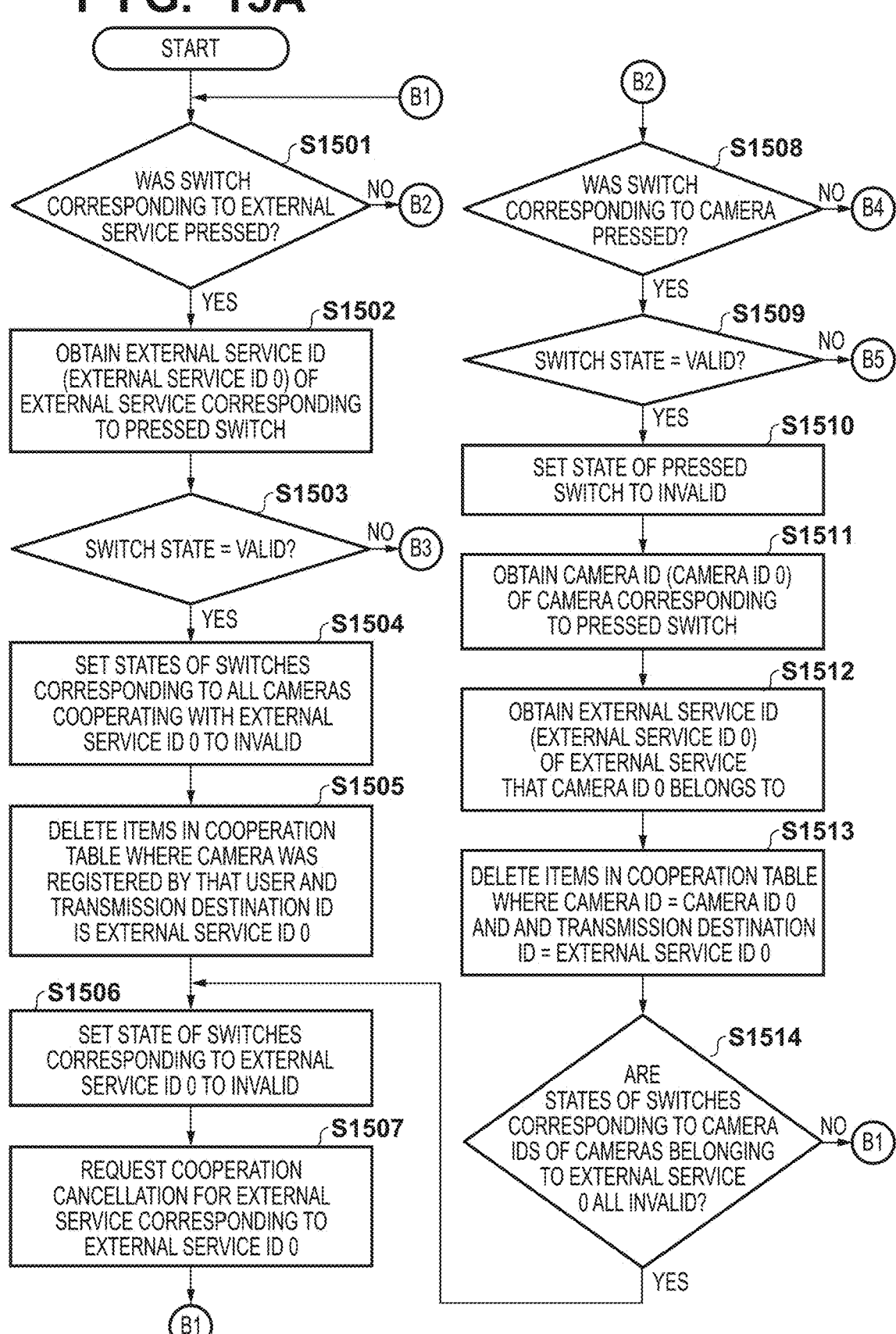

F I G. 15B
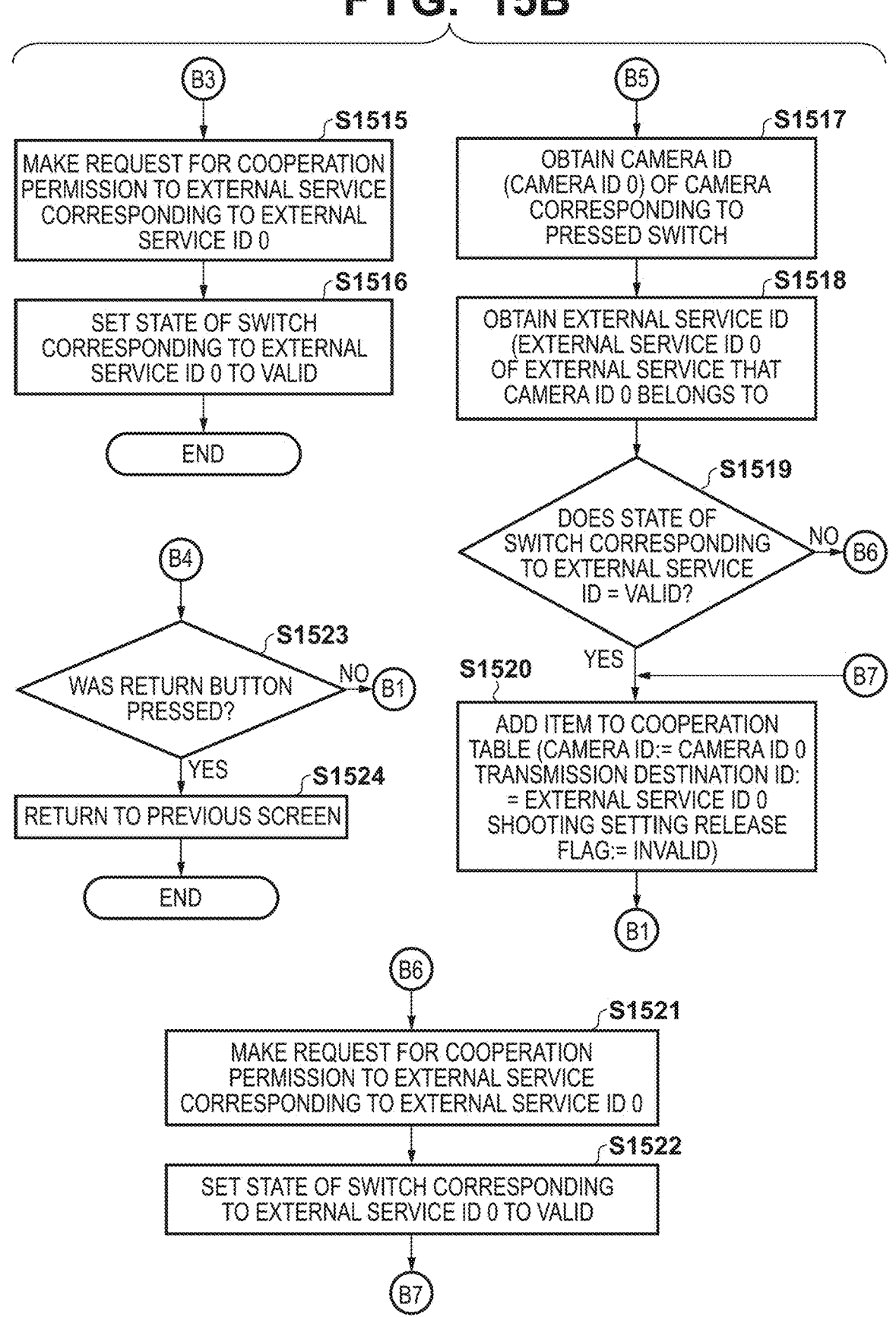

F I G.  16
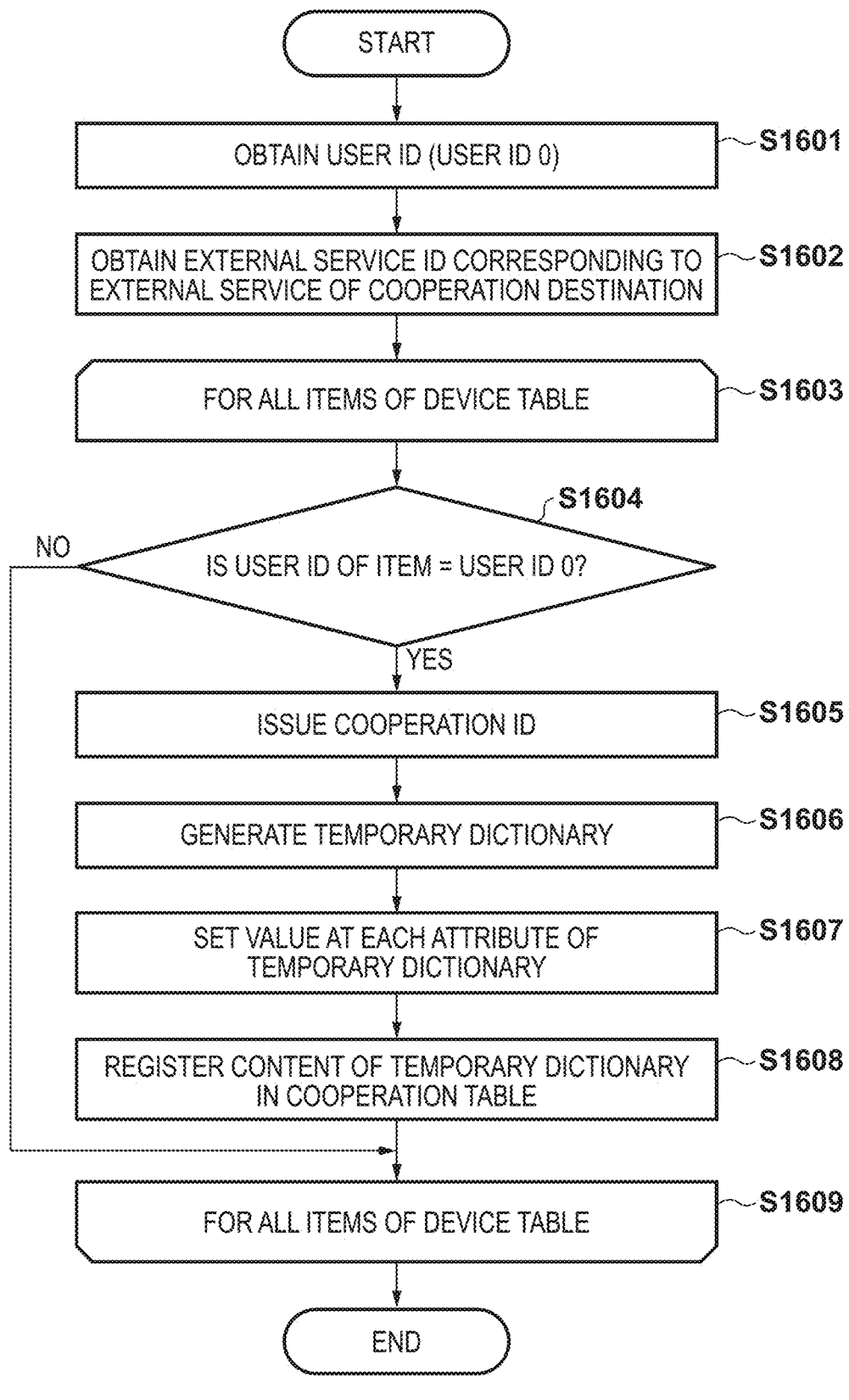

F I G. 17
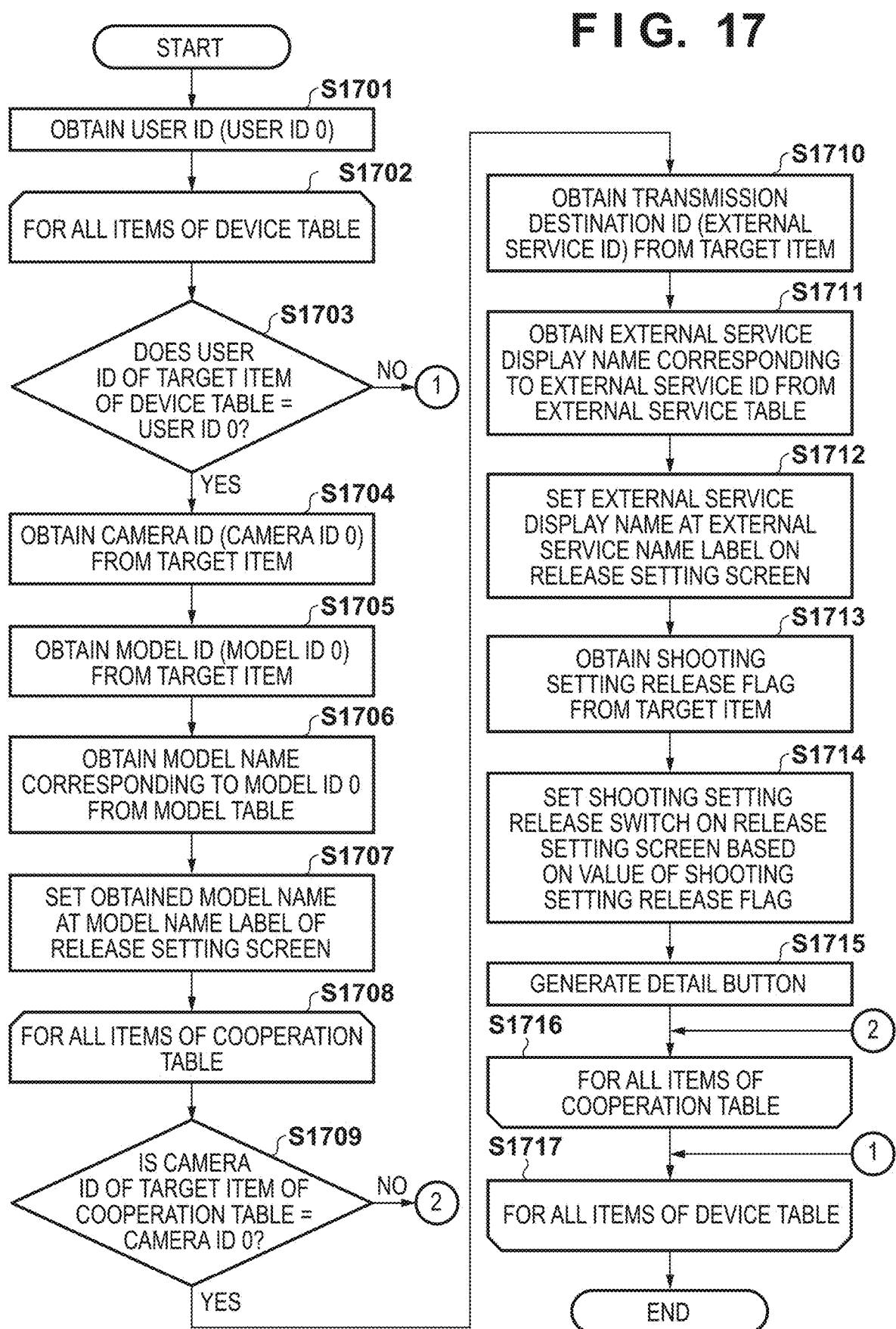

F I G.  18
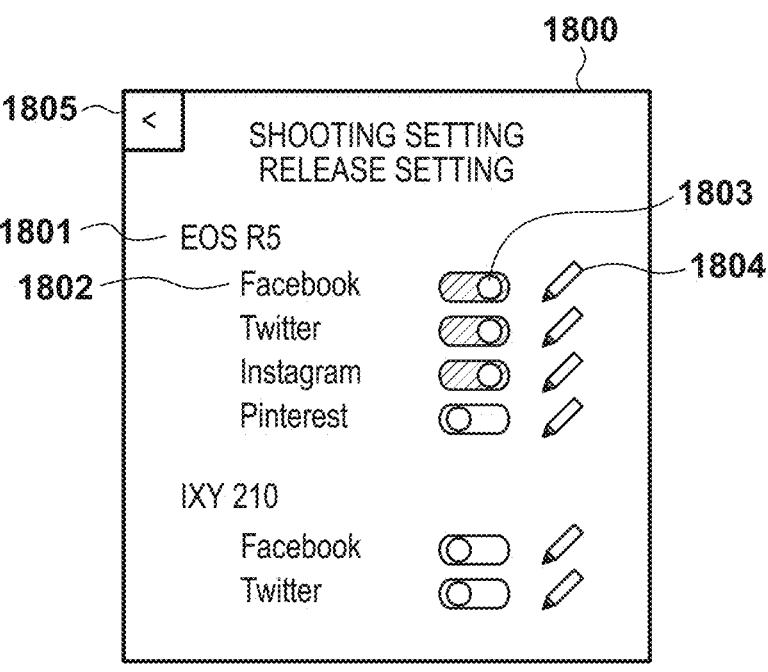

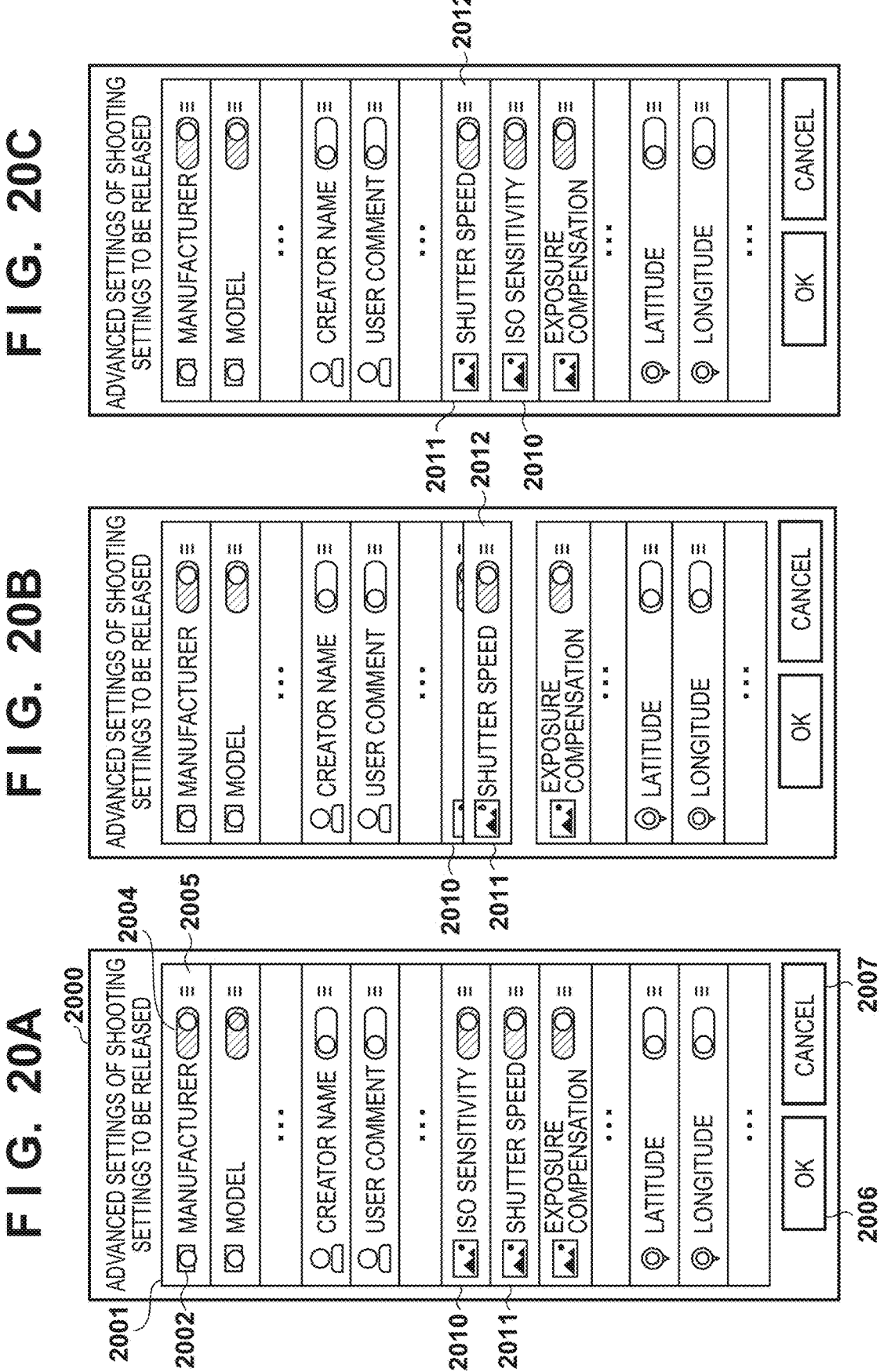
F I G. 20A
F I G. 20B
F I G. 20C

F I G.  21
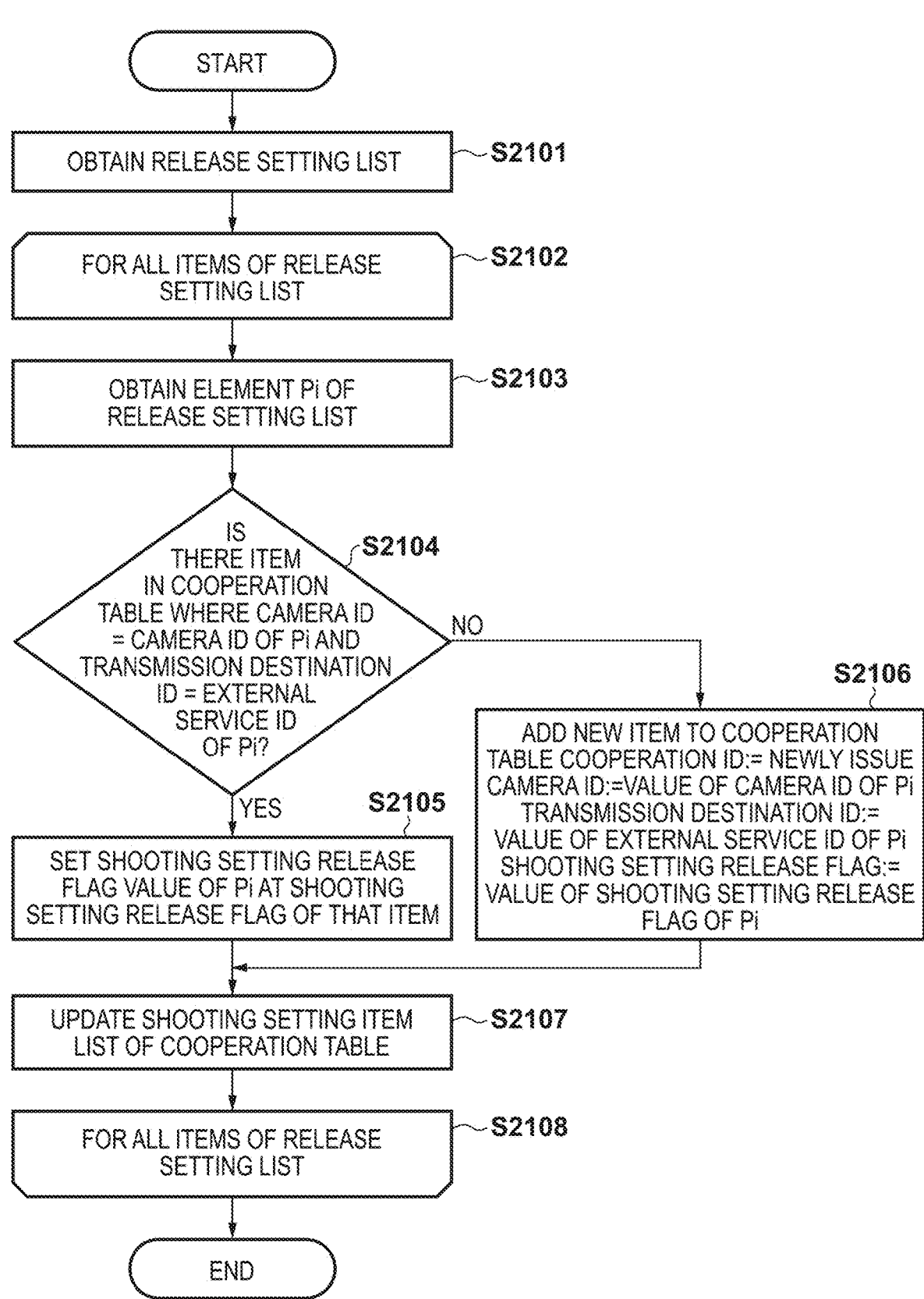

F I G.  22
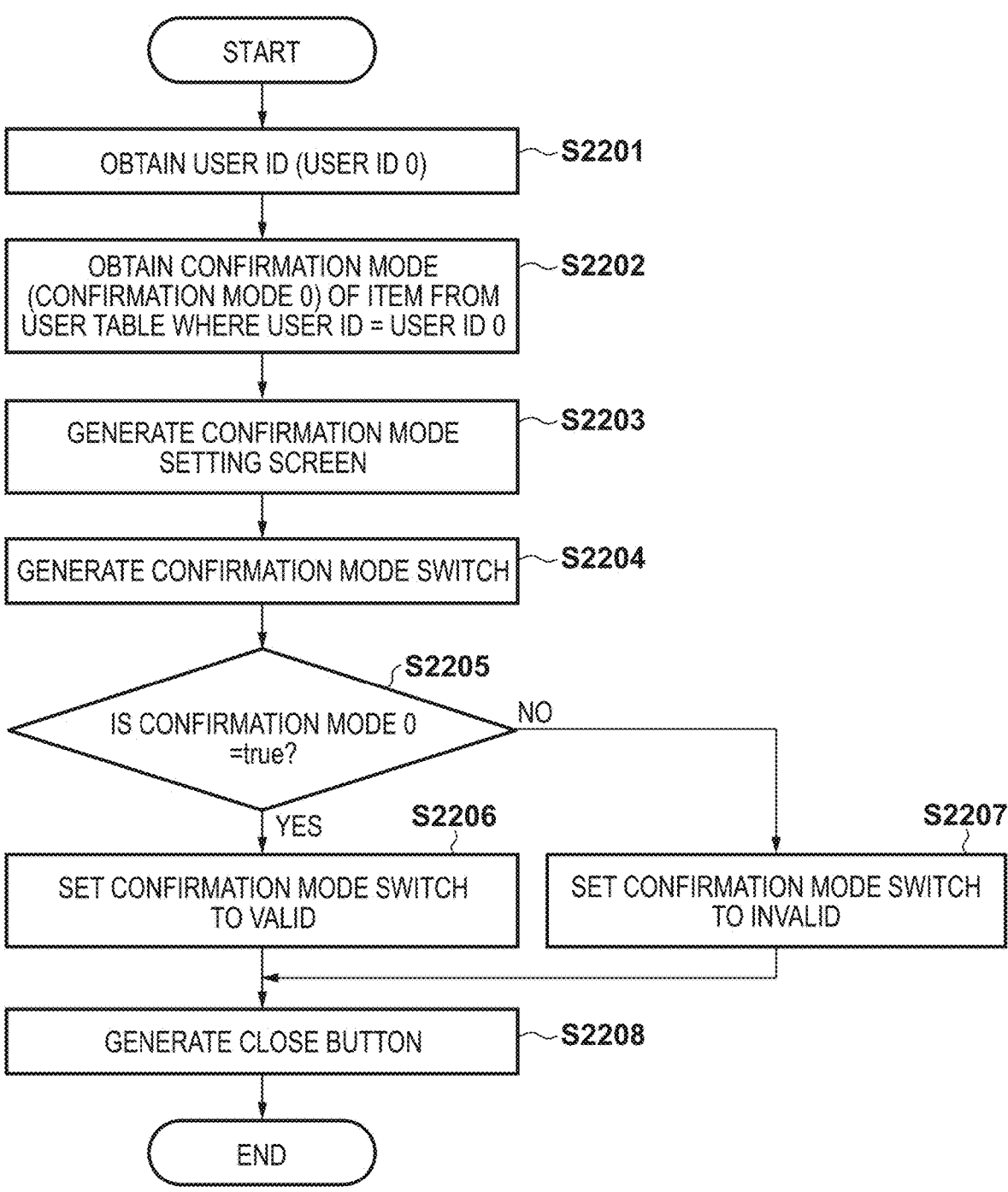

F I G. 23
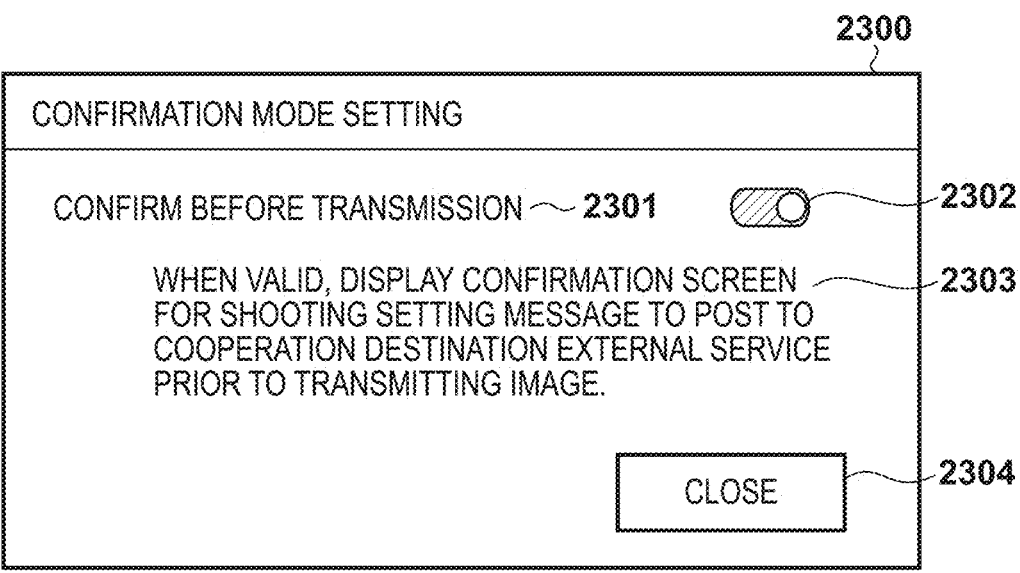
F I G. 24
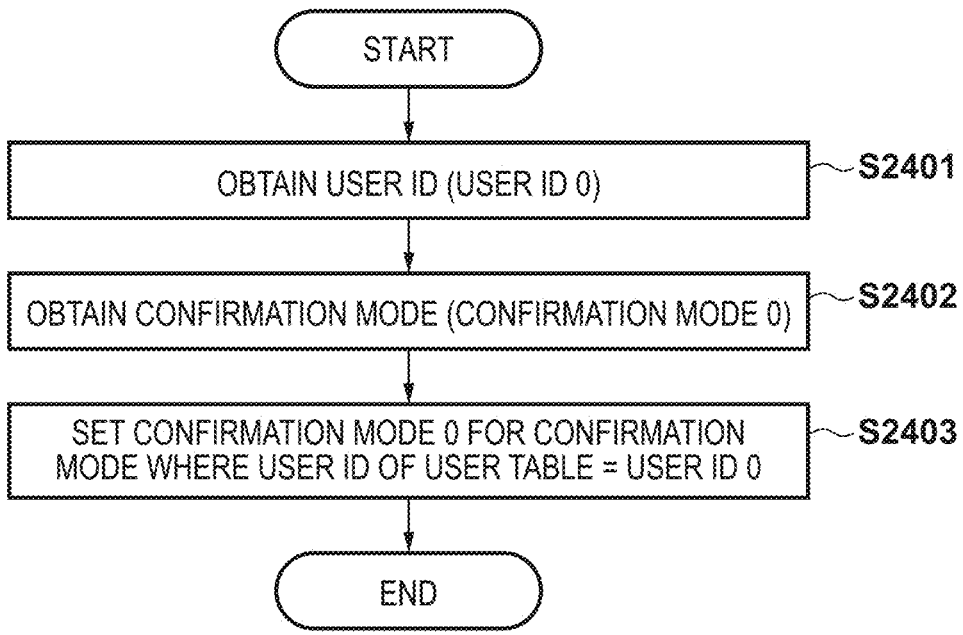

F I G.  26
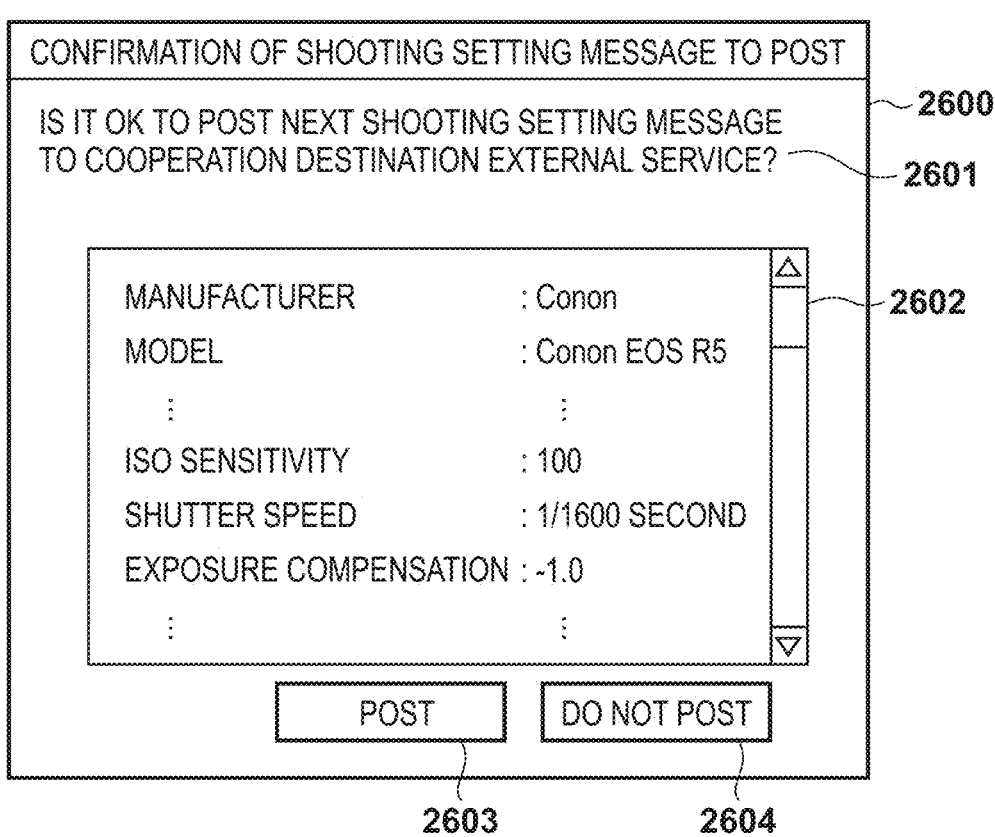

F I G. 29B (C1)

Figures 29B, 29C:
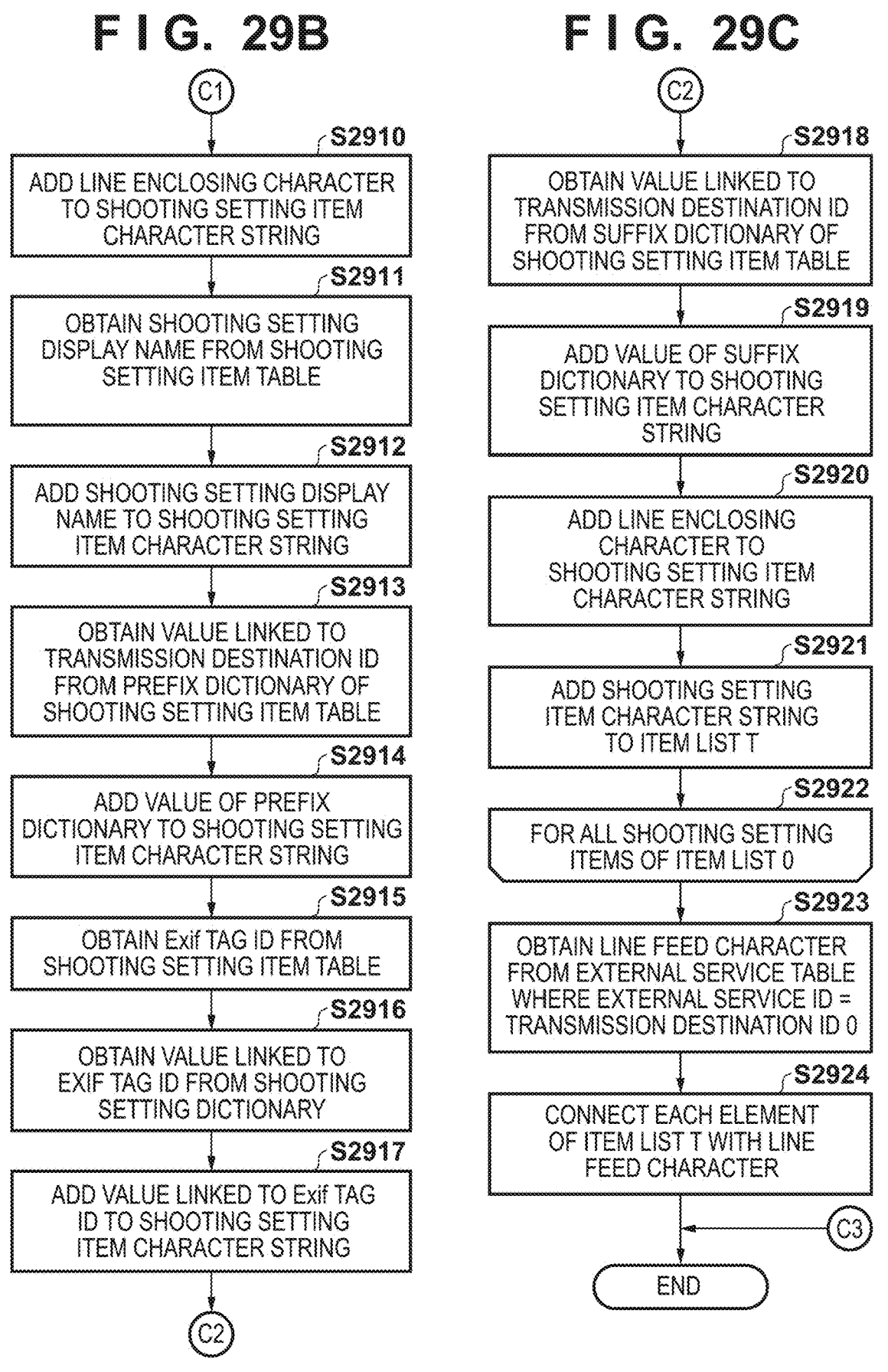

S2910
ADD LINE ENCLOSING CHARACTER TO SHOOTING SETTING ITEM CHARACTER STRING

S2911
OBTAIN SHOOTING SETTING DISPLAY NAME FROM SHOOTING SETTING ITEM TABLE

S2912
ADD SHOOTING SETTING DISPLAY NAME TO SHOOTING SETTING ITEM CHARACTER STRING

S2913
OBTAIN VALUE LINKED TO TRANSMISSION DESTINATION ID FROM PREFIX DICTIONARY OF SHOOTING SETTING ITEM TABLE

S2914
ADD VALUE OF PREFIX DICTIONARY TO SHOOTING SETTING ITEM CHARACTER STRING

S2915
OBTAIN Exif TAG ID FROM SHOOTING SETTING ITEM TABLE

S2916
OBTAIN VALUE LINKED TO EXIF TAG ID FROM SHOOTING SETTING DICTIONARY

S2917
ADD VALUE LINKED TO Exif TAG ID TO SHOOTING SETTING ITEM CHARACTER STRING (C2)

F I G. 29C (C2)

S2918
OBTAIN VALUE LINKED TO TRANSMISSION DESTINATION ID FROM SUFFIX DICTIONARY OF SHOOTING SETTING ITEM TABLE

S2919
ADD VALUE OF SUFFIX DICTIONARY TO SHOOTING SETTING ITEM CHARACTER STRING

S2920
ADD LINE ENCLOSING CHARACTER TO SHOOTING SETTING ITEM CHARACTER STRING

S2921
ADD SHOOTING SETTING ITEM CHARACTER STRING TO ITEM LIST T

S2922
FOR ALL SHOOTING SETTING ITEMS OF ITEM LIST 0

S2923
OBTAIN LINE FEED CHARACTER FROM EXTERNAL SERVICE TABLE WHERE EXTERNAL SERVICE ID = TRANSMISSION DESTINATION ID 0

S2924
CONNECT EACH ELEMENT OF ITEM LIST T WITH LINE FEED CHARACTER (C3)

END

F I G.  30AB
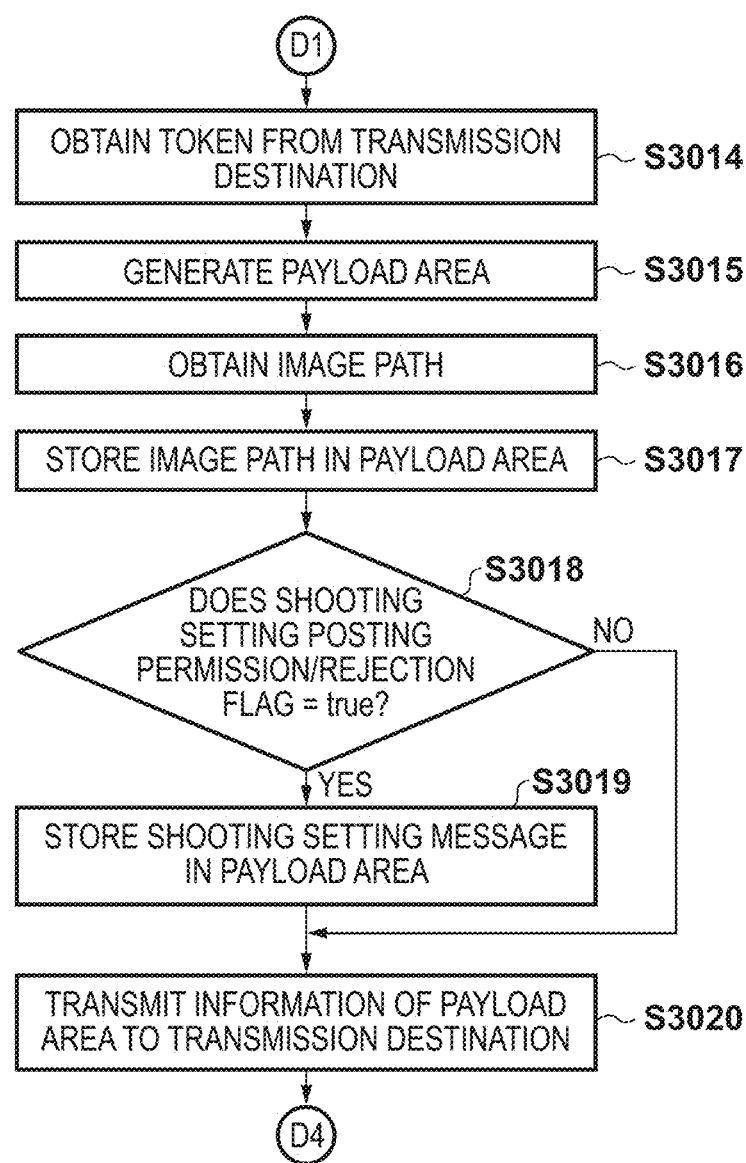

FIG. 30BA (D2)
face

OBTAIN TOKEN FROM TRANSMISSION DESTINATION — S3021

CALCULATE IMAGE FILE SIZE — S3022

OBTAIN IMAGE TYPE — S3023

TRANSMIT TOKEN, IMAGE FILE SIZE, AND IMAGE TYPE, AND GENERATE IMAGE STORAGE AREA — S3024

OBTAIN IMAGE PATH — S3025

TRANSMIT TOKEN AND IMAGE PATH — S3026

S3027
DOES SHOOTING SETTING POSTING PERMISSION/ REJECTION FLAG = true?    NO

YES

S3028
IS UPLOAD COMPLETE?    NO

YES

OBTAIN IMAGE REFERENCE DESTINATION — S3029

TRANSMIT SHOOTING SETTING MESSAGE AS IMAGE REFERENCE DESTINATION COMMENT — S3030

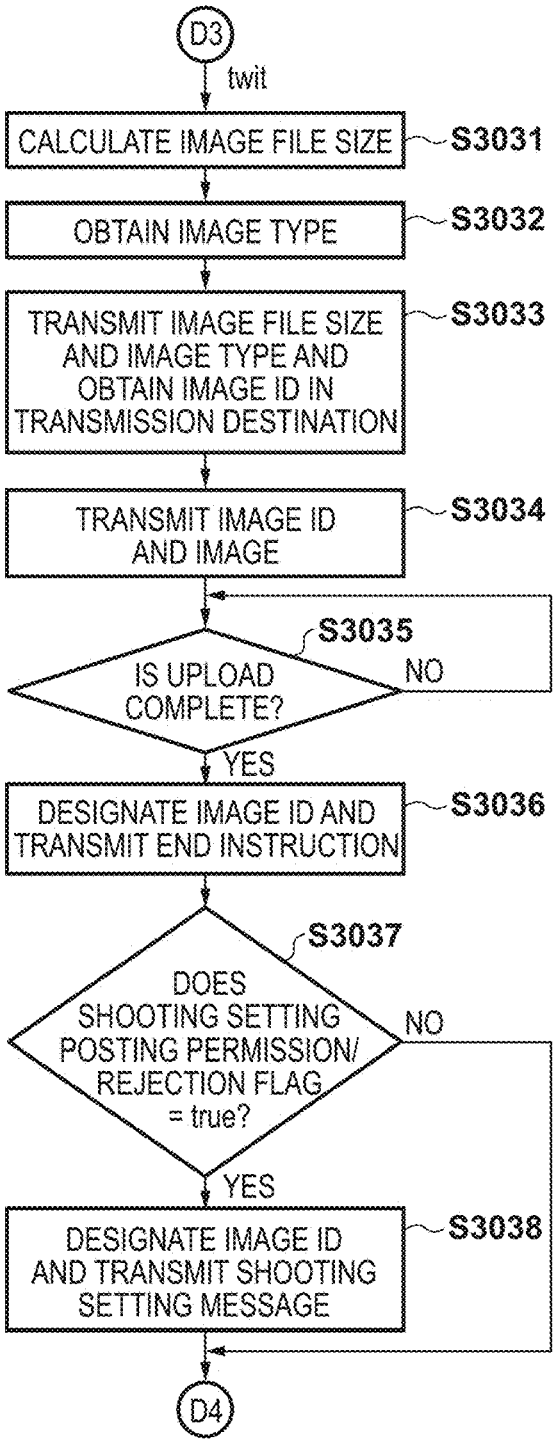

(D3)
twit

CALCULATE IMAGE FILE SIZE — S3031

OBTAIN IMAGE TYPE — S3032

TRANSMIT IMAGE FILE SIZE AND IMAGE TYPE AND OBTAIN IMAGE ID IN TRANSMISSION DESTINATION — S3033

TRANSMIT IMAGE ID AND IMAGE — S3034

S3035
IS UPLOAD COMPLETE?    NO

YES

DESIGNATE IMAGE ID AND TRANSMIT END INSTRUCTION — S3036

S3037
DOES SHOOTING SETTING POSTING PERMISSION/ REJECTION FLAG = true?    NO

YES

DESIGNATE IMAGE ID AND TRANSMIT SHOOTING SETTING MESSAGE — S3038

(D4)

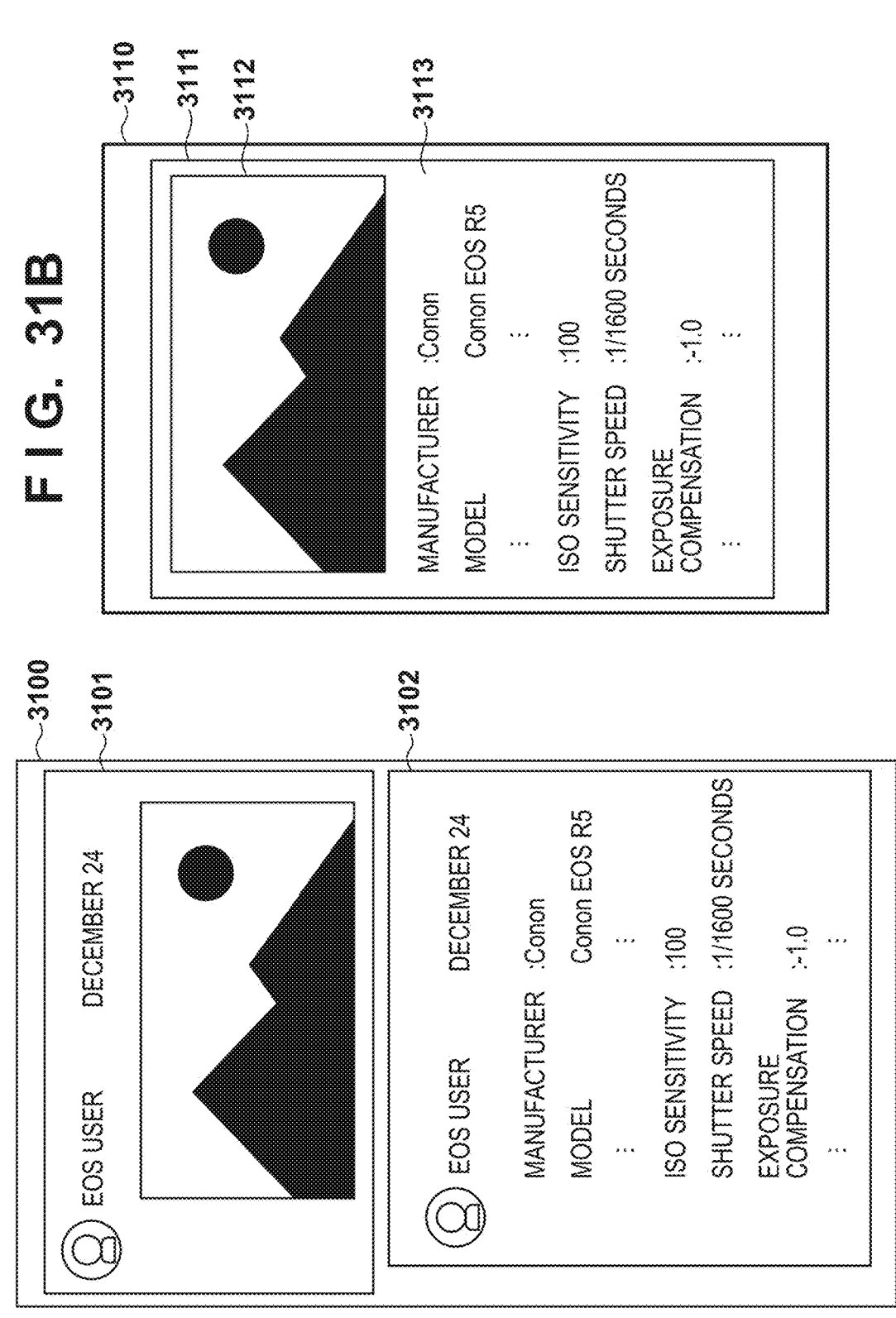
F I G. 31B
F I G. 31A

3200

3201

3202

3203

INFORMATION PROCESSING APPARATUS, INFORMATION PROCESSING APPARATUS CONTROL METHOD, IMAGE MANAGEMENT SYSTEM, AND STORAGE MEDIUM

BACKGROUND OF THE INVENTION

Field of the Invention

The present invention relates to an information processing apparatus, an information processing apparatus control method, an image management system, and a storage medium.

Description of the Related Art

Recently, a storage service that stores data uploaded by a user is being widely used. An example of such a storage service is a photo storage service that limits storage targets to images and movies (to be collectively referred to as images hereinafter) and is specialized in management of them (https://image.canon/). In a photo storage service of this type, a camera of a registered user is registered in the account of the user so that an image received from the camera can be saved in the storage area of the registered user. Further, in the photo storage service, an image transmitted from the camera can be saved in the storage area of the registered user and can also be automatically transferred to the storage area of the registered user in another storage service (https://image.canon/st/ja/features.html). In addition, if the account of the photo storage service and that of an external cloud storage service (to be referred to as an external service hereinafter) are configured to cooperate, an image uploaded from the camera to the photo storage service can be transferred to the external service. This can save the trouble of an operation requested of the user to upload an image to the external service.

These days, many posts release shooting settings at the post comments of shot images in the release of captured images using social media such as a Social Networking Service (SNS). However, an external service such as SNS has a specification in which some or all of shooting settings attached to an uploaded captured image are deleted and then the uploaded captured image is released. To release the shooting settings, the user needs to perform cumbersome procedures as follows. That is, the user transfers a captured image from the camera to the external service via the photo storage service, and searches posted captured images for an image for which shooting settings are to be released. Then, the user logs in his/her account of the external service, and while watching shooting settings displayed on the back surface of the camera, manually inputs shooting settings in a post comment and posts them.

SUMMARY OF THE INVENTION

The present disclosure provides a technique capable of reducing a user operation when releasing shooting settings in an external service.

According to one aspect of the present invention, there is provided an information processing apparatus that provides an image received from an external apparatus to an external service in accordance with an instruction of a post by a user, comprising: an obtaining unit configured to obtain shooting information supplementary to the image received from the external apparatus; a generation unit configured to generate, based on the shooting information and information about the external service serving as a providing destination of the image, a message representing a shooting setting of the image in a form suited to the post to the external service serving as the providing destination; and a providing unit configured to associate the image and the message, and provide the image and the message to the external service serving as the providing destination.

Further features of the present invention will become apparent from the following description of exemplary embodiments (with reference to the attached drawings).

BRIEF DESCRIPTION OF THE DRAWINGS

FIG. 1 is a view showing an outline of an image management system according to an embodiment;

FIG. 4 is a block diagram showing an example of the hardware configuration of an image capturing apparatus;

FIG. 5 is a block diagram showing an example of the hardware configuration of an image management apparatus;

FIG. 6 is a block diagram showing an example of the functional configuration of the image management system (image capturing apparatus and image management apparatus);

FIG. 8 is a sequence chart showing an example of a sequence of processing in the image management system;

FIG. 10 is a view showing an example of a release setting list;

FIGS. 11A, 11B, 11C, and 11D are tables showing an example of the data structures of various tables;

FIGS. 12A and 12B are tables showing an example of the data structures of various tables;

FIG. 13B is a flowchart showing the example of processing by the cooperation setting screen generation unit;

FIG. 14 is a view showing an example of a cooperation setting screen;

FIG. 15A is a flowchart showing an example of processing by a cooperation request unit;

FIG. 15B is a flowchart showing the example of processing by the cooperation request unit;

FIG. 16 is a flowchart showing an example of processing by a cooperation registration unit;

FIG. 17 is a flowchart showing an example of processing by a release setting screen generation unit;

FIG. 18 is a view showing an example of a release setting screen;

FIGS. 20A, 20B, and 20C are views showing an example of an advanced setting screen;

FIG. 21 is a flowchart showing an example of processing by a release setting registration unit;

FIG. 22 is a flowchart showing an example of processing by a confirmation mode setting screen generation unit;

FIG. 23 is a view showing an example of a confirmation mode setting screen;

FIG. 24 is a flowchart showing an example of processing by a confirmation mode setting unit;

FIG. 26 is a view showing an example of a confirmation screen;

FIGS. 29A, 29B and 29C are a flowchart showing an example of processing by a generation unit;

FIGS. 30BA and 30BB is a flowchart showing the example of processing by the transmission unit;

FIGS. 31A and 31B are views showing examples of a display in an external service after posting.

DESCRIPTION OF THE EMBODIMENTS

Figures 2, 3:
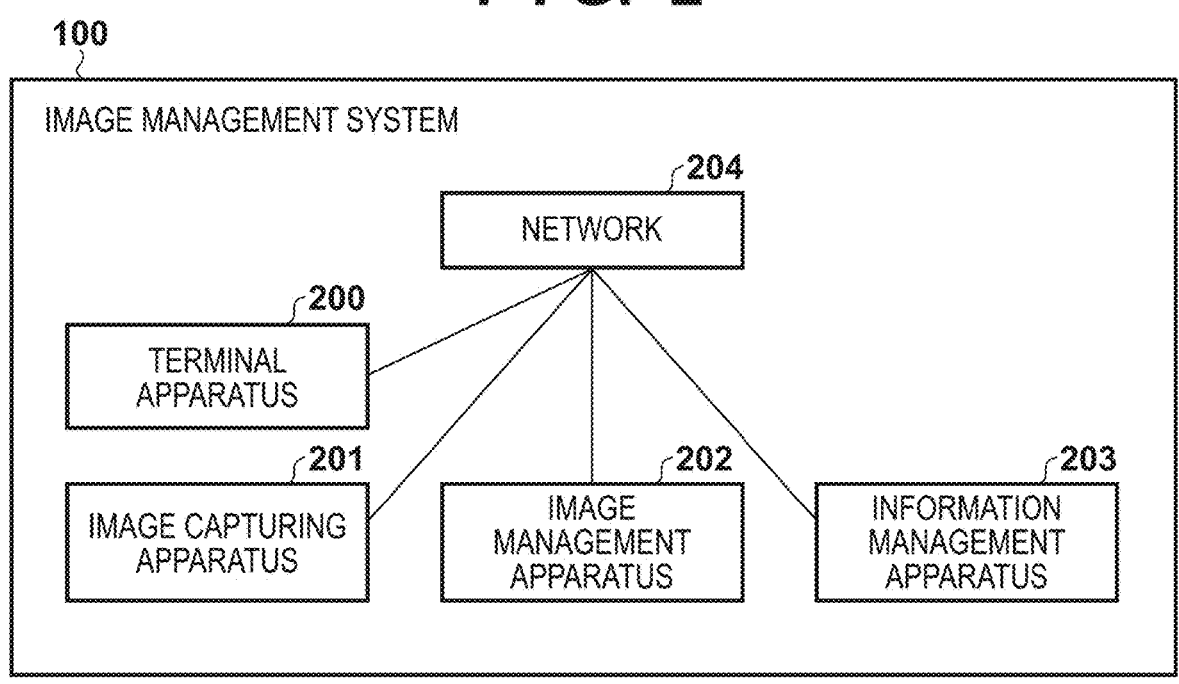
FIG. 2 is a block diagram showing an example of the system configuration of the image management system according to the embodiment.
FIG. 3 is a block diagram showing an example of the hardware configuration of a mobile terminal.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

<Outline of Image Management System 100>

FIG. 1 is a view for explaining an outline of an image management system 100 according to an embodiment. As shown in FIG. 1, the image management system 100 includes a camera 101, a mobile terminal 102, a photo storage service 103, a first external service 104, a second external service 105, and various terminals 106 to 109. A user 120 owns the mobile terminal 102 and the camera 101 and registers an account in the photo storage service 103, the first external service 104, and the second external service 105. Users 121 to 124 own the terminals 106 to 109, respectively, and can browse posts of the first or second external service.

A storage 131 stores an image uploaded by a user to the photo storage service 103. A database 132 manages various tables 133 used by the photo storage service 103. Details of the tables 133 managed in the database 132 will be described later with reference to FIGS. 11A to 11D, 12A, and 12B. The user 120 performs user registration in the photo storage service 103 in advance using the mobile terminal 102. Also, the user 120 registers the camera 101 in the photo storage service 103 using the mobile terminal 102, and the photo storage service 103 saves in the storage 131 a shot image (to be referred to as an image hereinafter) transmitted from the camera 101. Further, the user 120 permits the photo storage service 103 using the mobile terminal 102 to transmit an image to the first external service 104 and the second external service 105. The user 120 sets the photo storage service 103 using the mobile terminal 102 to enable a release setting of releasing a transmitted image in the external service.

Next, a sequence of an operation in the image management system 100 in the above-described state will be explained. When the user 120 transmits an image 130 shot with the camera 101 to the photo storage service 103, the photo storage service 103 saves the received image in the storage 131. The photo storage service 103 extracts information (for example, Exif) of shooting settings supplementary to the image, and generates a shooting setting message 134 by looking up the tables 133 managed in the database 132. Note that the shooting setting message is a character string representing shooting settings, which is obtained by processing shooting settings into a readable form suited to an external service serving as an image post destination (providing destination). The photo storage service 103 associates the image and the shooting setting message, and it provides them to the first external service 104 and the second external service 105, respectively. In the example of FIG. 1, when the providing destination is the first external service 104, the image and the shooting setting message are provided separately. When the providing destination is the second external service 105, the image and the shooting setting message are provided simultaneously. The difference in the providing method is based on the difference in the specifications of the external service, details of which will be described later with reference to, for example, FIGS. 30AA and 30AB and FIGS. 30BA and 30BB. Each of the first external service 104 and the second external service 105 releases the shooting setting message, and an image obtained by deleting shooting settings from the provided image. Each of the users 121 to 124 accesses the first external service 104 or the second external service 105 via a corresponding one of the terminals 106 to 109 and can browse the shooting settings of the image 130. This is an outline of the mechanism in which the image management system 100 allows a user browsing an external service to browse the shooting settings of a captured image even via the external service.

<System Configuration of Image Management System 100>

FIG. 2 is a block diagram showing an example of the apparatus configuration of the image management system 100 according to the embodiment. As shown in FIG. 2, the image management system 100 includes a terminal apparatus 200, an image capturing apparatus 201, an image management apparatus 202, an information management apparatus 203, and a network 204. The terminal apparatus 200, the image capturing apparatus 201, the image management apparatus 202, and the information management apparatus 203 correspond to the mobile terminal 102, the camera 101, the photo storage service 103, and the first external service 104 (or the second external service 105) in FIG. 1, respectively. Each of the terminal apparatus 200, the image management apparatus 202, and the information management apparatus 203 is constituted by an information processing apparatus.

The terminal apparatus 200, the image capturing apparatus 201, the image management apparatus 202, and the information management apparatus 203 are connected to be able to communicate via the network 204. The network 204 is implemented by, for example, a Local Area Network (LAN) or the Internet, and enables mutual communication between connected devices. Note that as the terminal apparatus 200, a smartphone, tablet, Personal Computer (PC), or the like having the communication function is assumed. As the image capturing apparatus 201, a lens-interchangeable digital camera having the communication function is assumed, but the image capturing apparatus 201 is not limited to this. For example, any apparatus is available as long as the apparatus is a terminal capable of transmitting an image to the image management apparatus 202, such as a compact digital camera having the communication function, or a smartphone, tablet, or PC having the communication function and the camera function. The terminal apparatus 200 and the image capturing apparatus 201 may be implemented by the same apparatus.

<Hardware Configuration of Terminal Apparatus 200>

FIG. 3 is a block diagram showing an example of the hardware configuration of an information processing apparatus serving as the terminal apparatus 200. The terminal apparatus 200 includes a CPU 302, a ROM 303, a RAM 304, an input/output device 305, a secondary storage device 306, a network I/F 307, and an image capturing device 308. The respective units are connected to each other via a bus 309.

The CPU 302 is an arithmetic processing unit that executes a program stored in the ROM 303 or the secondary storage device 306 and controls the respective units connected via the bus 309. The ROM 303 is a read only memory that stores an OS and the like. The RAM 304 is a random access memory that temporarily stores data when the CPU 302 executes arithmetic processing. The input/output device 305 performs display output of a UI screen and the like, and accepts various input operations from a user. The secondary storage device 306 stores various programs, set value data, captured image data obtained by the image capturing device 308, and the like. The network I/F 307 is an interface for connecting to a network such as a Local Area Network (LAN), an intranet, or the Internet. The image capturing device 308 includes an optical system such as a lens and an image sensor such as a Complementary Metal Oxide Semiconductor (CMOS) or a Charge Coupled Device (CCD). The image capturing device 308 converts light received by the image sensor into an electrical signal to generate an image and record it in the secondary storage device 306.

<Hardware Configuration of Image Capturing Apparatus 201>

FIG. 4 is a block diagram showing an example of the hardware configuration of the image capturing apparatus 201. The image capturing apparatus 201 includes a CPU 402, a ROM 403, a RAM 404, a display 405, an input device 406, a secondary storage device 407, a network I/F 408, and an image capturing device 409. The respective units are connected to each other via a bus 410.

The CPU 402 is an arithmetic processing unit that executes a program stored in the ROM 403 or the secondary storage device 407 and controls the respective units connected via the bus 410. The ROM 403 is a read only memory that stores an OS and the like. The RAM 404 is a random access memory that temporarily stores data when the CPU 402 executes arithmetic processing. The display 405 displays information necessary for a user, such as a captured image, various UI screens, and the like. The input device 406 includes buttons, a touch panel, and the like, and accepts various user operations such as a shooting instruction and various setting instructions. The secondary storage device 407 stores various programs, captured image data, the set values of shooting settings included in supplementary information, and the like. Note that the shooting settings are the ISO sensitivity, shutter speed, exposure compensation, f-number, and the like. The network I/F 408 is an interface for connecting to a network such as a Local Area Network (LAN), an intranet, or the Internet. The image capturing device 409 converts light received by an image sensor such as a CCD or a CMOS into an electrical signal to generate an image and record it in the secondary storage device 407.

<Hardware Configuration of Image Management Apparatus 202>

FIG. 5 is a block diagram showing an example of the hardware configuration of an information processing apparatus serving as the image management apparatus 202. The image management apparatus 202 includes a CPU 502, a ROM 503, a RAM 504, a display 505, a keyboard 506, a secondary storage device 507, a network I/F 508, and a pointing device 509. The respective units are connected to each other via a bus 510.

The CPU 502 is an arithmetic processing unit that executes a program stored in the ROM 503 or the secondary storage device 507 and controls the respective units connected via the bus 510. The ROM 503 is a read only memory that stores an OS and the like. The RAM 504 is a memory that temporarily stores data when the CPU 502 executes arithmetic processing. The display 505 is a display device that displays a UI screen and the like. The keyboard 506 and the pointing device 509 are input devices for performing various input operations by a user. The secondary storage device 507 stores various programs and set value data. The secondary storage device 507 also functions as the storage 131 and the database 132, and stores a captured image received from the image capturing apparatus 201, various tables, and the like. The network I/F 508 is an interface for connecting to a network such as a Local Area Network (LAN), an intranet, or the Internet.

<Functional Configuration of Image Management System 100>

Next, the functional configuration of the image management system 100 according to the embodiment will be explained with reference to FIG. 6.

<<Functional Configuration of Image Capturing Apparatus 201>>

Each functional unit of the image capturing apparatus 201 shown in FIG. 6 is implemented by executing, by the CPU 402, a program stored in the ROM 403 or the secondary storage device 407. Each functional unit of the image capturing apparatus 201 will be explained below.

A control unit 600 controls execution of each functional unit of the image capturing apparatus 201, delivery of data between the functional units, and the like. An input unit 601 accepts an input operation from a user via the input device 406. A display unit 602 presents various kinds of information to the user using the display 405. A communication unit 603 performs communication for exchanging data with the image management apparatus 202 via the network 204 using the network I/F 408. A holding unit 604 holds control programs, set values, captured images in the secondary storage device 407. An image capturing unit 605 executes image capturing using the image capturing device 409 and generates a captured image (to be also simply referred to as an image hereinafter). A confirmation mode determination unit 606 determines a confirmation mode. Note that the confirmation mode is a setting of controlling whether to confirm, by a user, whether to transmit a shooting setting message to the information management apparatus 203 when transmitting an image from the image capturing apparatus 201 to the image management apparatus 202.

<<Functional Configuration of Image Management Apparatus 202>>

Each functional unit of the image management apparatus 202 shown in FIG. 6 is implemented by executing, by the CPU 502, a program stored in the ROM 503 or the secondary storage device 507. Each functional unit of the image management apparatus 202 will be explained below.

A control unit 610 controls each functional unit of the image management apparatus 202. A communication unit 611 performs communication for exchanging data with the terminal apparatus 200, the image capturing apparatus 201, and the information management apparatus 203 via the network 204 using the network I/F 508. A cooperation setting screen generation unit 612 generates a cooperation setting screen. The cooperation setting screen is a setting screen that accepts an instruction from a user regarding whether to transmit an image or a shooting setting message from the image management apparatus 202 to the information management apparatus 203. Details of processing of the cooperation setting screen generation unit 612 will be described later with reference to FIGS. 13A and 13B. Details of the cooperation setting screen will be described later with reference to FIG. 14. Note that a User Interface (UI) for accepting a cooperation setting from a user is not limited to a screen. For example, any UI can be applied to a UI for accepting a cooperation setting as long as the UI accepts an input from a user, such as a Character User Interface (CUI) or audio input. Not only the cooperation setting screen but also building elements regarding each setting screen (to be described later) are not limited to screens, and any UI is available as long as the UI accepts an input from a user.

A cooperation request unit 613 requests, of the information management apparatus 203, permission of a cooperation with the user of the terminal apparatus 200 based on a cooperation setting set on the cooperation setting screen of the terminal apparatus 200 (cooperation request). Details of processing in the cooperation request unit 613 will be described later with reference to FIGS. 15A and 15B. A cooperation registration unit 614 registers information of the information management apparatus 203 from which permission of cooperation has been received (cooperation with the user has been established). Details of processing by the cooperation registration unit 614 will be described later with reference to FIG. 16. A release setting screen generation unit 615 generates a release setting screen for prompting a user to set an external service in which shooting settings are released. Details of processing by the release setting screen generation unit 615 will be described later with reference to FIG. 17. Details of the release setting screen will be described later with reference to FIG. 18. An advanced setting screen generation unit 616 generates an advanced setting screen for prompting a user to individually set shooting setting items to be released. Details of processing by the advanced setting screen generation unit 616 will be described later with reference to FIG. 19. Details of the advanced setting screen will be described later with reference to FIGS. 20A, 20B, and 20C. A release setting registration unit 617 registers the release settings of shooting settings in a cooperation table (FIG. 12A). Details of processing by the release setting registration unit will be described later with reference to FIG. 21.

A confirmation mode setting screen generation unit 618 generates a confirmation mode setting screen for accepting a setting of the confirmation mode from a user. Details of processing by the confirmation mode setting screen generation unit 618 will be described later with reference to FIG. 22. Details of the confirmation mode setting screen will be described later with reference to FIG. 23. A confirmation mode setting unit 619 sets, in a user table, the setting of the confirmation mode accepted from a user. Details of processing by the confirmation mode setting unit 619 will be described later with reference to FIG. 24.

A posting unit 620 controls a supplementary information obtaining unit 621, a generation unit 622, and a transmission unit 623 to post, to an external service, an image and a shooting setting message representing the shooting settings of the image. The supplementary information obtaining unit

621 obtains shooting information (shooting settings) included in information supplementary to a received image. Based on the shooting settings represented by the shooting information, and information about an external service serving as an image providing destination (to be also referred to as a transmission destination hereinafter), the generation unit 622 generates a shooting setting message of a form suited to posting to the external service. The transmission unit 623 transmits the shooting setting message to the information management apparatus 203 along with transmission of the image to the information management apparatus 203. In this manner, the image and the shooting setting message are provided to the external service. Note that, depending on a choice by a user, only an image may be transmitted without transmitting a shooting setting message. Details of processing by the posting unit 620 will be described later with reference to FIG. 27. Details of processing by the supplementary information obtaining unit 621 will be described later with reference to FIG. 28. Details of processing by the generation unit 622 will be described later with reference to FIGS. 29A, 29B and 29C. Details of processing by the transmission unit 623 will be described later with reference to FIGS. 30AA and 30AB and FIGS. 30BA and 30BB.

A holding unit 624 holds, in the secondary storage device 507 and the like, results of calculation by the respective processing units, images received from the image capturing apparatus 201, and the like. A transmission destination holding unit 625 holds, in the secondary storage device 507 and the like, information about the transmission destination of an image. The information about the transmission destination includes, for example, an external service table 1103, a cooperation table 1200, and a shooting setting item table 1201, which will be described later with reference to FIGS. 11A to 11D, 12A, and 12B. Note that the functional units of the image management apparatus 202 may be dispersedly implemented by a plurality of image management apparatuses. When functions are dispersed to a plurality of image management apparatuses, the image management apparatuses are connected by a LAN or the like so that they can communicate with each other, and they perform a series of processes (to be described later) in cooperation.

\<Sequence of Processing of Image Management System 100\>

Figure 7:
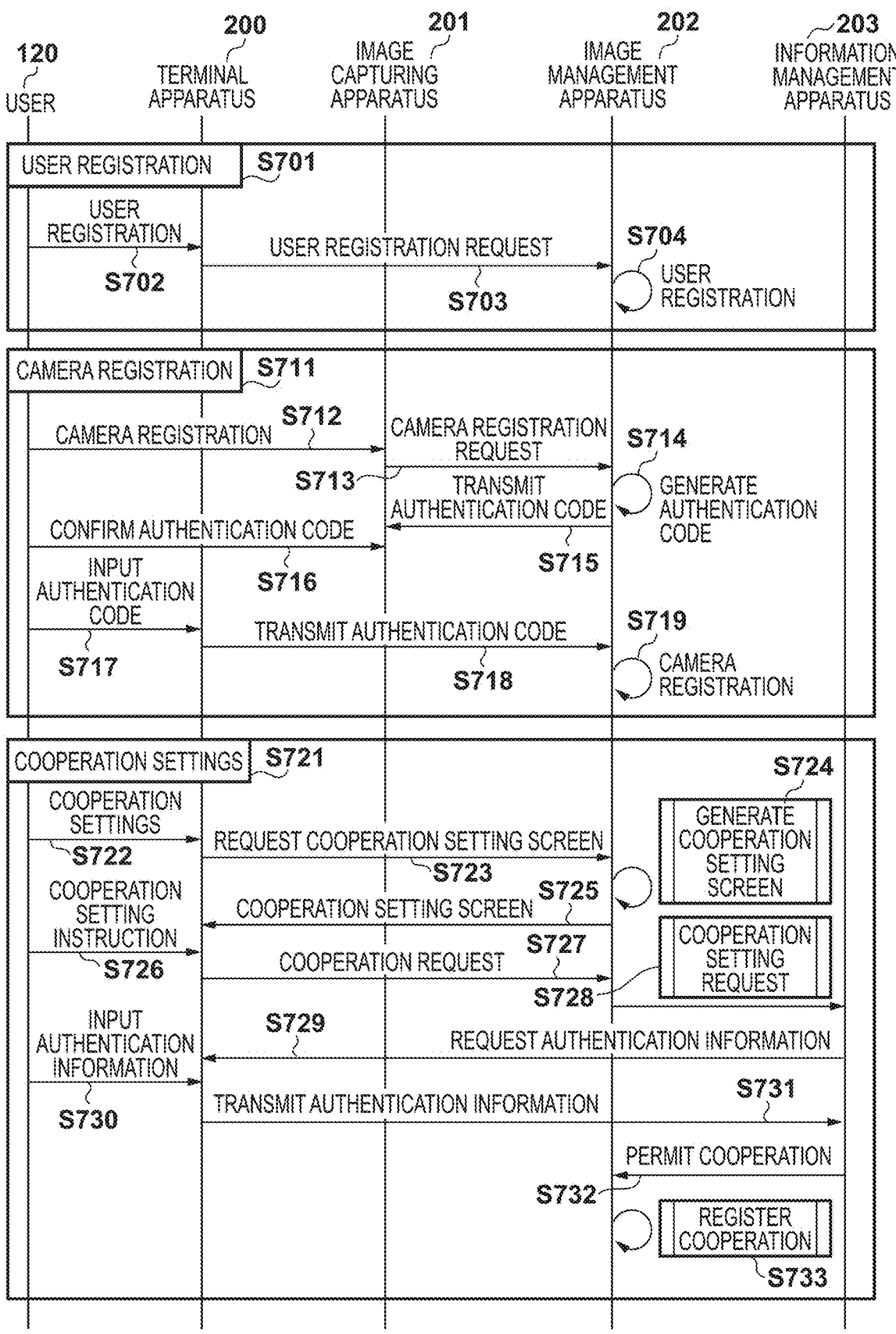
FIG. 7 is a sequence chart showing an example of a sequence of processing in the image management system.
Figure 9:
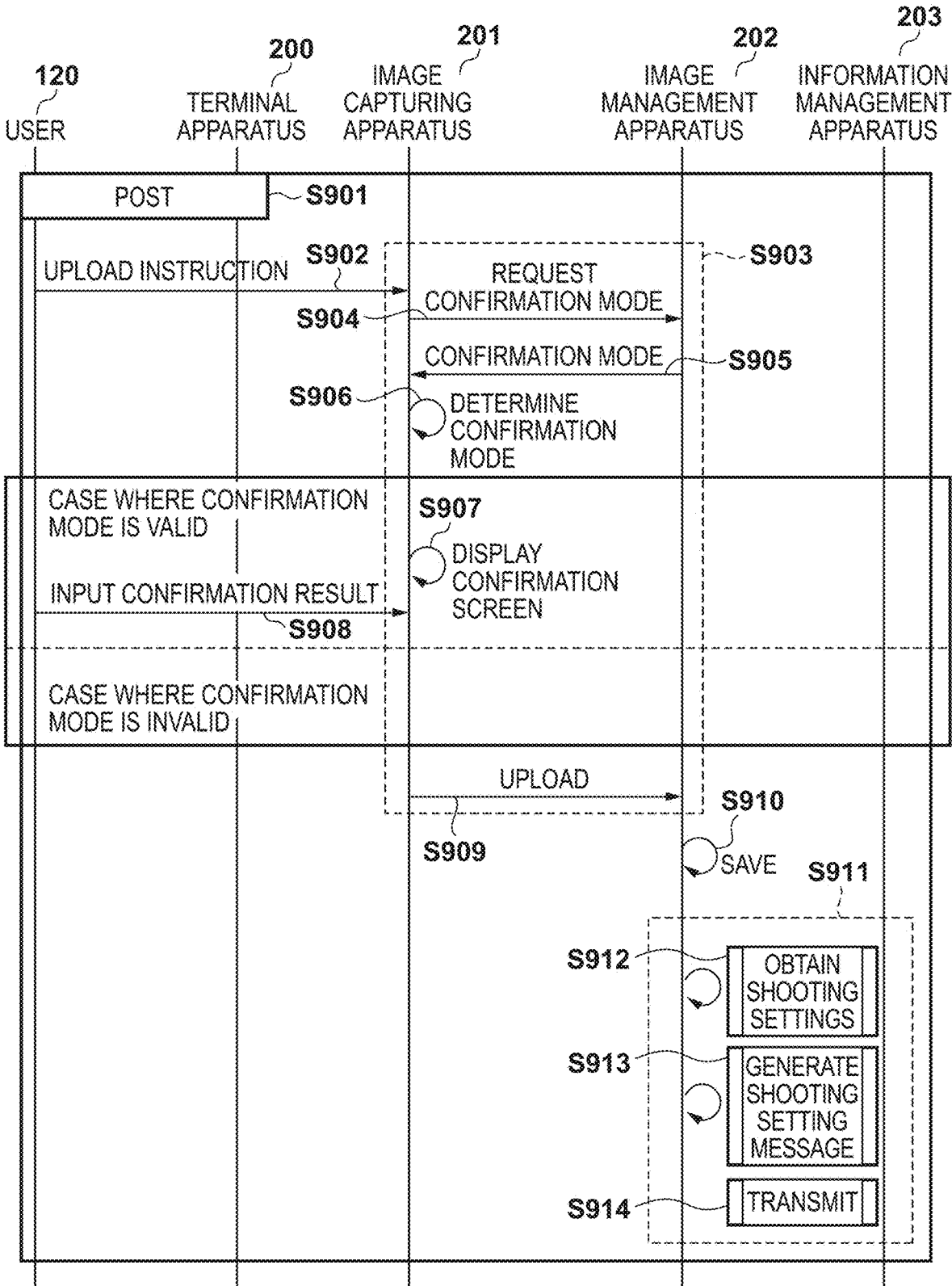
FIG. 9 is a sequence chart showing an example of a sequence of processing in the image management system.

Next, a sequence of processing in the image management system 100 will be explained with reference to sequence charts shown in FIGS. 7, 8, and 9.

User registration processing S701 will be explained. In step S702, the terminal apparatus 200 accepts a user registration instruction from a user together with an email address and a password. In step S703, the terminal apparatus 200 requests user registration processing of the image management apparatus 202. In step S704, the image management apparatus 202 executes user registration processing. More specifically, the image management apparatus 202 issues the user ID of the user, and registers it in a user table 1100 together with user information such as the email address and user name of the user. Note that the ID stands for an Identifier.

Next, camera registration processing S711 will be explained. In step S712, the image capturing apparatus 201 accepts a camera registration instruction from the user. In step S713, the image capturing apparatus 201 requests camera registration processing of the image management apparatus 202. At this time, the image capturing apparatus 201 transmits the model ID of the image capturing apparatus 201 to the image management apparatus 202. In step S714, the image management apparatus 202 generates an authentication code to authenticate the image capturing apparatus 201. In step S715, the image management apparatus 202 transmits the authentication code to the image capturing apparatus 201. In step S716, the image capturing apparatus 201 accepts an authentication code confirmation request from the user, and it displays the authentication code on the display 405. In step S717, the terminal apparatus 200 accepts input of the authentication code from the user. In step S718, the terminal apparatus 200 transmits the input authentication code to the image management apparatus 202. In step S719, the image management apparatus 202 compares the received authentication code with the generated authentication code, and if the two authentication codes coincide with each other, executes camera registration processing. More specifically, the image management apparatus 202 issues a camera ID, links the user ID and the received model ID, and registers them in a device table 1102.

Next, cooperation setting processing S721 will be explained. In step S722, the terminal apparatus 200 accepts a cooperation setting instruction from the user together with designation of a cooperation destination external service. In step S723, the terminal apparatus 200 requests a cooperation setting screen of the image management apparatus 202. In step S724, the image management apparatus 202 generates a cooperation setting screen. Details of the processing in step S724 will be described later with reference to FIGS. 13A, 13B, and 14. In step S725, the image management apparatus 202 transmits the cooperation setting screen to the terminal apparatus 200. In step S726, the terminal apparatus 200 accepts a cooperation setting instruction from the user. If a cooperation between the user who issued the cooperation setting instruction, and the external service provided by the information management apparatus 203 is established in steps S727 to S733, the image management apparatus 202 registers the established cooperation. First, in step S727, the terminal apparatus 200 transmits a cooperation setting request to the image management apparatus 202. In step S728, the image management apparatus 202 transmits the cooperation setting request to the information management apparatus 203. Details of the processing in step S728 will be described later with reference to FIGS. 15A and 15B. In step S729, the information management apparatus 203 transmits an authentication information request to the terminal apparatus 200. In step S730, the terminal apparatus 200 accepts input of authentication information from the user. In step S731, the terminal apparatus 200 transmits the authentication information accepted in step S730 to the information management apparatus 203. In step S732, the information management apparatus 203 (external service) permits cooperation with the user based on the authentication information, and it notifies the image management apparatus 202 of this. In step S733, the image management apparatus 202 registers, in the cooperation table 1200, cooperation information representing the cooperation between the information management apparatus 203 and the user 120. Details of the processing in step S733 will be described later with reference to FIG. 16.

Next, shooting setting release setting processing S801 will be explained. In shooting setting release setting processing, settings (to be referred to as release settings hereinafter) about release of information of shooting settings supplementary to an image is performed. Upon accepting a release setting request instruction from the user in step S802, the terminal apparatus 200 requests release setting processing of the image management apparatus 202 in step S803. In step S804, the image management apparatus 202 generates a shooting setting release setting screen. Details of the processing in step S804 will be described later with reference to FIGS. 17 to 20C. In step S805, the image management apparatus 202 transmits a release setting screen to the terminal apparatus 200. In step S806, the terminal apparatus 200 displays the release setting screen, accepts an input regarding release settings from the user, and generates a release setting list. More specifically, the terminal apparatus 200 displays a release setting screen as exemplified in FIG. 18, and if it accepts a setting completion instruction from the user, generates a release setting list. Details of the release setting list will be described later with reference to FIG. 10. In step S807, the terminal apparatus 200 transmits, to the image management apparatus 202, release settings set by the user via the release setting screen. More specifically, the terminal apparatus 200 sets the release setting list at a request parameter and transmits it. In step S808, the image management apparatus 202 registers the release settings transmitted in step S807 in the cooperation table 1200. Details of the processing in step S808 will be described later with reference to FIG. 21.

Next, confirmation mode setting processing S811 will be explained. In step S812, the terminal apparatus 200 accepts a confirmation mode setting instruction from the user. In step S813, the terminal apparatus 200 transmits a confirmation mode setting request to the image management apparatus 202. In step S814, the image management apparatus 202 generates a confirmation mode setting screen. Details of the processing in step S814 will be described later with reference to FIGS. 22 and 23. In step S815, the image management apparatus 202 transmits the confirmation mode setting screen to the terminal apparatus 200. In step S816, the terminal apparatus 200 accepts a confirmation mode setting from the user. More specifically, the terminal apparatus 200 displays a confirmation mode setting screen 2500 exemplified in FIG. 23, and it accepts an instruction about a confirmation mode setting from the user. In step S817, the terminal apparatus 200 transmits, to the image management apparatus 202, the confirmation mode setting accepted in step S816. In step S818, the image management apparatus 202 registers the received confirmation mode setting. Details of the processing in step S818 will be described later with reference to FIG. 24.

Next, image capturing processing S821 will be explained. In step S822, the image capturing apparatus 201 accepts an image capturing instruction from the user. In step S823, the image capturing unit 605 of the image capturing apparatus 201 executes image capturing using the image capturing device 409, and the holding unit 604 saves a captured image in the secondary storage device 407.

Next, posting processing S901 will be explained. In step S902, the image capturing apparatus 201 accepts selection of an image and an image upload instruction from the user. In step S903, the confirmation mode determination unit 606 of the image capturing apparatus 201 determines a confirmation mode. Processing in step S903 by the confirmation mode determination unit 606 includes steps S904 to S909. In step S904, the image capturing apparatus 201 requests a confirmation mode of the image management apparatus 202. In step S905, the image management apparatus 202 transmits the value of the confirmation mode of the user from the user table 1100 to the image capturing apparatus 201, and the image capturing apparatus 201 receives it. In step S906, the image capturing apparatus 201 determines the confirmation mode received in step S905. If the confirmation mode is valid (value of the confirmation mode is true), the image capturing apparatus 201 displays a confirmation screen 2600 exemplified in FIG. 26 on the display 405 in step S907. In step S908, the image capturing apparatus 201 accepts input of a confirmation result from the user. The confirmation result is a result of confirming whether to post shooting settings to the information management apparatus 203. On the other hand, if the confirmation mode is invalid (value of the confirmation mode is false), no confirmation screen is displayed. In step S909, the image capturing apparatus 201 transmits an image to the image management apparatus 202. The above processing in step S903 by the confirmation mode determination unit 606 will be described in more detail later with reference to FIG. 25.

In step S910, the image management apparatus 202 saves the image received from the image capturing apparatus 201 in the holding unit 624. In step S911, the image management apparatus 202 provides (posts) the image and a shooting setting message to the information management apparatus 203 that executes an external service. Step S911 includes steps S912 to S914. In step S912, the image management apparatus 202 obtains shooting settings from the image. In step S913, based on the shooting settings and information about the external service serving as an image providing destination, the image management apparatus 202 generates a shooting setting message in a form suited to distribution in the external service serving as the providing destination. In step S914, the image management apparatus 202 transmits the image and the shooting setting message to the information management apparatus 203. Details of the above processing (steps S912 to S914) in step S911 will be described later with reference to FIGS. 27, 28, 29A, 29B, 29C, 30AA, 30AB, 30BA and 30BB.

<Configuration of Release Setting List 1000>

Next, a release setting list transmitted from the terminal apparatus 200 in step S807 will be explained with reference to FIG. 10. FIG. 10 shows an example of the release setting list. In a release setting list 1000, a dictionary in which the value of a camera ID is linked with the camera ID, the value of an external service ID is linked with the external service ID, and the value of a shooting setting release flag is linked with the shooting setting release flag is stored in the list form.

<Configurations of Various Tables>

Next, various tables managed by the image management apparatus 202 according to the embodiment will be explained with reference to FIGS. 11A to 11D, 12A, and 12B.

FIG. 11A shows an example of the data structure of the user table 1100 that manages user information of the user of the image management apparatus 202. In the user table 1100, information of each user such as an email address and a confirmation mode is linked with a user ID for uniquely identifying a user, and stored. In the user table 1100, the user information such as an email address and a confirmation mode can be referred to using the user ID as a key. Note that the confirmation mode represents that when the value is true, whether to transmit a shooting setting message is confirmed to the user every transmission, and when the value is false, it is not confirmed.

FIG. 11B shows an example of the data structure of a model table 1101 that manages information about an image capturing apparatus, that is, a camera. In the model table 1101, for example, information about a camera such as a model name and a compatible shooting setting is linked with a model ID for uniquely identifying the model of a camera, and stored. In the model table 1101, the information about a camera such as a model name and a compatible shooting setting can be referred to using the model ID as a key. Note that the model name is the model name of a camera corresponding to the model ID. The compatible shooting setting is a list in which a shooting setting item ID linked with a shooting setting item recordable in Exif by the camera is stored. Details of the shooting setting item ID will be described later with reference to FIG. 12B.

FIG. 11C shows an example of the data structure of the device table 1102 that manages information about a camera registered by a user in the image management apparatus 202. In the device table 1102, for example, information about the camera of a user such as a user ID and a model ID is linked with a camera ID for uniquely identifying the camera registered by the user in the image management apparatus 202, and stored. In the device table 1102, the information about the camera of a user such as a user ID and a model ID can be referred to using the camera ID as a key. That is, the device table 1102 can be used to index the camera registered by the user.

FIG. 11D shows an example of the data structure of the external service table 1103 that manages information about an information management apparatus, that is, an external service. In the external service table 1103, for example, information about control characters used in the external service, such as an external service display name serving as the display name of the external service, a line enclosing character, and a line feed character is linked with an external service ID for uniquely identifying the external service, and stored. In the embodiment, Facebook®, Twitter®, Instagram®, and Pinterest® are exemplified as external services. The external service IDs of Facebook, Twitter, Instagram, and Pinterest will be explained as face, twit, inst, and pint. In the external service table 1103, the information about an external service such as an external service display name can be referred to using the external service ID as a key. Note that the line enclosing character is a control character added before and after the character string of each line when transmitting a shooting setting message to an external service. The line feed character is a control character added to the end of a line to be fed when transmitting a shooting setting message to an external service. For example, according to the external service table 1103, a shooting setting message for transmitting a character string "ISO sensitivity: 100" and a character string "exposure compensation: −1.0" to an external service corresponding to the external service ID "inst" is ["ISO sensitivity: 100" <br> "exposure compensation: −1.0"].

FIG. 12A shows an example of the data structure of the cooperation table 1200 that manages cooperation information about cooperation between a camera and an external service registered in the image management apparatus 202. The cooperation table 1200 is generated and managed for each user. In the cooperation table 1200, for example, information of a camera and a cooperation destination such as a camera ID, a transmission destination ID, a shooting setting release flag, and a shooting setting item list is linked with a cooperation ID for uniquely identifying cooperation information, and stored. In the cooperation table 1200, a camera ID, a transmission destination ID, a shooting setting release flag, a shooting setting item list, and the like can be referred to using the cooperation ID as a key. Note that the transmission destination ID represents an external service serving as a destination to which an image is transmitted and coincides with an external service ID in the external service table 1103. The shooting setting release flag is a flag representing whether to post shooting settings when posting an image to an external service corresponding to a transmission destination ID. The shooting setting release flag represents that when the value is true, shooting settings are posted to the cooperated external service, and when the value is false, no shooting setting is posted. The shooting setting item list is a list that manages a shooting setting item ID corresponding to a shooting setting item posted to an external service. When the shooting setting release flag is true, a shooting setting item corresponding to a shooting setting item ID registered in the shooting setting item list is posted to the external service.

FIG. 12B shows an example of the data structure of the shooting setting item table 1201 that manages shooting setting item information about a shooting setting item. In the shooting setting item table 1201, for example, information about shooting setting item information such as a shooting setting display name, a prefix dictionary, an Exif tag ID, and a suffix dictionary is linked with a shooting setting item ID for uniquely identifying shooting setting item information, and stored. In the shooting setting item table 1201, a shooting setting display name, a prefix dictionary, an Exif tag ID, a suffix dictionary, and the like can be referred to using the shooting setting item ID as a key. Note that the shooting setting display name represents a display name when displaying a shooting setting item corresponding to a shooting setting item ID. The prefix dictionary is the dictionary of a format character string inserted between a shooting setting display name and the set value of a shooting setting item when displaying a shooting setting item corresponding to a shooting setting item ID in each external service. In the prefix dictionary, a format character string is linked with an external service ID and stored so that the format character string can be referred to using the external service ID as a key. The Exif tag ID is an identifier for uniquely identifying a tag stored in Exif and is, for example, a number equivalent to a tag number described in "image file format Exif2.3 for a digital still camera". The value of the Exif tag ID can be referred to using the Exif tag ID as a key. The suffix dictionary is the dictionary of a format character string added after the set value of a shooting setting item when displaying a shooting setting item corresponding to a shooting setting item ID in each external service. In the suffix dictionary, a format character string is linked with an external service ID and stored so that the format character string can be referred to using the external service ID as a key. The format character string is used to mainly represent the unit of the set value of a shooting setting item. As represented in the shooting setting item table 1201, the format character string may implement the format and the display of the unit using a blank character and a character representing the unit. As represented in the external service table 1103 and the shooting setting item table 1201, information that decorates display of a shooting setting item and/or a set value is held so that information of shooting settings supplementary to an image can be processed into a readable shooting setting message.

<Sequence of Processing by Cooperation Setting Screen Generation Unit 612>

Figure 13A:
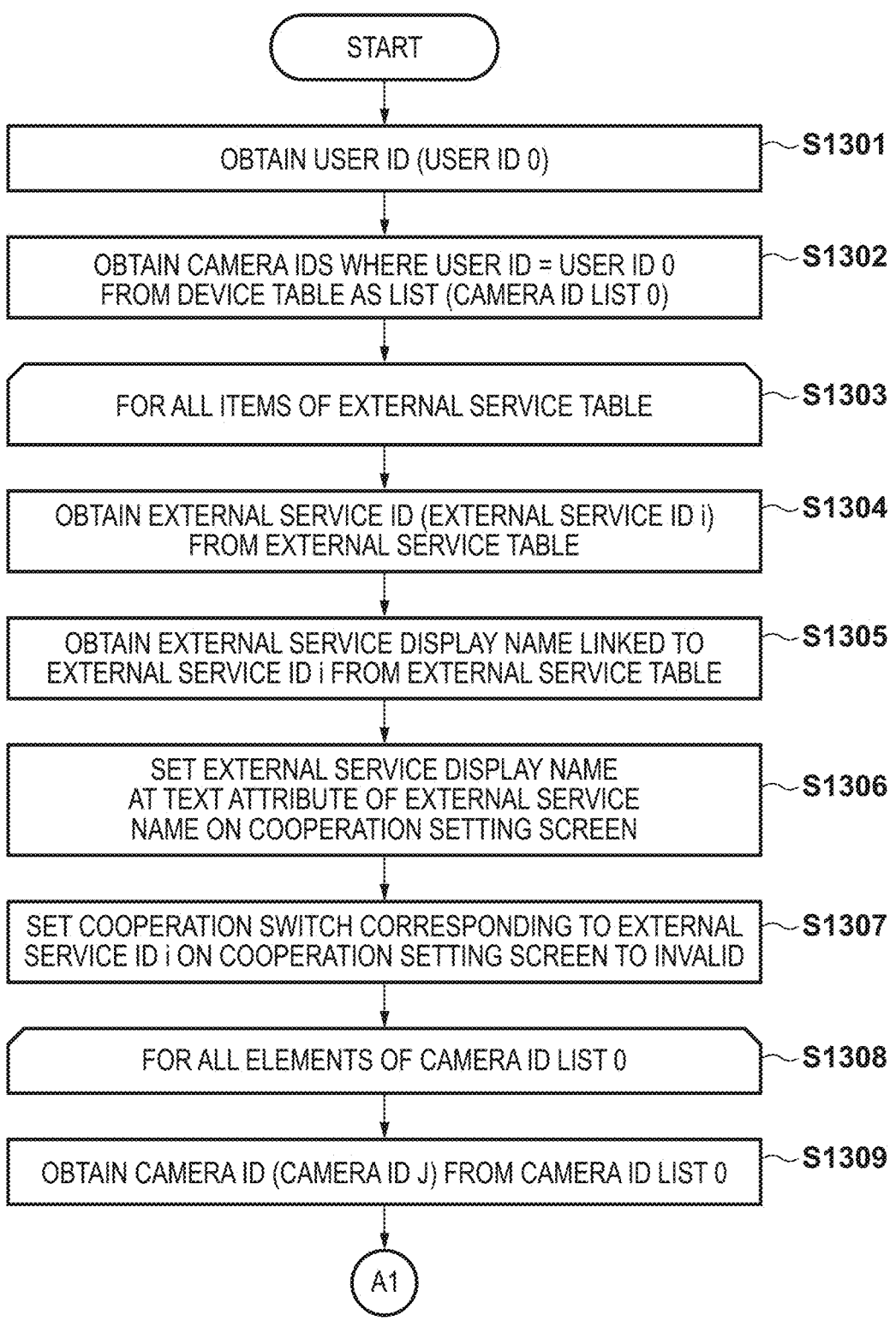
FIG. 13A is a flowchart showing an example of processing by a cooperation setting screen generation unit.

Next, a sequence of processing by the cooperation setting screen generation unit 612 will be explained with reference to FIGS. 13A and 13B.

In step S1301, the cooperation setting screen generation unit 612 obtains a user ID. The obtained user ID is defined as a user ID 0. In step S1302, the cooperation setting screen generation unit 612 obtains, in the list form from the device table 1102, camera IDs for which the user ID coincides with the user ID 0. The list of camera IDs obtained in the list form is defined as a camera ID list 0. Then, the cooperation setting screen generation unit 612 repeats processing represented between steps S1303 to S1317 for all items in the external service table 1103.

In step S1304, the cooperation setting screen generation unit 612 obtains one external service ID from the external service table 1103. The obtained external service ID is defined as an external service ID i. In step S1305, the cooperation setting screen generation unit 612 obtains, from the external service table 1103, an external service display name linked with the external service ID i. In step S1306, the cooperation setting screen generation unit 612 sets the external service display name at the text attribute of the external service name on the cooperation setting screen (for example, a label 1401 in FIG. 14). In step S1307, the cooperation setting screen generation unit 612 sets invalid a cooperation switch (for example, a switch 1402 in FIG. 14) corresponding to the external service ID i on the cooperation setting screen. Subsequently, the cooperation setting screen generation unit 612 repeats processing represented in steps S1308 to S1316 for all elements in the camera ID list 0.

In step S1309, the cooperation setting screen generation unit 612 obtains a camera ID from the camera ID list 0. The camera ID obtained from the camera ID list 0 is defined as a camera ID j. In step S1310, the cooperation setting screen generation unit 612 obtains, from the model table 1101, a model name for which the model ID coincides with the camera ID j. In step S1311, the cooperation setting screen generation unit 612 sets the model name at the text attribute of the camera name on the cooperation setting screen (corresponding to, for example, a label 1403 in FIG. 14). In step S1312, the cooperation setting screen generation unit 612 sets invalid a cooperation switch (for example, a switch 1404 in FIG. 14) corresponding to the camera ID j belonging to the external service ID i on the cooperation setting screen.

In step S1313, the cooperation setting screen generation unit 612 determines whether there is a cooperation ID in the cooperation table 1200 for which the camera ID coincides with the camera ID j and the transmission destination ID coincides with the external service ID i. If the cooperation setting screen generation unit 612 determines that there is such a cooperation ID (YES in step S1313), the process advances to step S1314. If the cooperation setting screen generation unit 612 determines that there is no such cooperation ID (NO in step S1313), the process advances to step S1316. In step S1314, the cooperation setting screen generation unit 612 sets valid the cooperation switch (cooperation switch set invalid in step S1307) corresponding to the external service ID i on the cooperation setting screen. In step S1315, the cooperation setting screen generation unit 612 sets valid the cooperation switch (cooperation switch set invalid in step S1312) corresponding the camera ID j belonging to the external service ID i on the cooperation setting screen. In step S1316, the cooperation setting screen generation unit 612 determines whether the processing is complete for all elements in the camera ID list 0. If the processing is complete, the process advances to step S1317. If the processing is incomplete, the processing is repeated from step S1308.

In step S1317, the cooperation setting screen generation unit 612 determines whether the processing is complete for all items in the external service table 1103. If the cooperation setting screen generation unit 612 determines that the processing is complete, the process advances to step S1318. If the cooperation setting screen generation unit 612 determines that the processing is incomplete, the processing is repeated from step S1303. In step S1318, the cooperation setting screen generation unit 612 generates a return button. In this manner, a cooperation setting screen as shown in FIG. 14 is generated.

<Layout of Cooperation Setting Screen 1400>

Next, the cooperation setting screen will be explained with reference to FIG. 14. FIG. 14 shows an example of the cooperation setting screen. On a cooperation setting screen 1400, the label 1401 represents the name of a cooperable external service. The switch 1402 represents the cooperation state of an external service (the switch 1402 becomes valid when even one of image capturing apparatuses registered by a user is in the cooperation state). When the circle object of the switch 1402 is positioned right, this represents "valid", and when it is positioned left, represents "invalid". When the CPU 302 detects, by the above-described processing, a pressing operation from the user to the switch 1402, it sets the state of the switch 1402 to an opposite state. That is, when the switch 1402 is in the valid state, it is set to the invalid state, and if it is in the invalid state, set to the valid state. In the example of FIG. 14, the switch 1402 represents the invalid state and represents that the external service Facebook is not cooperated. The label 1403 represents the name of a camera registered in the image management apparatus 202 by the user for each external service. The switch 1404 is a switch representing whether to transmit an image from a camera to an external service. When the switch 1404 is valid, an image is transmitted from a camera to a corresponding external service. When the switch 1404 is invalid, no image is transmitted from a camera to a corresponding external service. A button 1430 is a "return button" for changing to an invoking screen.

<Sequence of Processing in Cooperation Request Unit 613>

Next, a sequence of processing in the cooperation request unit 613 will be explained with reference to FIGS. 15A and 15B.

In step S1501, the cooperation request unit 613 determines whether a switch (for example, the switch 1402) corresponding to an external service on the cooperation setting screen 1400 has been pressed. If the cooperation request unit 613 determines that a switch corresponding to an external service has been pressed (YES in step S1501), the process advances to step S1502. If the cooperation request unit 613 determines that a switch corresponding to an external service has not been pressed (NO in step S1501), the process advances to step S1508. In step S1502, the cooperation request unit 613 obtains the external service ID of the external service corresponding to the pressed switch. The obtained external service ID is defined as an external service ID 0. In step S1503, the cooperation request unit 613 determines the state of the pressed switch. If the cooperation request unit 613 determines that the state is true (YES in step S1503), the process advances to step S1504. If the cooperation request unit 613 determines that the state is false (NO in step S1503), the process advances to step S1515. In step S1515, the cooperation request unit 613 transmits a cooperation permission request to the external service corresponding to the switch. In step S1516, the cooperation request unit 613 sets valid the state of the switch corresponding to the external service ID 0. After that, the process returns to step S1501.

If the state of the pressed switch is valid, the cooperation request unit 613 sets invalid, that is, false, the states of switches corresponding to all cameras cooperated with the external service ID 0 in step S1504. In step S1505, the cooperation request unit 613 deletes items of a camera registered by the user for which the transmission destination ID coincides with the external service ID 0 in the cooperation table 1200. In step S1506, the cooperation request unit 613 sets invalid, that is, false the state of the switch corresponding to the external service ID 0. In step S1507, the cooperation request unit 613 requests cancellation of the cooperation of the external service corresponding to the external service ID 0. Thereafter, the process returns to step S1501.

In step S1508, the cooperation request unit 613 determines whether a switch (for example, a switch 1411) corresponding to a camera has been pressed. If the cooperation request unit 613 determines that a switch corresponding to a camera has been pressed (YES in step S1508), the process advances to step S1509. If the cooperation request unit 613 determines that a switch corresponding to a camera has not been pressed (NO in step S1508), the process advances to step S1523. In step S1523, the cooperation request unit 613 determines whether the return button has been pressed. If the return button has been pressed (YES in step S1523), the process advances to step S1524. In step S1524, the cooperation request unit 613 returns the screen to a previous one, and ends the processing. If the cooperation request unit 613 determines that the return button has not been pressed (NO in step S1523), the process returns to step S1501.

In step S1509, the cooperation request unit 613 determines the state of the pressed switch. If the state is true (YES in step S1509), the process advances to step S1510. If the state is false, the process advances to step S1517. In step S1510, the cooperation request unit 613 sets the state of the pressed switch invalid. In step S1511, the cooperation request unit 613 obtains the camera ID of a camera corresponding to the pressed switch. The obtained camera ID is defined as a camera ID 0. In step S1512, the cooperation request unit 613 obtains the external service ID of an external service to which the camera (camera ID 0) corresponding to the pressed switch belongs on the cooperation setting screen 1400. For example, when the switch 1411 is pressed, the external service ID of an external service represented by a label 1412 is obtained. The obtained external service ID is defined as an external service ID 0. In step S1513, the cooperation request unit 613 deletes items for which the camera ID coincides with the camera ID 0 and the transmission destination ID coincides with the external service ID 0 in the cooperation table 1200. In step S1514, the cooperation request unit 613 determines the states of switches corresponding to the camera IDs of cameras belonging to the external service ID 0 on the cooperation setting screen 1400. If the states of switches corresponding to all the camera IDs are false (YES in step S1514), the process advances to step S1506. The processing in step S1506 and subsequent steps has been described above. In contrast, if the state of even one switch is true (NO in step S1514), the process returns to step S1501.

In step S1517, the cooperation request unit 613 obtains the camera ID of a camera corresponding to the pressed switch. The obtained camera ID is defined as a camera ID 0. In step S1518, the cooperation request unit 613 obtains the external service ID of an external service to which the camera (camera ID 0) corresponding to the pressed switch belongs. The obtained external service ID is defined as an external service ID 0. In step S1519, the cooperation request unit 613 determines the state of a switch corresponding to the external service ID 0. If the state of the switch is true (YES in step S1519), the process advances to step S1520. In step S1520, the cooperation request unit 613 adds an item to the cooperation table 1200. As values set at the item, the camera ID 0 is set at the camera ID, the external service ID 0 is set at the transmission destination ID, and false is set at the shooting setting release flag. After these settings, the process returns to step S1501. If the cooperation request unit 613 determines in step S1519 that the state of the switch is false (NO in step S1519), the process advances to step S1521. In step S1521, the cooperation request unit 613 transmits a cooperation permission request to the external service corresponding to the switch. In step S1522, the cooperation request unit 613 sets valid the state of the switch corresponding to the external service ID 0. Then, the process advances to step S1520.

<Sequence of Processing in Cooperation Registration Unit 614>

Next, a sequence of cooperation registration processing by the cooperation registration unit 614 will be explained with reference to FIG. 16.

In step S1601, the cooperation registration unit 614 obtains the user ID of a cooperation target user. The obtained user ID is defined as a user ID 0. In step S1602, the cooperation registration unit 614 obtains an external service ID corresponding to an external service serving as a cooperation destination (external service that transmits permission of cooperation). In steps S1603 to S1609, the cooperation registration unit 614 repeats subsequent processing for all items in the device table 1102.

In step S1604, the cooperation registration unit 614 determines whether a user ID in the device table 1102 coincides with the user ID 0. If the cooperation registration unit 614 determines that a user ID in the device table 1102 coincides with the user ID 0 (YES in step S1604), the process advances to step S1605. If the cooperation registration unit 614 determines that a user ID in the device table 1102 does not coincide with the user ID 0 (NO in step S1604), the process advances to step S1609. In step S1605, the cooperation registration unit 614 issues a cooperation ID. In step S1606, the cooperation registration unit 614 generates a temporary dictionary for write in an item in the cooperation table 1200. In step S1607, the cooperation registration unit 614 sets a value at each attribute of the temporary dictionary. More specifically, the cooperation ID is set at the cooperation ID attribute, the camera ID is set at the camera ID attribute, the external service ID is set at the transmission destination ID attribute, and false is set at the shooting setting release flag attribute. In step S1608, the cooperation registration unit 614 registers the contents of the temporary dictionary in the cooperation table 1200. In step S1609, the cooperation registration unit 614 determines whether the processing is complete for all items in the device table 1102. If the cooperation registration unit 614 determines that the processing is complete, it ends the processing. If the cooperation registration unit 614 determines that the processing is incomplete, the process returns to step S1603 to repeat the above-described processing.

<Sequence of Processing in Release Setting Screen Generation Unit 615>

Next, a sequence of processing in the release setting screen generation unit 615 will be explained with reference to FIG. 17.

In step S1701, the release setting screen generation unit 615 obtains a user ID for which setting about release of shooting settings is performed. The obtained user ID is defined as a user ID 0. The release setting screen generation unit 615 repeats processing in steps S1702 to S1717 for all items registered in the device table 1102.

In step S1703, the release setting screen generation unit 615 determines whether the user ID of one item (to be referred to as a target item hereinafter) registered in the device table 1102 coincides with the user ID 0. If the release setting screen generation unit 615 determines that the user ID coincides with the user ID 0 (YES in step S1703), the process advances to step S1704. If the release setting screen generation unit 615 determines that the user ID does not coincide with the user ID 0 (NO in step S1703), the process advances to step S1717. In step S1704, the release setting screen generation unit 615 obtains a camera ID from the target item in the device table 1102. The obtained camera ID is defined as a camera ID 0. In step S1705, the release setting screen generation unit 615 obtains a model ID from the target item in the device table 1102. The obtained model ID is defined as a model ID 0. In step S1706, the release setting screen generation unit 615 obtains a model name corresponding to the model ID 0 from the target item in the model table 1101. In step S1707, the release setting screen generation unit 615 sets the obtained model name at the model name label on the release setting screen.

Then, the release setting screen generation unit 615 repeats processing in steps S1708 to S1716 for all items in the cooperation table 1200 of the user (user whose user ID is the user ID 0). In step S1709, the release setting screen generation unit 615 determines whether the camera ID of one item (to be referred to as a target item hereinafter) in the cooperation table 1200 coincides with the camera ID 0. If the release setting screen generation unit 615 determines that the camera ID coincides with the camera ID 0 (YES in step S1709), the process advances to step S1710. If the release setting screen generation unit 615 determines that the camera ID does not coincide with the camera ID 0 (NO in step S1709), the process advances to step S1716. In step S1710, the release setting screen generation unit 615 obtains a transmission destination ID from the target item in the cooperation table 1200. In step S1711, the release setting screen generation unit 615 obtains, from the target item in the external service table 1103, an external service display name corresponding to the transmission destination ID (external service ID) obtained in step S1711. In step S1712, the release setting screen generation unit 615 sets the external service display name at the external service name label on the release setting screen. In step S1713, the release setting screen generation unit 615 obtains a shooting setting release flag from the target item in the cooperation table 1200. In step S1714, the release setting screen generation unit 615 sets a shooting setting release switch on the release setting screen based on the value of the shooting setting release flag. That is, if the state of the shooting setting release switch is valid, the release setting screen generation unit 615 sets the shooting setting release flag to be true. If the state of the shooting setting release switch is invalid, the release setting screen generation unit 615 sets the shooting setting release flag to be false. In step S1715, the release setting screen generation unit 615 generates an advanced setting button.

In step S1716, the release setting screen generation unit 615 determines whether the processing in steps S1709 to S1715 is complete for all items in the cooperation table 1200. If the release setting screen generation unit 615 determines that the processing is complete, the process advances to step S1717. If the release setting screen generation unit 615 determines that the processing is incomplete, the process returns to step S1708. In step S1717, the release setting screen generation unit 615 determines whether the processing in steps S1703 to S1716 is complete for all items in the device table 1102. If the release setting screen generation unit 615 determines that the processing is complete, the process ends. If the release setting screen generation unit 615 determines that the processing is incomplete, the process returns to step S1702.

<Layout of Release Setting Screen 1800>

Next, a release setting screen generated by the release setting screen generation unit 615 will be explained with reference to FIG. 18. FIG. 18 is a view showing an example of the release setting screen. On a release setting screen 1800 for shooting settings, a label 1801 represents the name of a camera registered by a user in the image management apparatus 202, and a label 1802 represents the name of an external service. A switch 1803 represents the state of cooperation with the external service. An advanced setting button 1804 is a button for invoking the advanced setting screen of shooting settings to be released. A return button 1805 is a button for changing to an invoking screen.

<Sequence of Processing in Advanced Setting Screen Generation Unit 616>

Figure 19:
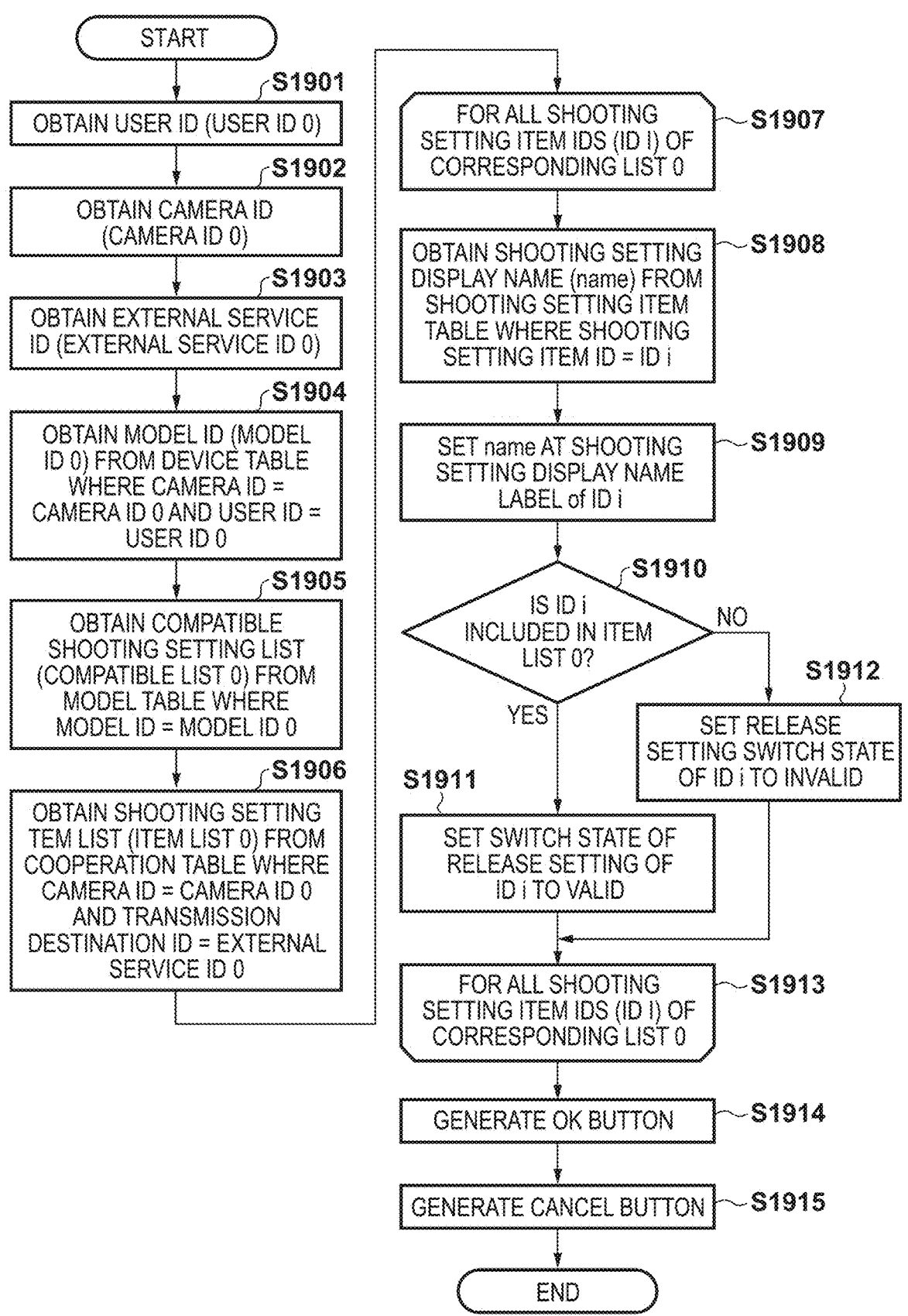
FIG. 19 is a flowchart showing an example of processing by an advanced setting screen generation unit.

Next, a sequence of processing by the advanced setting screen generation unit 616 will be explained with reference to FIG. 19. The advanced setting screen is generated and displayed in accordance with pressing of the advanced setting button 1804. On the advanced setting screen, details of shooting settings to be released are set for the external service of a camera corresponding to the pressed advanced setting button 1804.

In step S1901, the advanced setting screen generation unit 616 obtains the user ID of a user corresponding to the pressed advanced setting button 1804. The obtained user ID is defined as a user ID 0. In step S1902, the advanced setting screen generation unit 616 obtains a camera ID corresponding to the pressed advanced setting button 1804. The obtained camera ID is defined as a camera ID 0. In step S1903, the advanced setting screen generation unit 616 obtains an external service ID corresponding to the pressed advanced setting button 1804. The obtained external service ID is defined as an external service ID 0. In step S1904, the advanced setting screen generation unit 616 obtains, from the device table 1102, a model ID for which the camera ID coincides with the camera ID 0 and the user ID coincides with the user ID 0. The obtained model ID is defined as a model ID 0. In step S1905, the advanced setting screen generation unit 616 obtains, from the model table 1101, a compatible shooting setting list for which the model ID coincides with the model ID 0. The obtained compatible shooting setting list is defined as a compatible list 0. In step S1906, the advanced setting screen generation unit 616 obtains, from the cooperation table 1200, a shooting setting item list for which the camera ID coincides with the camera ID 0 and the transmission destination ID coincides with the external service ID 0. The obtained shooting setting item list is defined as an item list 0.

Then, the advanced setting screen generation unit 616 repeats processing in steps S1907 to S1913 for all shooting setting item IDs listed in the compatible list 0. The ith shooting setting item ID is defined as an ID i. In step S1908, the advanced setting screen generation unit 616 obtains, from the shooting setting item table 1201, a shooting setting display name for which the shooting setting item ID coincides with the ID i. The obtained shooting setting display name is defined as a name. In step S1909, the advanced setting screen generation unit 616 sets the name at the shooting setting display name label of the ID i. In step S1910, the advanced setting screen generation unit 616 determines whether the ID i is included in the item list 0. If the advanced setting screen generation unit 616 determines that the ID i is included in the item list 0 (YES in step S1910), the process advances to step S1911. If the advanced setting screen generation unit 616 determines that the ID i is not included in the item list 0 (NO in step S1910), the process advances to step S1912. In step S1911, the advanced setting screen generation unit 616 sets valid the state of the release setting switch of the ID i. To the contrary, in step S1912, the advanced setting screen generation unit 616 sets invalid the state of the release setting switch of the ID i. In step S1913, the advanced setting screen generation unit 616 determines whether all the processing is complete for all shooting setting item IDs in the corresponding list 0. If the advanced setting screen generation unit 616 determines that all the processing is complete, the process advances to step S1914. If the advanced setting screen generation unit 616 determines that all the processing is incomplete, the process returns to step S1907.

In step S1914, the advanced setting screen generation unit 616 generates an OK button. In step S1915, the advanced setting screen generation unit 616 generates a cancel button.

<Layout of Advanced Setting Screen 2000>

Next, an advanced setting screen generated by the processing shown in FIG. 19 will be explained with reference to FIGS. 20A to 20C. FIGS. 20A to 20C show an example of the advanced setting screen.

In FIG. 20A, an advanced setting screen 2000 is a screen that accepts an input from a user regarding advanced settings of shooting settings to be released. A container 2001 stores an icon 2002, a label 2003, a switch 2004, and a hamburger menu 2005, which will be described below. The icon 2002 represents the type of shooting setting. The label 2003 represents the name of the shooting setting. The switch 2004 represents whether to transmit the shooting setting item to an external service. When the switch 2004 is valid, the shooting setting item is transmitted to an external service. When the switch 2004 is invalid, the shooting setting item is not transmitted to an external service. The user can switch validation/invalidation of the switch 2004 by a pressing operation to the switch 2004. The hamburger menu 2005 accepts an instruction from the user regarding the order of the container 2001. An OK button 2006 is a button that accepts a setting completion instruction from the user. A cancel button 2007 is a button that accepts a setting cancel instruction from the user.

Next, a method of changing the display order of shooting setting items will be explained with reference to FIGS. 20B and 20C. In FIGS. 20B and 20C, a container 2010 corresponds to the shooting setting item of the ISO sensitivity, and a container 2011 corresponds to the shooting setting item of the shutter speed and includes a hamburger menu 2012. For example, assume that when shooting setting items are displayed in the order of the ISO sensitivity and the shutter speed, the user wants to display the shooting setting items in the order of the shutter speed and the ISO sensitivity. The user presses the hamburger menu 2012 and maintains the pressing state. The CPU 302 detects that the hamburger menu 2012 is kept pressed for a predetermined time, and then sets valid the floating attribute of the container 2011 of the shutter speed. The floating attribute is a binary attribute representing whether to set the coordinates of a container to be freely changeable. When the floating attribute is true, the coordinates of the container are updated following the coordinates of pressing of the user. When the floating attribute is false, the coordinates of the container are not updated even if the coordinates of pressing of the user change.

Then, as shown in FIG. 20B, the user moves the coordinates of the container 2011 of the shutter speed from the original coordinates to upper ones on the screen. The user further continues the move, and positions the coordinates of the container 2011 to upper coordinates from those of the container 2010 of the ISO sensitivity on the screen. After that, the user releases his/her finger from the screen surface, canceling the pressing state of the container 2011. The CPU 302 detects the cancellation of the pressing state of the container 2011, and then sets false the floating attribute of the container 2011. The CPU 302 compares the coordinates of the upper left vertex of the container 2011 with those of the container 2010, and when the coordinates of the upper left vertex of the container 2011 are higher on the screen than those of the container 2010, the order of the containers 2011 and 2010 is reversed. That is, the CPU 302 reverses the order of a shooting setting item ID corresponding to the ISO sensitivity and a shooting setting item ID corresponding to the shutter speed in the shooting setting item list of the cooperation table 1200. FIG. 20C shows a state after the order of the container 2010 of the ISO sensitivity and the container 2011 of the shutter speed is reversed.

<Sequence of Processing in Release Setting Registration Unit 617>

Next, a sequence of processing in the release setting registration unit 617 will be explained with reference to FIG. 21. The release setting registration unit 617 performs registration in the cooperation table 1200 based on the release setting list (S807 (transmission of release settings) in FIG. 8, FIG. 10) received from the terminal apparatus 200. The release setting list includes the contents of release settings set by the user on the terminal apparatus 200 using the release setting screen 1800 and the advanced setting screen 2000.

In step S2101, the release setting registration unit 617 obtains a release setting list from the terminal apparatus 200. Then, the release setting registration unit 617 repeats processing in steps S2102 to S2108 for all elements in the obtained release setting list.

In step S2103, the release setting registration unit 617 obtains an element Pi of the release setting list. In step S2104, the release setting registration unit 617 determines whether there is an item in the cooperation table 1200 for which the camera ID and the camera ID of the element Pi coincide with each other and the transmission destination ID and the external service ID of the element Pi coincide with each other. If the release setting registration unit 617 determines that there is such an item (YES in step S2104), the process advances to step S2105. If the release setting registration unit 617 determines that there is no such item, the process advances to step S2106.

In step S2105, the release setting registration unit 617 sets the value of the shooting setting release flag of the element Pi at the shooting setting release flag of the item. In contrast, in step S2106, the release setting registration unit 617 adds a new item to the cooperation table 1200. The release setting registration unit 617 sets an attribute value to the new item in the following manner. That is, the release setting registration unit 617 sets a newly issued cooperation ID at the cooperation ID, sets the value of the camera ID of the element Pi at the camera ID, sets the value of the external service ID of the element Pi at the transmission destination ID, and sets the value of the shooting setting release flag of the element Pi at the shooting setting release flag. The release setting list includes "shooting settings to be released" set on an advanced setting screen as exemplified in FIGS. 20A, 20B, and 20C. In step S2107, the release setting registration unit 617 obtains a shooting setting set valid on the advanced setting screen among corresponding shooting settings linked with a model ID corresponding to the camera ID of the element Pi in the model table 1101. Then, the release setting registration unit 617 updates, with the obtained shooting setting, the contents of the shooting setting item list linked with a corresponding cooperation ID in the cooperation table 1200. In step S2108, the release setting registration unit 617 determines whether the processing is complete for all elements in the release setting list. If the release setting registration unit 617 determines that the processing is complete, the process ends. If the release setting registration unit 617 determines that the processing is incomplete, the process returns to step S2102.

<Sequence of Processing in Confirmation Mode Setting Screen Generation Unit 618>

Next, a sequence of processing in the confirmation mode setting screen generation unit 618 will be explained with reference to FIG. 22.

In step S2201, the confirmation mode setting screen generation unit 618 obtains a user ID in response to a confirmation mode setting request (S813) transmitted from the terminal apparatus 200. The obtained user ID is defined as a user ID 0. In step S2202, the confirmation mode setting screen generation unit 618 obtains, from the user table 1100, the confirmation mode of an item for which the user ID coincides with the user ID 0. The obtained confirmation mode is defined as a confirmation mode 0. In step S2203, the confirmation mode setting screen generation unit 618 generates a confirmation mode setting screen. In step S2204, the confirmation mode setting screen generation unit 618 generates a confirmation mode switch and links it with the confirmation mode setting screen. In step S2205, the confirmation mode setting screen generation unit 618 determines the confirmation mode. More specifically, the confirmation mode setting screen generation unit 618 determines whether the confirmation mode 0 is true. If the confirmation mode setting screen generation unit 618 determines that the confirmation mode 0 is true (YES in step S2205), the process advances to step S2206. If the confirmation mode setting screen generation unit 618 determines that the confirmation mode 0 is not true (NO in step S2205), the process advances to step S2207. In step S2206, the confirmation mode setting screen generation unit 618 sets valid, that is, true the confirmation mode switch. To the contrary, in step S2207, the confirmation mode setting screen generation unit 618 sets invalid, that is, false the confirmation mode switch. In step S2208, the confirmation mode setting screen generation unit 618 generates a close button and links it with the confirmation mode setting screen.

<Layout of Confirmation Mode Setting Screen 2300>

Next, a confirmation mode setting screen generated by the confirmation mode setting screen generation unit 618 (processing in FIG. 22) will be explained with reference to FIG. 23. FIG. 23 shows an example of the confirmation mode setting screen. On a confirmation mode setting screen 2300, a label 2301 is a confirmation statement for confirming by a user whether to display a confirmation mode before transmitting an image to an external service. A confirmation mode switch 2302 accepts an instruction from a user regarding whether to display a confirmation screen (input of a confirmation mode setting, S816). A label 2303 represents the explanatory text of an operation when the confirmation mode switch 2302 is set valid. A close button 2304 accepts the completion of setting from a user.

<Sequence of Processing in Confirmation Mode Setting Unit 619>

Next, a sequence of processing in the confirmation mode setting unit 619 upon accepting transmission of a confirmation mode setting (S817) from the terminal apparatus 200 will be explained with reference to FIG. 24. In step S2401, the confirmation mode setting unit 619 obtains a user ID.

The obtained user ID is defined as a user ID 0. In step S2402, the confirmation mode setting unit 619 obtains a confirmation mode. The obtained confirmation mode is defined as a confirmation mode 0. In step S2403, the confirmation mode setting unit 619 sets the confirmation mode 0 in the confirmation mode of an item for which the user ID in the user table 1100 coincides with the user ID 0.

<Sequence of Processing in Confirmation Mode Determination Unit 606>

Figure 25:
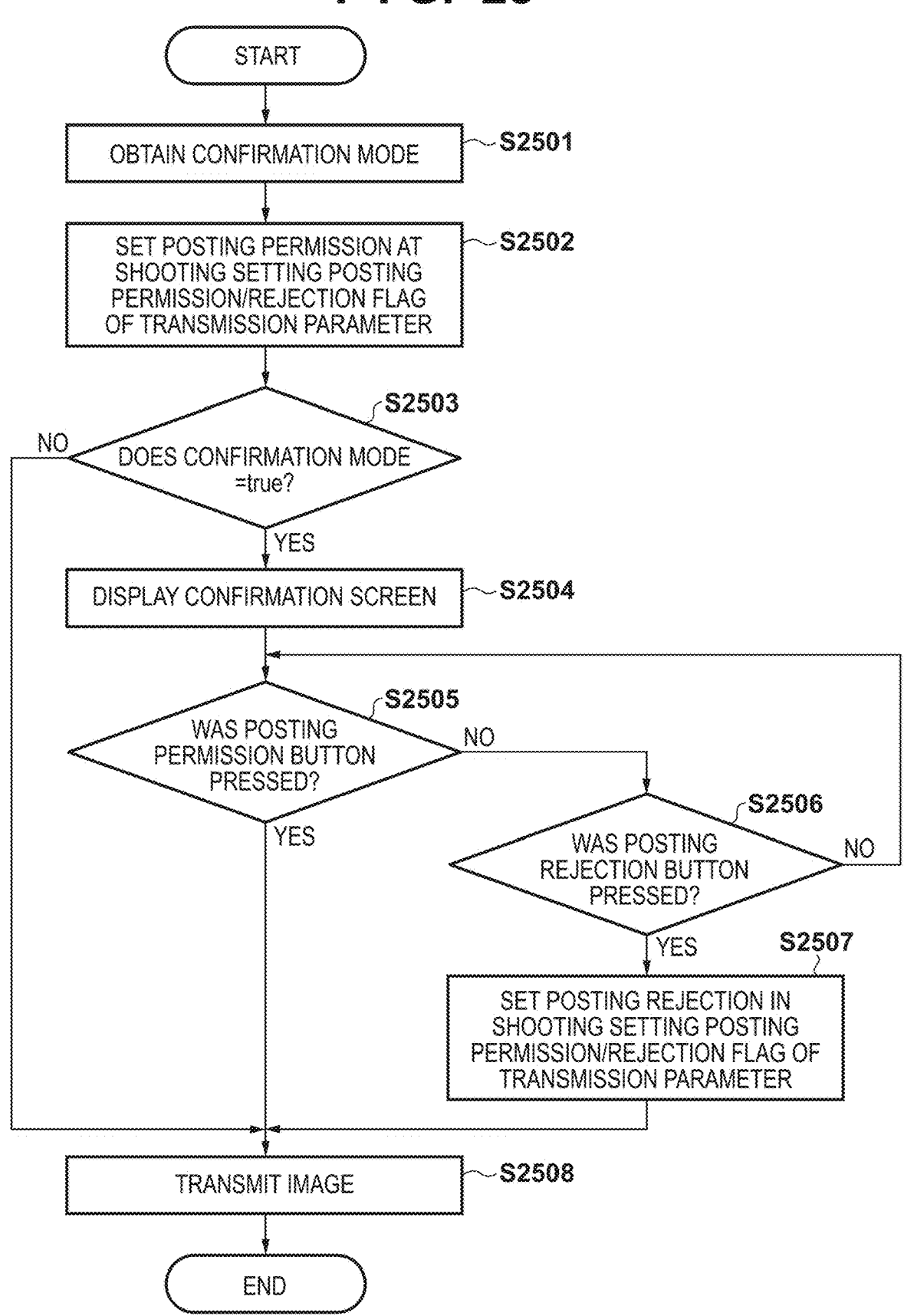
FIG. 25 is a flowchart showing an example of processing by a confirmation mode determination unit.

Next, processing by the confirmation mode determination unit 606 of the terminal apparatus 200 will be explained with reference to FIG. 25. In step S2501, the confirmation mode determination unit 606 issues a confirmation mode request to the image management apparatus 202 (S904) to obtain a confirmation mode from the image management apparatus 202 (S905). In step S2502, the confirmation mode determination unit 606 sets permission of posting at the shooting setting posting permission/rejection flag of a transmission parameter. In step S2503, the confirmation mode determination unit 606 determines whether the confirmation mode is true. If the confirmation mode determination unit 606 determines that the confirmation mode is true (YES in step S2503), the process advances to step S2504. If the confirmation mode determination unit 606 determines that the confirmation mode is false (NO in step S2503), the process advances to step S2508.

In step S2504, the confirmation mode determination unit 606 displays the confirmation screen 2600 (FIG. 26) on the display 405. In step S2505, the confirmation mode determination unit 606 determines whether a posting permission button 2603 has been pressed. If the confirmation mode determination unit 606 determines that the posting permission button 2603 has been pressed (YES in step S2505), the process advances to step S2508. If the confirmation mode determination unit 606 determines that the posting permission button 2603 has not been pressed (NO in step S2505), the process advances to step S2506. In step S2506, the confirmation mode determination unit 606 determines whether a posting rejection button 2604 has been pressed. If the confirmation mode determination unit 606 determines that the posting rejection button 2604 has been pressed (YES in step S2506), the process advances to step S2507. If the confirmation mode determination unit 606 determines that the posting rejection button 2604 has not been pressed (NO in step S2506), the process returns to step S2505. In step S2507, the confirmation mode determination unit 606 sets the posting rejection flag at the shooting setting permission/rejection flag of the transmission parameter of an image. In step S2508, the confirmation mode determination unit 606 transmits the image to the image management apparatus 202.

<Layout of Confirmation Screen 2600>

Next, a confirmation screen presented by the confirmation mode determination unit 606 will be explained with reference to FIG. 26. FIG. 26 shows an example of the confirmation screen. The confirmation screen 2600 is a screen that accepts a confirmation result regarding a shooting setting message from a user. A label 2601 is a notation that announces confirmation of whether to post a shooting setting message represented in a text box 2602. The text box 2602 displays a shooting setting message to be posted to an external service. The posting permission button 2603 accepts a posting permission instruction from a user. The posting rejection button 2604 accepts a posting rejection instruction from a user.

<Sequence of Processing in Posting Unit 620>

Figure 27:
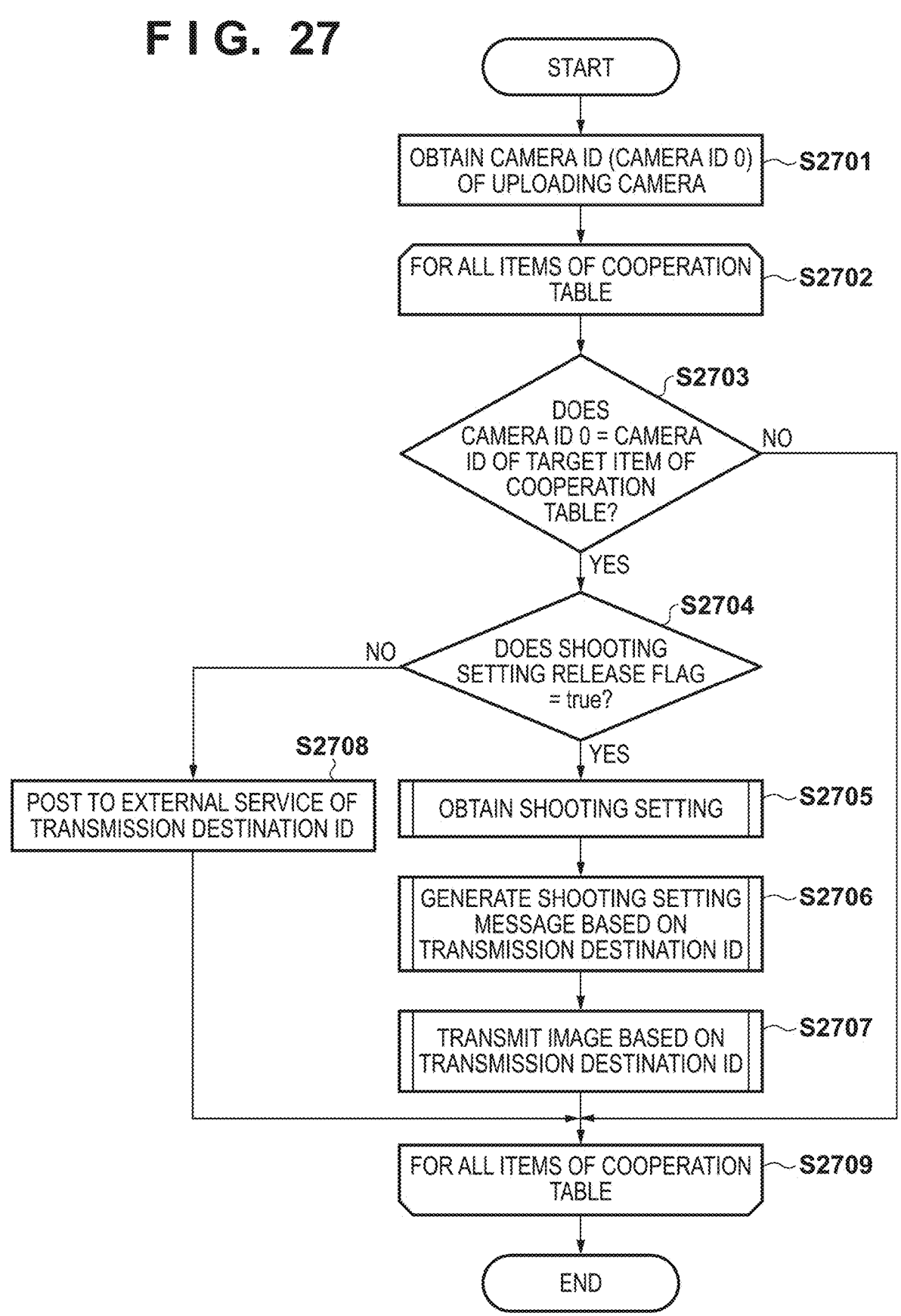
FIG. 27 is a flowchart showing an example of processing by a posting unit.

Next, a sequence of processing in the posting unit 620 will be explained with reference to FIG. 27. In step S2701, the posting unit 620 obtains the camera ID of an uploading camera. The obtained camera ID is defined as a camera ID 0. The posting unit 620 repeats processing in steps S2702 to S2709 regarding all items in the cooperation table 1200 of a user who designates posting. In step S2703, the posting unit 620 determines whether the camera ID 0 coincides with a camera ID at the target item in the cooperation table 1200. If the posting unit 620 determines that the camera ID 0 coincides with the camera ID (YES in step S2703), the process advances to step S2704. If the posting unit 620 determines that the camera ID 0 does not coincide with the camera ID (NO in step S2703), the process advances to step S2709. In step S2704, the posting unit 620 determines whether the shooting setting release flag is true. If the posting unit 620 determines that the shooting setting release flag is true (YES in step S2704), the process advances to step S2705. If the posting unit 620 determines that the shooting setting release flag is false (NO in step S2704), the process advances to step S2708. In step S2708, the posting unit 620 performs normal posting processing of an uploaded image to an external service represented by the transmission destination ID. Therefore, no shooting setting message is provided.

In step S2705, the posting unit 620 obtains shooting settings. Details of the processing in step S2705 will be described later with reference to FIG. 28. In step S2706, the posting unit 620 generates a shooting setting message based on the cooperation ID. Details of the processing in step S2706 will be described later with reference to FIGS. 29A, 29B and 29C. In step S2707, the posting unit 620 transmits an image to the information management apparatus 203 based on the transmission destination ID. Details of the processing in step S2707 will be described later with reference to FIGS. 30AA and 30AB and FIGS. 30BA and 30BB. In step S2709, the posting unit 620 determines whether the processing is complete for all items in the cooperation table 1200. If the posting unit 620 determines that the processing is complete, the process ends. If the posting unit 620 determines that the processing is incomplete, the process returns to step S2702.

<Sequence of Processing in Supplementary Information Obtaining Unit 621>

Next, a sequence of processing in the supplementary information obtaining unit 621 will be explained with reference to FIG. 28. In step S2801, the supplementary information obtaining unit 621 obtains a shooting setting posting permission/rejection flag from a transmission parameter. In step S2802, the supplementary information obtaining unit 621 determines whether the shooting setting posting permission/rejection flag is true. If the supplementary information obtaining unit 621 determines that the shooting setting posting permission/rejection flag is true (YES in step S2802), the process advances to step S2803. If the supplementary information obtaining unit 621 determines that the shooting setting posting permission/rejection flag is false (NO in step S2802), the processing by the supplementary information obtaining unit 621 ends. In step S2803, the supplementary information obtaining unit 621 obtains an image received from the image capturing apparatus 201. In step S2804, the supplementary information obtaining unit 621 obtains the header area of the obtained image. In step S2805, the supplementary information obtaining unit 621 generates a shooting setting dictionary for storing shooting settings in the dictionary form, and initializes it.

The supplementary information obtaining unit 621 repeats processing in steps S2806 to S2810 for all items in the shooting setting item table 1201. In step S2807, the supplementary information obtaining unit 621 obtains the value of the Exif tag ID of a target item from the shooting setting item table 1201. The obtained Exif tag ID is defined as an Exif tag ID 0. In step S2808, the supplementary information obtaining unit 621 obtains, from the header area of the uploaded image, the value of an Exif tag ID that coincides with the Exif tag ID 0. In step S2809, the supplementary information obtaining unit 621 adds the value of the Exif tag ID corresponding to the target item to the shooting setting dictionary by looking up the shooting setting item table 1201. More specifically, an item for which the value is the value of the Exif tag ID is added to the shooting setting dictionary using the Exif tag ID as a key. In step S2810, the supplementary information obtaining unit 621 determines whether the processing is complete for all items in the shooting setting item table 1201. If the supplementary information obtaining unit 621 determines that the processing is complete, the process ends. If the supplementary information obtaining unit 621 determines that the processing is incomplete, the process returns to step S2806.

<Sequence of Processing in Generation Unit 622>

Figure 29A:
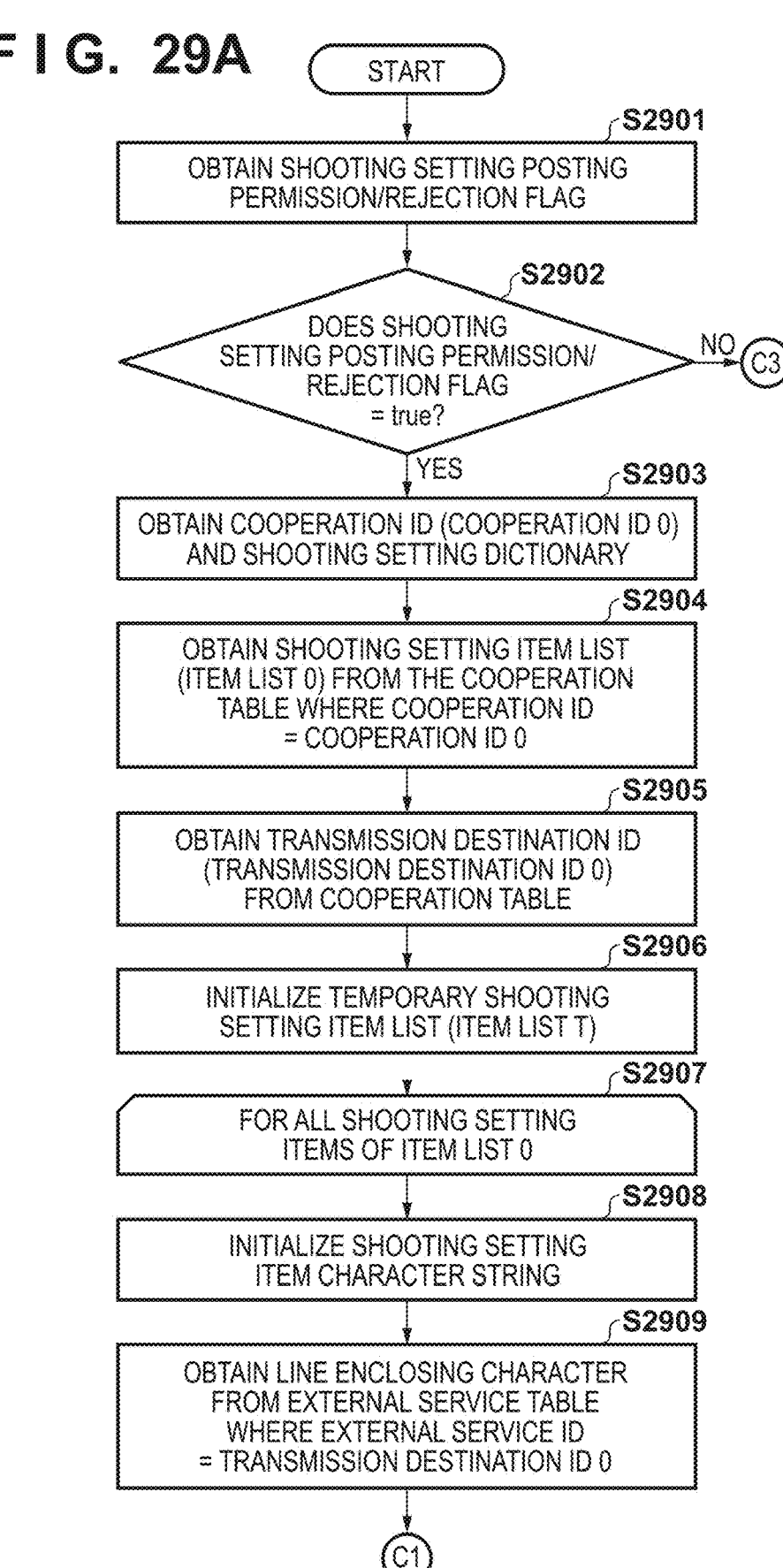

Next, a sequence of processing (shooting setting message generation processing) in the generation unit 622 will be explained with reference to FIGS. 29A, 29B and 29C. In step S2901, the generation unit 622 obtains a shooting setting posting permission/rejection flag from a transmission parameter. In step S2902, the generation unit 622 determines whether the shooting setting posting permission/rejection flag is true. If the generation unit 622 determines that the shooting setting posting permission/rejection flag is true (YES in step S2902), the process advances to step S2903. If the generation unit 622 determines that the shooting setting posting permission/rejection flag is false, the process ends.

Figure 28:
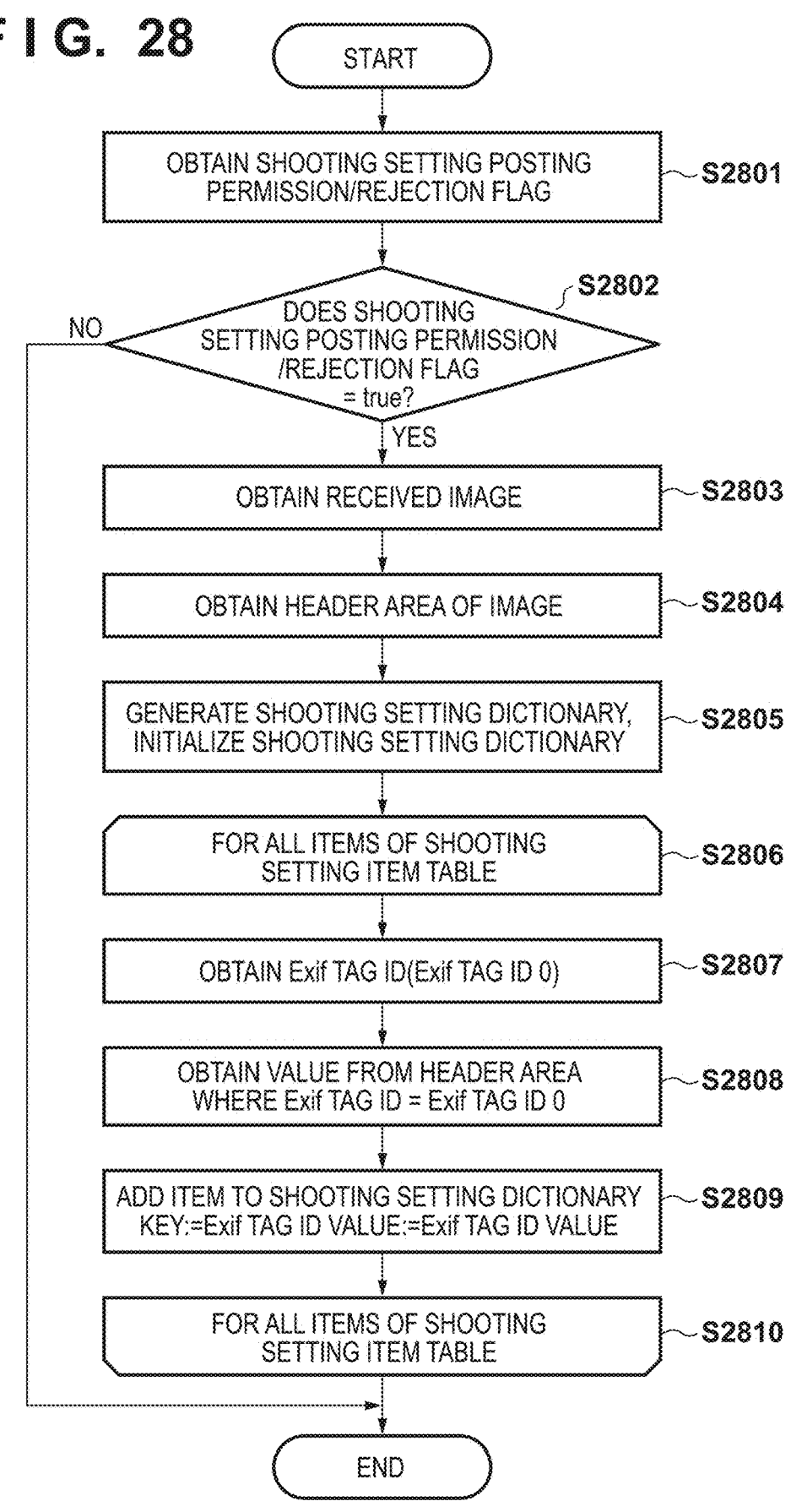
FIG. 28 is a flowchart showing an example of processing by a supplementary information obtaining unit.

In step S2903, the generation unit 622 obtains the cooperation ID of a target item and a shooting setting dictionary generated by the processing in FIG. 28. The obtained cooperation ID is defined as a cooperation ID 0. In step S2904, the generation unit 622 obtains, from the cooperation table 1200, the shooting setting item list of an item for which the cooperation ID coincides with the cooperation ID 0. The obtained shooting setting item list is defined as an item list 0. In step S2905, the generation unit 622 obtains a transmission destination ID from the cooperation table 1200. The obtained transmission destination ID is defined as a transmission destination ID 0. In step S2906, the generation unit 622 generates a temporary shooting setting item list and initializes it. This shooting setting item list is defined as an item list T.

The generation unit 622 repeats processing in steps S2907 to S2922 regarding all shooting setting items in the item list 0. In step S2908, the generation unit 622 generates a shooting setting item character string and initializes it. In step S2909, the generation unit 622 obtains, from the external service table 1103, the line enclosing character of an item for which the external service ID coincides with the transmission destination ID 0. In step S2910, the generation unit 622 adds the line enclosing character to the end of the shooting setting item character string. In step S2911, the generation unit 622 obtains a shooting setting display name from the shooting setting item table 1201. In step S2912, the generation unit 622 adds the shooting setting display name to the end of the shooting setting item character string. In step S2913, the generation unit 622 obtains a value linked with the transmission destination ID 0 from the prefix dictionary of the shooting setting item table 1201. In step S2914, the generation unit 622 adds the value of the prefix dictionary to the end of the shooting setting item character string.

In step S2915, the generation unit 622 obtains an Exif tag ID from the shooting setting item table 1201. In step S2916, the generation unit 622 obtains a value linked with the Exif tag ID from the shooting setting dictionary. In step S2917, the generation unit 622 adds the value linked with the Exif tag ID to the end of the shooting setting item character string. In step S2918, the generation unit 622 obtains a value linked with the transmission destination ID from the suffix dictionary of the shooting setting item table 1201. In step S2919, the generation unit 622 adds the value of the suffix dictionary to the end of the shooting setting item character string. In step S2920, the generation unit 622 adds the line enclosing character to the end of the shooting setting item character string. In step S2921, the generation unit 622 adds the shooting setting item character string to the end of the item list T.

In step S2922, the generation unit 622 determines whether the processing is complete for all shooting setting items in the item list 0. If the generation unit 622 determines that the processing is complete, the process advances to step S2923. If the generation unit 622 determines that the processing is incomplete, the process returns to step S2907. In step S2923, the generation unit 622 obtains, from the external service table 1103, the line feed character of an item for which the external service ID coincides with the transmission destination ID 0. In step S2924, the generation unit 622 connects the respective elements of the item list T by the line feed character.

Note that the shooting setting display name is a character string representing the contents of a shooting setting item such as "manufacturer" or "ISO sensitivity", but is not limited to this and may be a path or link to a save destination at which an image, sound, video, or the like representing the contents of a shooting setting item is saved. Furthermore, any information is available as long as the information allows a user to uniquely identify the contents of a shooting setting item.

Note that in the embodiment, a shooting setting display name and a prefix dictionary are separately held in the shooting setting item table 1201 and connected by the generation unit 622, but the present invention is not limited to this. For example, a prefix dictionary may be described like {"face": "manufacturer:", . . . }, and a shooting setting display name may be included in the value of the prefix dictionary. In this case, the attribute of the shooting setting display name is eliminated from the shooting setting item table 1201, and the reference to the attribute of the shooting setting display name in the generation unit 622 is eliminated. This arrangement can change the shooting setting display name for each transmission destination. This can cope with a case where assumed viewers change for each transmission destination such that the language is a native one for domestic viewers in Facebook and is English for global viewers in Instagram.

Note that in the embodiment, a set value corresponding to an Exif tag ID is recorded in a shooting setting message in the generation unit 622, but the present invention is not limited to this. A value obtained by processing a set value may be recorded, or a value obtained by combining a plurality of set values may be recorded. When a plurality of values are expressed as the set value of a shooting setting item, it is also possible to define a character string to be inserted between the first and second values, couple the first value, the character string to be inserted, and the second value, and record them in a shooting setting message. Alternatively, for example, when the set value is "1", an icon in the "1" shape may be displayed and recorded in a shooting setting message, instead of a path or link to a save destination at which an image, sound, video, or the like representing a set value is saved. That is, any information is available as long as the information allows a user to uniquely identify the set value. This arrangement can provide a user with a more free expression than on a post list screen at a transmission destination.

Note that in the embodiment, the shooting setting item table 1201 holds the prefix and suffix dictionaries in the dictionary form, and prefix and suffix character strings corresponding to a transmission destination are recorded in a shooting setting message in the generation unit 622, but the present invention is not limited to this. For example, one value may be held regardless of a transmission destination, instead of the dictionary form. In this case, for example, when the service is operated in a policy in which the image management apparatus 202 cooperates with only one external service, a plurality of transmission destinations need not be held. That is, the prefix and suffix dictionaries need not take the dictionary form. In such a case, it is configured to hold one value, reducing the use amount of the database.

<Sequence of Processing in Transmission Unit 623>

Figure 30A:
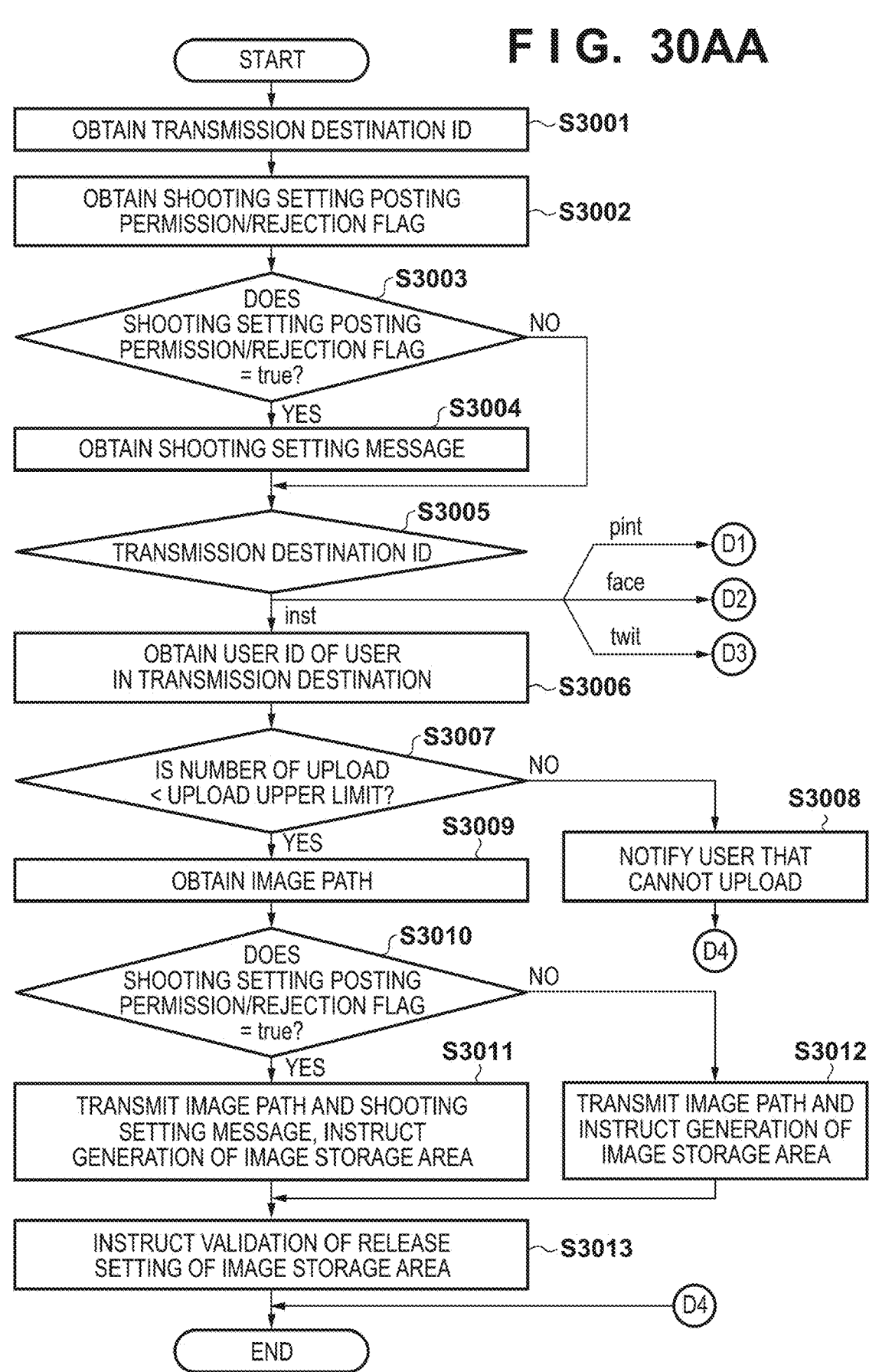
FIGS. 30AA and 30AB are a flowchart showing an example of processing by a transmission unit.

Next, a sequence of processing in the transmission unit 623 will be explained with reference to FIGS. 30AA and 30AB and FIGS. 30BA and 30BB. In step S3001, the transmission unit 623 obtains the transmission destination camera ID of a target item in the cooperation table 1200. In step S3002, the transmission unit 623 obtains a shooting setting posting permission/rejection flag from a transmission message. In step S3003, the transmission unit 623 determines whether the shooting setting posting permission/rejection flag is true. If the transmission unit 623 determines that the shooting setting posting permission/rejection flag is true (YES in step S3003), the process advances to step S3004. If the transmission unit 623 determines that the shooting setting posting permission/rejection flag is false (NO in step S3003), the process advances to step S3005. In step S3004, the transmission unit 623 obtains a shooting setting message generated in step S2706. In step S3005, the transmission unit 623 branches the process in accordance with the transmission destination ID. If the transmission destination ID is "inst", the process advances to step S3006. If the transmission destination ID is "pint", the process advances to step S3014. If the transmission destination ID is "face", the process advances to step S3021. If the transmission destination ID is "twit", the process advances to step S3031.

First, a case where the transmission destination ID is inst will be explained. In step S3006, the transmission unit 623 obtains the user ID of a user at the transmission destination. In step S3007, the transmission unit 623 determines whether the number of uploads is smaller than the upper limit of uploads at the transmission destination. If the number of uploads is smaller than the upper limit of uploads (YES in step S3007), the process advances to step S3009. If the number of uploads is equal to or larger than the upper limit of uploads (NO in step S3007), the process advances to step S3008. In step S3008, the transmission unit 623 notifies the user that no image can be uploaded, and the process ends. In step S3009, the transmission unit 623 obtains an image path representing the save destination of the image in the holding unit 624. In step S3010, the transmission unit 623 determines whether the shooting setting posting permission/rejection flag is true. If the transmission unit 623 determines that the shooting setting posting permission/rejection flag is true (YES in step S3010), the process advances to step S3011. If the transmission unit 623 determines that the shooting setting posting permission/rejection flag is false (NO in step S3010), the process advances to step S3012. In step S3011, the transmission unit 623 sets the image path and the shooting setting message at a transmission parameter, transmits them to the information management apparatus 203, and instructs the information management apparatus 203 to generate an image storage area. In step S3012, the transmission unit 623 transmits the image path to the information management apparatus 203, and instructs the information management apparatus 203 to generate an image storage area. In step S3013, the transmission unit 623 instructs the information management apparatus 203 to validate the release setting of the image storage area, and the process ends.

Next, a case where the transmission destination ID is pint will be explained. In step S3014, the transmission unit 623 obtains a token from the transmission destination, that is, the information management apparatus 203. In step S3015, the transmission unit 623 generates a payload area in the holding unit 624. In step S3016, the transmission unit 623 obtains an image path representing the save destination of the image in the holding unit 624. In step S3017, the transmission unit 623 stores the image path in the payload area. In step S3018, the transmission unit 623 determines whether the shooting setting posting permission/rejection flag is true. If the transmission unit 623 determines that the shooting setting posting permission/rejection flag is true (YES in step S3018), the process advances to step S3019. If the transmission unit 623 determines that the shooting setting posting permission/rejection flag is false (NO in step S3018), the process advances to step S3020. In step S3019, the transmission unit 623 stores a shooting setting message in the payload area. In step S3020, the transmission unit 623 transmits information of the payload area to the transmission destination, and the process ends.

Next, a case where the transmission destination ID is face will be explained. In step S3021, the transmission unit 623 obtains a token from the transmission destination. In step S3022, the transmission unit 623 calculates the file size of an image. In step S3023, the transmission unit 623 obtains the type of image. In step S3024, the transmission unit 623 transmits the token, the file size of the image, and the type of image, and generates an image storage area in the holding unit 624. In step S3025, the transmission unit 623 obtains the image path of the image in the holding unit 624. In step S3026, the transmission unit 623 transmits the token and the image path to the information management apparatus 203. In step S3027, the transmission unit 623 determines whether the shooting setting posting permission/rejection flag is true. If the transmission unit 623 determines that the shooting setting posting permission/rejection flag is true (YES in step S3027), the process advances to step S3028. If the transmission unit 623 determines that the shooting setting posting permission/rejection flag is false (NO in step S3027), the process ends. In step S3028, the transmission unit 623 determines whether the upload is complete. If the transmission unit 623 determines that the upload is complete (YES in step S3028), the process advances to step S3029. If the transmission unit 623 determines that the upload is incomplete (NO in step S3028), the process returns to step S3028 (waits for the completion of upload). In step S3029, the transmission unit 623 obtains, from the information management apparatus 203, information that specifies the image in the information management apparatus 203, that is, the reference destination of the image. In step S3030, the transmission unit 623 transmits a shooting setting message to the information management apparatus 203 as a comment to the reference destination of the image. That is, the transmission unit 623 transmits the shooting setting message in association with the information that specifies the image in the information management apparatus 203. After that, the process ends.

Next, a case where the transmission destination ID is twit will be explained. In step S3031, the transmission unit 623 calculates the file size of an image. In step S3032, the transmission unit 623 obtains the type of image. In step S3033, the transmission unit 623 transmits the file size of the image and the type of image and obtains an image ID at the transmission destination. In step S3034, the transmission unit 623 transmits the image ID and the image to the information management apparatus 203. In step S3035, the transmission unit 623 determines whether the upload is complete. If the transmission unit 623 determines that the upload is complete (YES in step S3035), the process advances to step S3036. If the transmission unit 623 determines that the upload is incomplete (NO in step S3035), the process returns to step S3035 (waits for the completion of upload). In step S3036, the transmission unit 623 designates the image ID, and transmits an end instruction to the information management apparatus 203. In step S3037, the transmission unit 623 determines whether the shooting setting posting permission/rejection flag is true. If the transmission unit 623 determines that the shooting setting posting permission/rejection flag is true, the process advances to step S3038. If the transmission unit 623 determines that the shooting setting posting permission/rejection flag is false (NO in step S3037), the process ends. In step S3038, the transmission unit 623 designates the image ID, and transmits a shooting setting message to the information management apparatus 203.

<Display Examples in External Service after Posting>

Next, display examples in an external service after posting will be explained with reference to FIGS. 31A and 31B. FIG. 31A shows an example of a post browsing screen displayed on the client of a user who browses the external service Twitter. FIG. 31A shows a post list screen 3100 in Twitter. In the post list screen 3100, a post 3101 is the post of an image transmitted from the image management apparatus 202. A post 3102 is the post of a shooting setting message transmitted from the image management apparatus 202 as a comment to the post of the image. In this manner, according to the embodiment, the shooting setting message can be associated and displayed as the post of the comment to the post of the image.

FIG. 31B shows an example of a post browsing screen displayed on the client of a user who browses the external service Facebook. On a post list screen 3110 in Facebook, a post 3111 is one post including an image and shooting setting message transmitted from the image management apparatus 202, and includes an image 3112 and a shooting setting message 3113. In this fashion, according to the embodiment, the shooting setting message can be associated and displayed as an explanation about the image.

<Modifications of Generation Unit 622 and Transmission Unit 623>

Figure 32A:
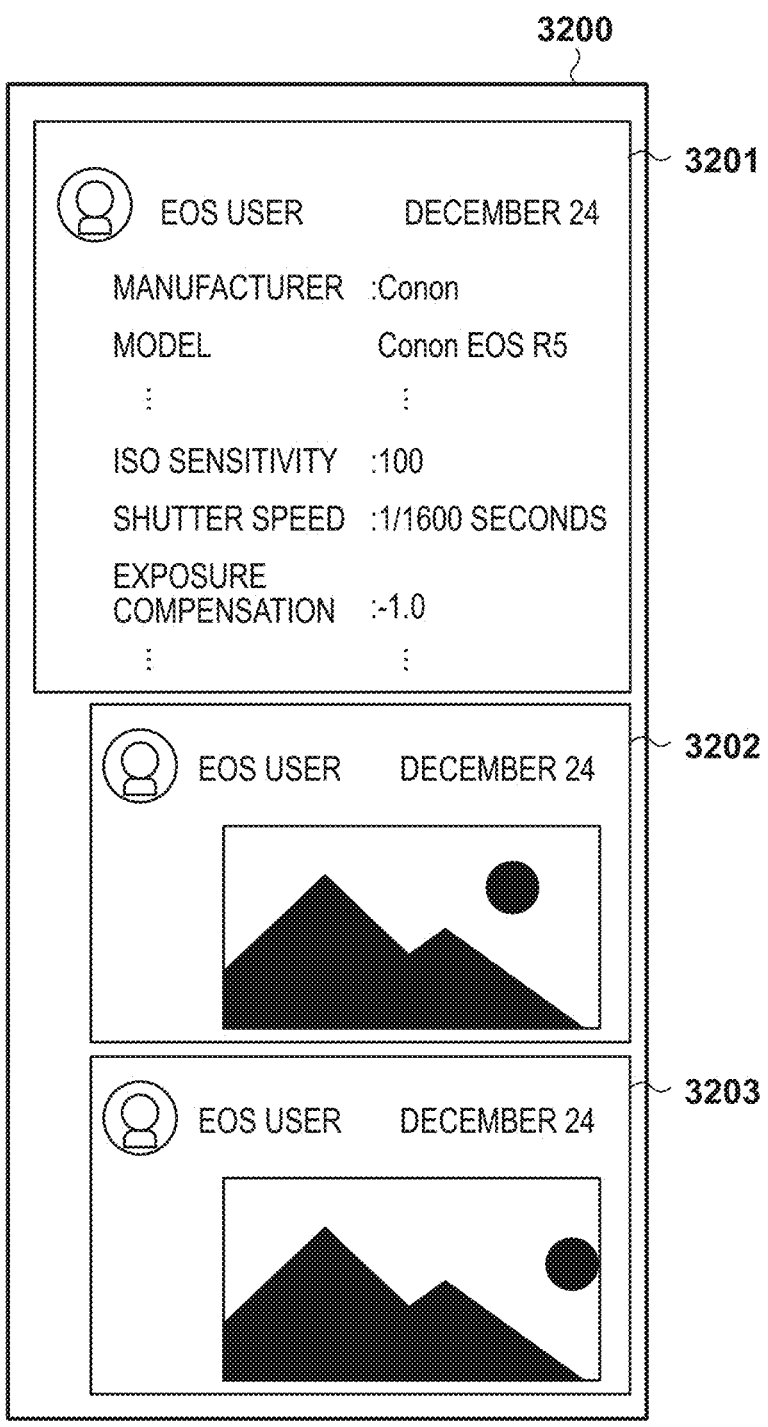
FIGS. 32A and 32B are views for explaining modifications of a shooting setting message provided from the posting unit.

Next, modifications of the generation unit 622 and the transmission unit 623 will be explained with reference to FIGS. 32A and 32B.

First Modification

In processing shown in FIGS. 30BA and 30BB, after transmitting an image to an external service, the posting unit

620 obtains, from the external service, information that specifies the image, and transmits a shooting setting message to the external service in association with the information. To the contrary, a shooting setting message may be transmitted first. That is, after transmitting a shooting setting message to an external service, the posting unit 620 may obtain, from the external service, information that specifies the message, and provide an image to the external service in association with the information. When an image is transmitted in association with a shooting setting message after transmitting the shooting setting message, one shooting setting message can be associated with a plurality of images. For example, when the generation unit 622 receives a plurality of images and these images have the same shooting settings, a shooting setting message is generated based on the shooting settings of one image. The transmission unit 623 transmits the shooting setting message to a transmission destination, and obtains a post ID that specifies the post. Then, the transmission unit 623 transmits images in association with the post ID. FIG. 32A shows a display example of the thus-posted shooting setting message and images at a transmission destination. FIG. 32A shows a post list screen 3200 at a transmission destination. A post 3201 is the post of a shooting setting message generated from the shooting settings of one image. A post 3202 is the post of the first image transmitted as a comment to the post of the shooting setting message. A post 3203 is the post of the second image transmitted as a comment to the post of the shooting setting message. According to the above embodiment, a shooting setting message generated from the shooting settings of one image is posted, and an image is posted as a comment to the post. Samples of images shot at the same shooting settings can be associated and displayed.

Second Modification

Next, the second modification will be explained. Upon receiving a plurality of images, the generation unit 622 compares the set values of the shooting setting items of the respective images, and generates a common shooting setting message from shooting setting items having coincident values. Also, the generation unit 622 generates an individual shooting setting message from a shooting setting item having a non-coincident set value. The transmission unit 623 posts the common shooting setting message, and obtains a post ID that specifies the post. In association with the post ID, the transmission unit 623 posts an image and the individual shooting setting item.

Figure 32B:
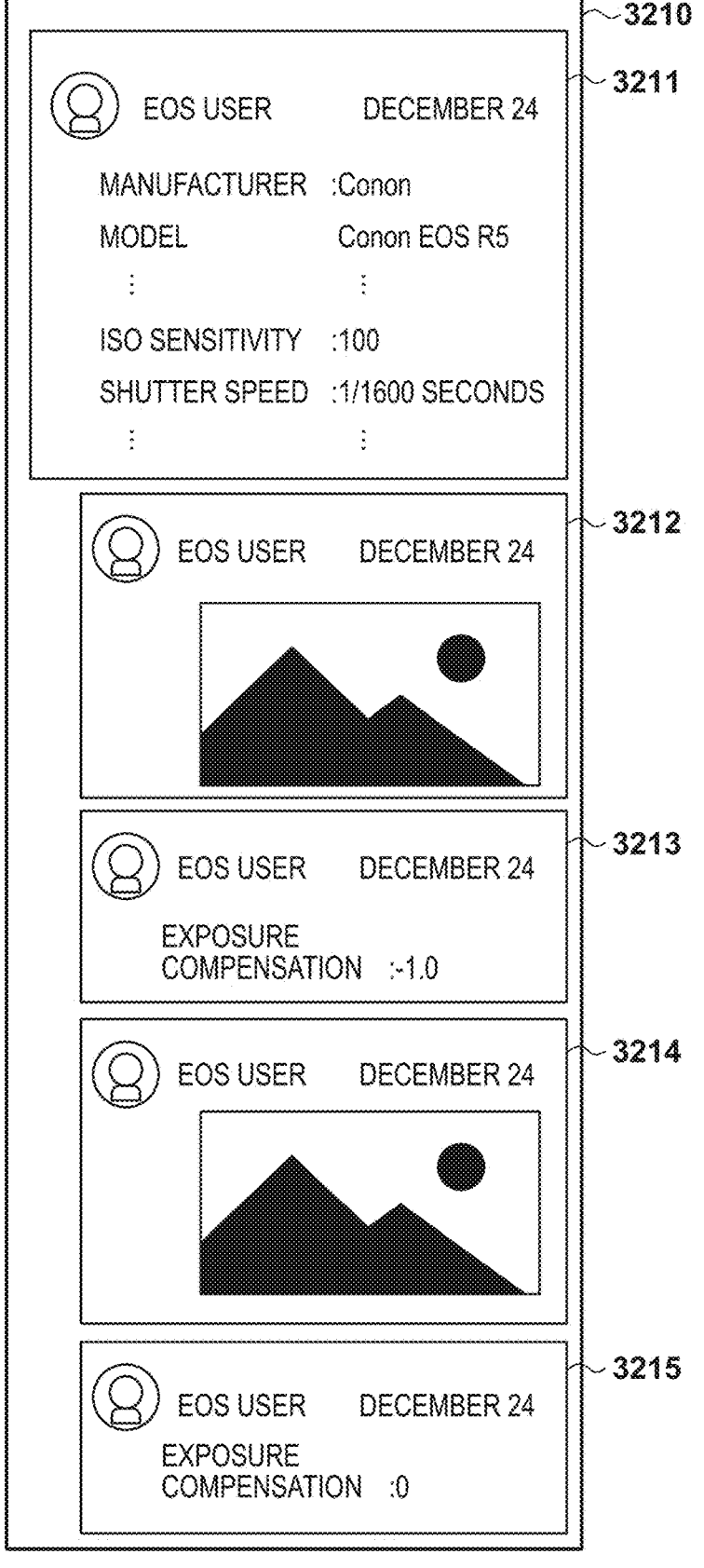

FIG. 32B shows a display example of the thus-posted shooting setting message and images at a transmission destination. FIG. 32B shows a post list screen 3210 at a transmission destination. A post 3211 is the post of a common shooting setting message. A post 3212 is the post of the first image as a comment to the post of the common shooting setting message. A post 3213 is the post of an individual shooting setting message of the first image as a comment to the post of the common shooting setting message. A post 3214 is the post of the second image as a comment to the post of the common shooting setting message. A post 3215 is the post of an individual shooting setting message of the second image as a comment to the post of the common shooting setting message. According to the above embodiment, while separating a common shooting setting message, an image, and an individual shooting setting message, they are associated with each other and posted. While common shooting settings are displayed at once, a difference between the shooting settings of respective images can be displayed in an easy-to-understand manner.

Third Modification

Next, the third modification will be explained. The transmission unit 623 embeds the character string of a shooting setting message as readable characters not in the header area of an image but in the image data area, and transmits, to a transmission destination, the image in which the shooting setting message is embedded. According to this embodiment, a shooting setting message is embedded as readable characters in an image, so shooting settings can be displayed together with the image at a transmission destination.

According to the above-described technique, a shooting setting message is also posted in an image post to an external service. The user can release shooting settings in the external service without inputting shooting settings or manipulating the post in the external service.

OTHER EMBODIMENTS

The embodiment has been described in detail. The present invention can take embodiments of a system, apparatus, method, program, recording medium (storage medium), and the like. More specifically, the present invention may also be applied to a system including a plurality of devices (e.g., a host computer, interface device, image capturing apparatus, and Web application), or an apparatus formed by a single device.

The present invention can reduce a user operation when releasing shooting settings in an external service.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-134155, filed Aug. 21, 2023, which is hereby incorporated by reference herein in its entirety.

What is claimed is:

1. An information processing apparatus that provides an image received from an external apparatus to an external service in accordance with an instruction of a post by a user, comprising:

an obtaining unit configured to obtain shooting information supplementary to the image received from the external apparatus;

a generation unit configured to generate, based on the shooting information and information about the external service serving as a providing destination of the image, a message representing a shooting setting of the image in a form suited to the post to the external service serving as the providing destination; and a providing unit configured to associate the image and the message, and provide the image and the message to the external service serving as the providing destination.

2. The apparatus according to claim 1, wherein the information about the external service serving as the providing destination includes a control character used by the external service to process the message.

3. The apparatus according to claim 1, wherein the information about the external service serving as the providing destination includes information for decorating display of a shooting setting item and a set value included in the shooting information.

4. The apparatus according to claim 3, wherein the information for decoration includes information that allows the user to identify content of the shooting setting item included in the shooting information and/or a set value of the shooting setting item included in the shooting information.

5. The apparatus according to claim 3, wherein the information for decoration includes one of a character string, an image, a sound, and a video representing content of the shooting setting item included in the shooting information and/or a set value of the shooting setting item included in the shooting information.

6. The apparatus according to claim 1, wherein the providing unit sets the message at a transmission parameter that is transmitted in association with providing of the image.

7. The apparatus according to claim 6, wherein the transmission parameter includes an image path used to obtain the image by the external service serving as the providing destination.

8. The apparatus according to claim 1, wherein after transmitting the image to the external service serving as the providing destination, the providing unit transmits the message of the shooting setting to the external service serving as the providing destination.

9. The apparatus according to claim 8, wherein after transmitting the image to the external service serving as the providing destination, the providing unit obtains, from the external service serving as the providing destination, information that specifies the image, and transmits the message to the external service serving as the providing destination in association with the specifying information.

10. The apparatus according to claim 1, wherein after transmitting the message to the external service serving as the providing destination, the providing unit transmits, to the external service serving as the providing destination, the image or an image path representing a save destination of the image.

11. The apparatus according to claim 10, wherein after transmitting the message to the external service serving as the providing destination, the providing unit obtains, from the external service serving as the providing destination, information that specifies the message, and transmits the image or the image path representing the save destination of the image to the external service serving as the providing destination in association with the specifying information.

12. The apparatus according to claim 10, wherein in a case where a plurality of images are received from the external apparatus, and shooting settings represented by pieces of supplementary information of the plurality of images are identical, the generation unit generates one message to the plurality of images, and the providing unit provides the one message in association with the plurality of images.

13. The apparatus according to claim 10, wherein in a case where a plurality of images are received from the external apparatus, the generation unit generates a first message representing a setting item having an identical set value for the plurality of images, and generates a plurality of second messages representing shooting settings for a setting item having different set values for the plurality of images, and the providing unit provides the first message in association with the plurality of images, and provides the respective second messages in association with the respective images.

14. The apparatus according to claim 1, further comprising:

a first setting unit configured to provide a predetermined UI screen on a terminal apparatus of the user, and prompt the user to set whether to permit cooperation with an external service; and an establishment unit configured to request cooperation of an external service set to be cooperated in the setting of whether to permit cooperation, and establish cooperation between the user and the external service, wherein the external service serving as the providing destination is an external service that establishes cooperation with the user.

15. The apparatus according to claim 14, wherein the first setting unit sets whether to permit cooperation between each of a plurality of external services and the user, and the establishment unit establishes cooperation between each of the plurality of external services and the user.

16. The apparatus according to claim 15, wherein the first setting unit further sets, for each external apparatus registered in association with the user, whether to cooperate with an external service.

17. The apparatus according to claim 1, further comprising a second setting unit configured to provide a predetermined UI screen on a terminal apparatus of the user, and prompt the user to set whether to permit release of the shooting information, wherein in a case where release of the shooting information is not permitted, the providing unit does not provide the message to the external service.

18. The apparatus according to claim 17, wherein the second setting unit sets, for each external apparatus registered in association with the user, whether to permit release of the shooting information, and in a case where release of the shooting information is not permitted for an external apparatus to which the image is transmitted, the providing unit does not provide the message.

19. The apparatus according to claim 17, wherein the second setting unit sets, for the user, whether to permit release of the shooting information in each of a plurality of external services, and in a case where release of the shooting information is not permitted for the external service serving as the providing destination, the providing unit does not provide the message.

20. The apparatus according to claim 1, further comprising a third setting unit configured to provide a predetermined UI screen on a terminal apparatus of the user, and prompt the user to set whether to permit release of each of a plurality of setting items included in the shooting information, wherein the generation unit generates the message excluding a setting item for which release is not permitted.

21. The apparatus according to claim 20, wherein the UI screen provided by the third setting unit changes a display order of shooting setting items in accordance with a user operation.

22. The apparatus according to claim 1, further comprising a confirmation unit configured to provide a predetermined UI screen on a terminal apparatus of the user, and confirm whether to permit providing of the message, wherein in a case where providing of the message is permitted, the providing unit provides the message to the external service.

23. The apparatus according to claim 22, wherein in a case where the setting of whether to perform the confirmation is accepted from the user, and the confirmation is set to be performed, the confirmation unit confirms by the user whether to permit providing of the message.

24. An information processing apparatus that provides an image received from an external apparatus to an external service in accordance with an instruction of a post by a user, comprising:

an obtaining unit configured to obtain shooting information supplementary to the image received from the external apparatus;

a generation unit configured to generate a message representing a shooting setting of the image based on the shooting information; and a providing unit configured to provide, to the external service, an image obtained by embedding the message in the image.

25. A method of controlling an information processing apparatus that provides an image received from an external apparatus to an external service in accordance with an instruction of a post by a user, the method comprising:

obtaining shooting information supplementary to the image received from the external apparatus;

generating, based on the shooting information and information about the external service serving as a providing destination of the image, a message representing a shooting setting of the image in a form suited to the post to the external service serving as the providing destination; and associating the image and the message to provide the image and the message to the external service serving as the providing destination.

26. A non-transitory computer-readable storage medium storing a program for causing a computer to execute a method of controlling an information processing apparatus that provides an image received from an external apparatus to an external service in accordance with an instruction of a post by a user, the method comprising:

obtaining shooting information supplementary to the image received from the external apparatus;

generating, based on the shooting information and information about the external service serving as a providing destination of the image, a message representing a shooting setting of the image in a form suited to the post to the external service serving as the providing destination; and associating the image and the message to provide the image and the message to the external service serving as the providing destination.

27. An image management system comprising a terminal apparatus, an image management apparatus configured to hold and manage an image received from the terminal apparatus, and an information management apparatus configured to execute an external service that accepts a post of an image by the image management apparatus, the image management apparatus including:

an obtaining unit configured to obtain shooting information supplementary to the image received from an external apparatus;

a generation unit configured to generate, based on the shooting information and information about the external service, a message representing a shooting setting of the received image in a form suited to the post to the external service; and a providing unit configured to associate the received image and the message, and provide the image and the message to the external service in accordance with an instruction of a post of the received image.

* * * * *